(12) United States Patent
Freda et al.

(10) Patent No.: US 12,256,244 B2
(45) Date of Patent: Mar. 18, 2025

(54) METHOD FOR SIDELINK RADIO LINK MONITORING AND RADIO LINK FAILURE

(71) Applicant: InterDigital Patent Holdings, Inc., Wilmington, DE (US)

(72) Inventors: Martino Freda, Laval (CA); Paul Marinier, Brossard (CA); Diana Pani, Montreal (CA); Ghyslain Pelletier, Montréal (CA); Yugeswar Deenoo, Chalfont, PA (US); Faris Alfarhan, Montréal (CA); Tao Deng, Roslyn, NY (US); Tuong Duc Hoang, Montreal (CA); Chunxuan Ye, San Diego, CA (US); Moon Il Lee, Melville, NY (US)

(73) Assignee: InterDigital Patent Holdings, Inc., Wilmington, DE (US)

( * ) Notice: Subject to any disclaimer, the term of this patent is extended or adjusted under 35 U.S.C. 154(b) by 385 days.

(21) Appl. No.: 17/429,991

(22) PCT Filed: Feb. 11, 2020

(86) PCT No.: PCT/US2020/017675
§ 371 (c)(1),
(2) Date: Aug. 11, 2021

(87) PCT Pub. No.: WO2020/167773
PCT Pub. Date: Aug. 20, 2020

(65) Prior Publication Data
US 2022/0150730 A1 May 12, 2022

Related U.S. Application Data

(60) Provisional application No. 62/804,558, filed on Feb. 12, 2019, provisional application No. 62/823,794, (Continued)

(51) Int. Cl.
*H04W 24/04* (2009.01)
*H04L 1/1812* (2023.01)
*H04W 76/28* (2018.01)

(52) U.S. Cl.
CPC .......... *H04W 24/04* (2013.01); *H04L 1/1812* (2013.01); *H04W 76/28* (2018.02)

(58) Field of Classification Search
CPC ..... H04L 1/1812; H04L 1/1825; H04L 1/188; H04L 1/203; H04L 1/1848; H04W 24/04;
(Continued)

(56) References Cited

U.S. PATENT DOCUMENTS 8,155,060 B2 4/2012 Ranta-Aho et al.
10,044,474 B1 * 8/2018 Oroskar ................ H04L 5/0035
(Continued)

FOREIGN PATENT DOCUMENTS

CN 102036284 A 4/2011
CN 102624568 A 8/2012
(Continued)

OTHER PUBLICATIONS

InterDigital Inc., "RLM/RLF and RRM for NR V2X", 3GPP RAN WG2 Meeting #105, R2-1901579, Athens, Greece, Feb. 25-Mar. 1, 2019.*
(Continued)

Primary Examiner — Stephen J Clawson
(74) Attorney, Agent, or Firm — Flaster Greenberg, P.C.

(57) ABSTRACT

Methods and apparatuses are described herein for monitoring radio links between wireless transmit/receive units (WTRUs) and determining of radio link failure, and may be used, among others, for New Radio (NR) vehicular communication (V2X); a mode whereby WTRUs can communicate with each other directly. A radio link between a WTRU and another WTRU may be monitored indepen-
(Continued)

dently per ongoing unicast and/or multicast link, and radio link failure (RLF) may be determined as a function of the monitoring.

12 Claims, 11 Drawing Sheets

Related U.S. Application Data filed on Mar. 26, 2019, provisional application No. 62/840,741, filed on Apr. 30, 2019, provisional application No. 62/886,088, filed on Aug. 13, 2019, provisional application No. 62/908,898, filed on Oct. 1, 2019, provisional application No. 62/964,054, filed on Jan. 21, 2020.

(58) Field of Classification Search
CPC ..... H04W 76/19; H04W 76/28; H04W 76/18; H04W 76/14; H04W 24/08; H04W 92/18
See application file for complete search history.

(56) References Cited

U.S. PATENT DOCUMENTS

| | | | |
|---|---|---|---|
| 11,546,923 B2 | 1/2023 | Kaur et al. | |
| 2005/0265250 A1* | 12/2005 | Gollamudi | H04L 69/16 370/252 |
| 2008/0209297 A1* | 8/2008 | Chandra | H04L 1/1841 370/310 |
| 2010/0165836 A1* | 7/2010 | Wahlqvist | H04W 76/19 370/225 |
| 2010/0173633 A1* | 7/2010 | Catovic | H04W 24/02 455/436 |
| 2010/0302951 A1 | 12/2010 | Ou | |
| 2012/0307724 A1 | 12/2012 | Wang et al. | |
| 2013/0324114 A1* | 12/2013 | Raghothaman | H04W 76/14 455/426.1 |
| 2014/0378138 A1* | 12/2014 | Chang | H04W 36/0085 455/436 |
| 2015/0365872 A1 | 12/2015 | Dudda et al. | |
| 2016/0037579 A1 | 2/2016 | Jung et al. | |
| 2017/0215119 A1 | 7/2017 | Hong et al. | |
| 2018/0091265 A1 | 3/2018 | Liu et al. | |
| 2018/0310192 A1* | 10/2018 | Bergquist | H04L 1/1848 |
| 2019/0159084 A1 | 5/2019 | Wu et al. | |
| 2019/0229980 A1 | 7/2019 | Han et al. | |
| 2020/0229007 A1* | 7/2020 | Jung | H04W 72/04 |
| 2020/0236730 A1 | 7/2020 | Shin et al. | |
| 2020/0252989 A1 | 8/2020 | Chen et al. | |
| 2020/0295883 A1* | 9/2020 | Lee | H04L 5/0057 |
| 2021/0044956 A1 | 2/2021 | Kim | |
| 2021/0058997 A1 | 2/2021 | Zhang et al. | |
| 2021/0067277 A1* | 3/2021 | Wu | H04L 1/1825 |
| 2021/0068187 A1* | 3/2021 | Baghel | H04W 76/19 |
| 2021/0068189 A1* | 3/2021 | Hahn | H04W 76/36 |
| 2021/0329510 A1 | 10/2021 | Tseng et al. | |
| 2022/0110010 A1* | 4/2022 | Lu | H04W 24/04 |
| 2022/0279617 A1* | 9/2022 | Orsino | H04W 76/15 |
| 2023/0070757 A1* | 3/2023 | Zheng | H04W 12/102 |
| 2023/0300695 A1* | 9/2023 | Zheng | H04W 4/70 |

FOREIGN PATENT DOCUMENTS

| | | |
|---|---|---|
| CN | 106465320 A | 2/2017 |
| CN | 108924853 A | 11/2018 |
| WO | WO 2006086359 A2 | 8/2006 |
| WO | WO 2015/043471 A1 | 4/2015 |
| WO | WO 2015143170 A1 | 9/2015 |
| WO | WO 2018135677 A1 | 7/2018 |

OTHER PUBLICATIONS

Ericsson, "On NR sidelink link management for unicast", 3GPP TSG-RAN WG2 #105, R2-1901707, Athens, Greece, Feb. 25-Mar. 1, 2019.*
Ericsson, "RLF handling in sidelink", 3GPP TSG-RAN WG2 #107, R2-1910133, Prague, Czech Republic, Aug. 26-30, 2019.*
Anonymous, "Proximity-based services (ProSe); Stage 2 (Release 15)", 3rd Generation Partnership Project (3GPP), Technical Specification Group Services and System Aspects, Technical Specification: 3GPP TS 23.303 V15.1.0, Jun. 2018, 130 pages.
Anonymous, "Enhancement of 3GPP support for V2X scenarios, Stage 1 (Release 15)", 3rd Generation Partnership Project (3GPP), Technical Specification Group Services and System Aspects, Technical Specification: 3GPP TS 22.186 V15.2.0, Sep. 2017, 16 pages.
Anonymous, "Evolved Universal Terrestrial Radio Access (E-UTRA); Physical layer procedures (Release 14)", 3rd Generation Partnership Project (3GPP); Technical Specification Group Radio Access Network; Technical Specification Document: 3GPP TS 36.213 V14.4.0, Sep. 2017, 462 pages.
Anonymous, "Study on enhancement of 3GPP Support for 5G V2X Services (Release 15)", 3rd Generation Partnership Project (3GPP); Technical Specification Group Services and System Aspects; Technical Report: 3GPP TR 22.886 V15.1.0, Mar. 2017, 58 pages.
Anonymous, "Study on architecture enhancements for EPS and 5G System to support advanced V2X services (Release 16)", 3rd Generation Partnership Project (3GPP); Technical Specification Group Services and System Aspects, Technical Report: 3GPP TR 23.786 VO.8.0, Aug. 2018, 83 pages.
English Translation for WO 2018135677, entitled "Method and apparatus for restoring link between terminals in wireless communication system".
Third Generation Partnership Project (3GPP), R1-1901055 , "Consideration on sidelink Rlm", 3GPP TSG RAN WG1 Ad-Hoc Meeting 1901, Jan. 21-25, 2019, 2 pages.
Third Generation Partnership Project (3GPP), R2-1814472 , "Correction on V2X sidelink communication in TS 36.300", 3GPP TSG-RAN WG2 Meeting #103bis, Oct. 8-12, 2018, 12 pages.

* cited by examiner

METHOD FOR SIDELINK RADIO LINK MONITORING AND RADIO LINK FAILURE

CROSS-REFERENCE TO RELATED APPLICATIONS

This application claims the benefit, under 35 U.S.C. § 365 of International Application PCT/US2020/017675, filed Feb. 11, 2020, which was published in accordance with PCT Article 21(2) on Aug. 20, 2020, in English, and which claims the benefit of U.S. Patent Application No. 62/804,558, filed Feb. 12, 2019; U.S. Patent Application No. 62/823,794, filed Mar. 26, 2019; U.S. Patent Application No. 62/840,741, filed Apr. 30, 2019; U.S. Patent Application No. 62/886,088, filed Aug. 13, 2019; U.S. Patent Application No. 62/908,898, filed Oct. 1, 2019; and U.S. Patent Application No. 62/964,054, filed Jan. 21, 2020.

BACKGROUND

Vehicular communication is a mode of communication whereby wireless transmit/receive units (WTRUs) may communicate with each other directly, and may be referred to as Device-to-Device (D2D) or Vehicular to Anything (V2X) communications. New Radio (NR) systems may support a number of use cases such as vehicle platooning, advanced driving, use of extended sensors, and remote driving. To facilitate support of these and other scenarios, NR V2X link establishment may be enhanced, for not all WTRUs may have the same capabilities.

SUMMARY

Methods and apparatuses are described herein for sidelink radio link monitoring (RLM) and a determination of a radio link failure (RLF). Sidelink radio link monitoring and a determination of a radio link failure may, for example, be achieved through a method for use in a wireless transmit/receive unit (WTRU) and may include monitoring a radio link between the WTRU and at least another WTRU independently per an ongoing unicast and/or multicast link. Determining if a radio link failure (RLF) condition exists may be performed as a function of the monitoring per the ongoing unicast and/or multicast link.

According to a first embodiment, there is described a method for use in a first wireless transmit-receive unit (WTRU), the method including declaring, for a communication link with a second WTRU, Sidelink Radio Link Failure (SL-RLF) for said communication link, under any of the following conditions:
  receiving a number of consecutive negative acknowledgements (NACKs) in response to requesting Hybrid Automatic Repeat reQuest (HARQ) feedback on said communication link;
  not receiving acknowledgement (ACK) or NACK on said communication link subsequent to a number of consecutive HARQ-based sidelink transmissions;
  not receiving ACK or NACK on said communication link after a time period;
  receiving, by said first WTRU, a number of ACK or NACK on said communication link in a time period, said number being lower than a threshold;
  receiving, by said first WTRU, a Physical Sidelink Feedback Channel (PSFCH) quality below a threshold;
  receiving, by said first WTRU, changes in PSFCH quality that exceed a threshold.

Further to the first embodiment of the method for use in a first wireless transmit-receive unit, the receiving a number of consecutive NACKs or receiving a number of ACK or NACK is a function of any of the following:
  a Quality of Service (QoS) of said communication link;
  a periodicity of data transmissions over said communication link;
  a velocity of said first WTRU;
  a distance between said first WTRU and said second WTRU;
  a measured channel congestion;
  a configured pattern of transmission.

Further to the first embodiment of the method for use in a first wireless transmit-receive unit, that may be combined with any of the first and the second embodiments, the first WTRU, when declaring SL-RLF, transmits, to a gNB, information indicating said SL-RLF, said information comprising a data link layer (L2) destination identifier of the communication link.

According to a second embodiment, there is described a first wireless receive-transmit unit device (WRTU) device, the device comprising at least one processor, a memory, and a transceiver, wherein the at least one processor is configured to declare, for a communication link with a second WRTU device, Sidelink Radio Link Failure (SL-RLF) for said communication link, under any of the following conditions:
  receiving a number of consecutive negative acknowledgements (NACKs) in response to requesting Hybrid Automatic Repeat reQuest (HARQ) feedback on said communication link;
  not receiving acknowledgement (ACK) or NACK on said communication link subsequent to a number of consecutive HARQ-based sidelink transmissions;
  not receiving ACK or NACK on said communication link after a time period;
  receiving, by said first WTRU device, a number of ACK or NACK on said communication link in a time period, said number being lower than a threshold;
  receiving, by said first WRTU device, a Physical Sidelink Feedback Channel (PSFCH) quality below a threshold;
  receiving, by said first WRTU device, changes in PSFCH quality that exceed a threshold.

Further to the second embodiment, the receiving a number of consecutive NACKs or receiving a number of ACK or NACK is a function of any of the following:
  a Quality of Service (QoS) of said communication link;
  a periodicity of data transmissions over said communication link;
  a velocity of said first WRTU device;
  a distance between said first WRTU device and said second WRTU device;
  a measured channel congestion;
  a configured pattern of transmission.

Further to the second embodiment, the at least one processor, when declaring SL-RLF, is further configured to transmit, to a gNB, information indicating said SL-RLF, said information comprising a data link layer (L2) destination identifier of the communication link.

According to a third embodiment, there is described a method for determining a state of a radio link between a first wireless transmit-receive unit (WTRU) and a second WTRU, the method including performing, by said first WTRU, a first set of at least one transmission over said radio link for a purpose of triggering, in response, a second set of at least one response transmission by said second WTRU. The first set of at least one transmission comprising at least one of:
- a Reference Signal (RS), a sounding signal (SRS), a synchronization signal (SS);
- a transmission over a physical channel (PSCCH/PSSCH).

Further to the third embodiment, the Reference Signal is one of:
- a Demodulation Reference Signal (DMRS);
- a Channel State Information Reference Signal (CSI-RS).

Further to the third embodiment, said transmission over said physical channel is one of:
- a Channel Quality Indicator (CQI) request over said radio link followed by a corresponding CQI reported by said second WTRU;
- a Sidelink Control Information (SCI)-only transmission followed by a Hybrid Automatic Repeat reQuest (HARQ) acknowledgement response.

Further to the third embodiment, said first WTRU determines an outage state on said radio link and declares SL-RLF under condition of at least one of the following events occurring:
- said first WTRU not detecting a response transmission above a quality threshold;
- said first WTRU receiving or decoding a response transmission with a property indicating that a quality metric determined by said second WTRU is below a threshold. In a further feature, the quality threshold is one of:
- said first WTRU not detecting a HARQ acknowledgement over a physical channel following said first set of at least one transmission;
  - said first WTRU not detecting a Channel State Information (CSI) over a transmission of a CSI-request as part of said first set of at least one transmission. In a further feature, the first WTRU, when declaring SL-RLF, transmits, to a gNB, information indicating said SL-RLF, said information comprising a data link layer (L2) destination identifier of the radio link.

Further to the third embodiment, said first WTRU determines an uptime state on said radio link under condition of at least one of the following events occurring:
- said first WTRU detecting a response transmission above a quality threshold;
- said first WTRU receiving or decoding a response transmission with a property indicating that a quality metric determined by said second WTRU is above a threshold. In a further feature, said first WTRU detecting a response transmission above a quality threshold comprises one of:
- the first WTRU detecting a Reference Signal requested as part of said first set of at least one transmission, being above a threshold;
- the first WTRU detecting a HARQ acknowledgement over a physical channel following said first set of at least one transmission;
- the first WTRU detecting Channel State Information over a physical channel following said first set of at least one transmission.

According to a fourth embodiment, there is described a first wireless receive-transmit unit device (WRTU), including at least one processor, a memory, and a transceiver, wherein, for determining a state of a radio link between said first WRTU device and a second WRTU device, the at least one processor is configured to perform a first set of at least one transmission over said radio link for a purpose of triggering, in response, a second set of at least one response transmission by said second WRTU device. The first set of at least one transmission comprising at least one of:
- a Reference Signal (RS), a sounding signal (SRS), a synchronization signal (SS);
- a transmission over a physical channel (PSCCH/PSSCH).

Further to the fourth embodiment, the Reference Signal is one of:
- a Demodulation Reference Signal (DMRS);
- a Channel State Information Reference Signal (CSI-RS).

Further to the fourth embodiment, the transmission over said physical channel is one of:
- a Channel Quality Indicator (CQI) request over said radio link followed by a corresponding CQI reported by said second WRTU device;
- a Sidelink Control Information (SCI)-only transmission followed by a Hybrid Automatic Repeat reQuest (HARQ) acknowledgement response.

Further to the fourth embodiment, said at least one processor is further configured to determine an outage state on said radio link and to declare SL-RLF under condition of at least one of the following events occurring:
- not detecting a response transmission above a quality threshold;
- receiving or decoding a response transmission with a property indicating that a quality metric determined by said second WRTU device is below a threshold. In a further feature, the quality threshold is one of:
- not detecting a HARQ acknowledgement over a physical channel following said first set of at least one transmission;
- not detecting a Channel State Information (CSI) over a transmission of a CSI-request as part of said first set of at least one transmission.

Further to the fourth embodiment, the at least one processor is further configured to determine an uptime state on said radio link under condition of at least one of the following events occurring:
- detecting a response transmission above a quality threshold;
- receiving or decoding a response transmission with a property indicating that a quality metric determined by said second WRTU device is above a threshold. In a further feature, said detecting a response transmission above a quality threshold comprises one of:
- detecting a Reference Signal requested as part of said first set of at least one transmission, being above a threshold;
- detecting a HARQ acknowledgement over a physical channel following said first set of at least one transmission;
- detecting Channel State Information over a physical channel following said first set of at least one transmission.

Further to the fourth embodiment, the at least one processor, when declaring SL-RLF, is further configured to transmit, to a gNB, information indicating said SL-RLF, said information comprising a data link layer (L2) destination identifier of the radio link.

According to a fifth embodiment, there is described a method for use in a first wireless transmit-receive unit (WTRU), the method including, upon detecting absence, during at least one period, of reception of data or of at least one signal associated with data transmission from a second WTRU:
- pausing, if running, a timer (T310) associated with Reference Signal (RS) based Radio Link Monitoring-Radio Link Failure (RLM-RLF);
- starting an inactivity timer (T3XX);

transmitting, to said second WTRU, a request for feedback transmission;
and while said inactivity timer is running, performing RLM-RLF based on reception of feedback transmission from said second WTRU:
under condition that a measure of said feedback transmission received from the second WTRU in reply to the request, is above a threshold, restarting said inactivity timer;
under condition that receipt of SCI associated with data transmission from said second WTRU is resumed, stopping said inactivity timer T3XX and resuming said timer T310 associated with RS-based RLM-RLF;
under condition of expiry of the inactivity timer, declaring Sidelink Radio Link Failure (SL-RLF).

Further to the fifth embodiment, the feedback transmission is Hybrid Automatic Repeat reQuest (HARQ) feedback under condition that a specific Sidelink Radio Bearer (SLRB) is activated for said data transmission. In a further feature, SL-RLF is declared under condition that said HARQ feedback not being received within an expected time instant (DTX), for n consecutive times from said starting said inactivity timer, and wherein said measure of said feedback transmission is a quality of said HARQ for a purpose of verifying said condition that said measure of said feedback transmission received from the second WTRU is above a threshold under condition that said HARQ feedback is received within said expected time instant.

Further to the fifth embodiment, the method further comprising said first WTRU sending an In Sync (IS) indication under condition of reception of data or of at said least one signal from said second WTRU during said at least one period, and sending an Out Of Sync (OOS) indication under condition of no reception of said at least one signal and no data from said second WTRU during said at least one period. In a further feature, said at least one signal is one of: Sidelink Control Information (SCI), transport block, Hybrid Automatic Repeat reQuest (HARQ) feedback, Demodulation Reference Signal (DMRS) of Physical Sidelink Control Channel (PSCCH), DMRS of Physical Sidelink Shared Channel (PSSCH).

Further to the fifth embodiment, the measure of said feedback transmission is one of a receipt of a Channel Quality Information (CQI) report, a receipt of at least one Hybrid Automatic Repeat reQuest (HARQ) acknowledgement (ACK), a distance between said first WTRU and said second WTRU, a Minimum Communication Range (MCR).

Further to the fifth embodiment, the first WTRU, when declaring SL-RLF, transmits, to a gNB, information indicating said SL-RLF, said information comprising a data link layer (L2) destination identifier of the Radio Link for which the SL-RLF is declared.

According to a sixth embodiment, there is described a first wireless receive-transmit unit (WRTU) device, the device including at least one processor, a memory, and a transceiver, wherein said at least one processor is configured to, upon detecting absence, during at least one period, of reception of data or of at least one signal associated with data transmission from a second WRTU device:
pause, if running, a timer (T310) associated with Reference Signal (RS) based Radio Link Monitoring-Radio Link Failure (RLM-RLF);
start an inactivity timer (T3XX);
transmit, to said second WRTU device, a request for feedback transmission;
and while said inactivity timer is running, perform RLM-RLF based on reception of feedback transmission from said second WRTU device:
under condition that a measure of said feedback transmission received from the second WRTU device in reply to the request, is above a threshold, restart said inactivity timer;
under condition that receipt of SCI associated with data transmission from said second WRTU device is resumed, stop said inactivity timer T3XX and resume said timer T310 associated with RS-based RLM-RLF;
And under condition of expiry of the inactivity timer, declare Sidelink Radio Link Failure (SL-RLF).

Further to the sixth embodiment, the feedback transmission is Hybrid Automatic Repeat reQuest (HARQ) feedback under condition that a specific Sidelink Radio Bearer (SLRB) is activated for said data transmission.

Further to the sixth embodiment, said at least one processor being further configured to send an In Sync (IS) indication under condition of reception of data or of at said least one signal from said second WRTU device during said at least one period, to send an Out Of Sync (OOS) indication under condition of no reception of said at least one signal and no data from said second WRTU device during said at least one period. In a further feature, the at least one signal is one of: Sidelink Control Information (SCI), transport block, Hybrid Automatic Repeat reQuest (HARQ) feedback, Demodulation Reference Signal (DMRS) of Physical Sidelink Control Channel (PSCCH), DMRS of Physical Sidelink Shared Channel (PSSCH).

According to a thirty-fourth embodiment that may be combined with any of the thirtieth to thirty-third embodiments, the measure of said feedback transmission is one of a receipt of a Channel Quality Information (CQI) report, of a receipt of at least one Hybrid Automatic Repeat reQuest (HARQ) acknowledgement (ACK), a distance between said first WRTU device and said second WRTU device, a Minimum Communication Range (MCR).

Further to the sixth embodiment, the at least one processor is further configured to declare SL-RLF under condition that said HARQ feedback not being received within an expected time instant (DTX), for n consecutive times from said starting said inactivity timer, and wherein said measure of said feedback transmission is a quality of said HARQ for a purpose of verifying said condition that said measure of said feedback transmission received from the second WRTU device is above a threshold under condition that said HARQ feedback is received within said expected time instant.

Further to the sixth embodiment, the at least one processor is further configured to, when declaring SL-RLF, to transmit, to a gNB, information indicating said SL-RLF, said information comprising a data link layer (L2) destination identifier of the Radio Link for which the SL-RLF is declared.

According to a seventh embodiment, there is described a method for use in a first wireless transmit-receive unit (WTRU), the method including declaring, for a communication link with a second WTRU, Sidelink Radio Link Failure (SL-RLF) based on a combination of events:
a first event, E1, being a lack of received acknowledgements (ACK/NACK) feedback on Hybrid Automatic Repeat reQuest (HARQ) requests transmitted by the first WTRU to the second WTRU; and
a second event, E2, being a NACK received in response to a data transmission by said first WTRU to said second WTRU.

According to a thirty-eighth embodiment that may be combined with the thirty-seventh embodiment, the first WTRU declares recovery from a SL-RLF under the following conditions:

receipt of ACK or NACK feedback on said HARQ requests transmitted by the first WTRU to the second WTRU; and receipt of ACK in response to a data transmission by said first WTRU to said second WTRU.

Further to the seventh embodiment, the first WTRU, when declaring SL-RLF, transmits, to a gNB, information indicating said SL-RLF, said information comprising a data link layer (L2) destination identifier of the communication link.

According to an eighth embodiment, there is described a first wireless receiver-transmitter unit (WRTU) device including at least one processor, a memory, and a transceiver, wherein said at least one processor is configured to declare, for a communication link with a second WRTU device, Sidelink Radio Link Failure (SL-RLF) based on a combination of events:

a first event, E1, being a lack of received acknowledgements (ACK/NACK) feedback on Hybrid Automatic Repeat reQuest (HARQ) requests transmitted by the first WRTU device to the second WRTU device; and a second event, E2, being a NACK received in response to a data transmission by said first WRTU device to said second WRTU device.

Further to the eighth embodiment, the at least one processor is further configured to declare recovery from a SL-RLF under the following conditions:

receipt of ACK or NACK feedback on said HARQ requests transmitted by the first WRTU device to the second WRTU device, and receipt of ACK in response to a data transmission by said first WRTU device to said second WRTU device.

Further to the eighth embodiment, the first WRTU device, when declaring SL-RLF, transmits, to a gNB, information indicating said SL-RLF, said information comprising a data link layer (L2) destination identifier of the communication link.

Unless otherwise stated explicitly herein, a feature of one embodiment may be combined with another embodiment. Additionally, embodiments and/or features of embodiments may be combined or concatenated to achieve further advantageous results.

BRIEF DESCRIPTION OF THE DRAWINGS

A more detailed understanding may be had from the detailed description below, given by way of example in conjunction with drawings appended hereto. Figures in the description are examples. As such, the figures and the detailed description are not to be considered limiting, and other equally effective examples are possible and likely. Furthermore, like reference numerals in the figures indicate like elements, and wherein.

DETAILED DESCRIPTION

Example Networks for Implementation of the Embodiments

Figure 1A:
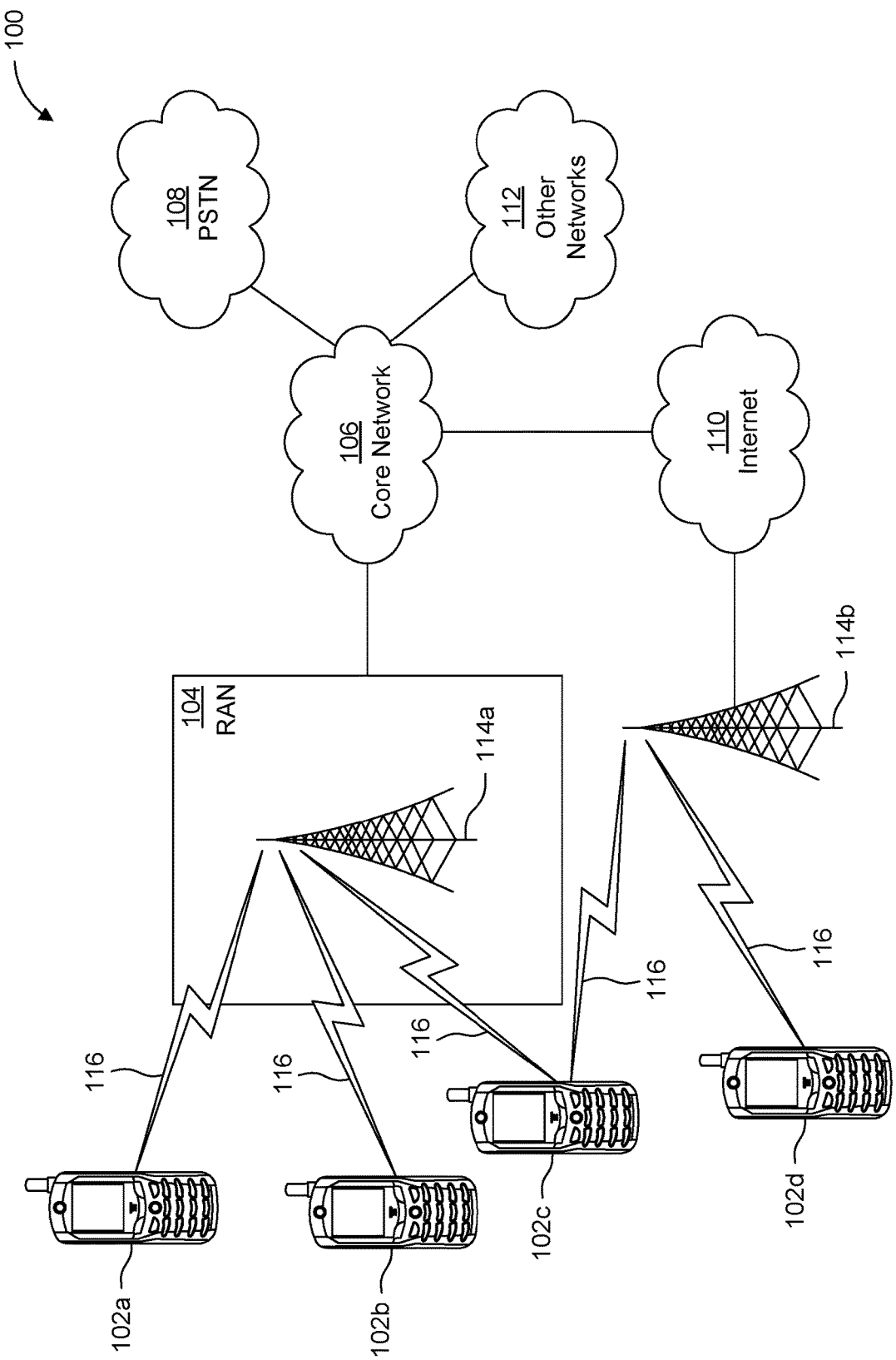
FIG. 1A is a system diagram illustrating an example communications system in which one or more disclosed embodiments may be implemented.

FIG. 1A is a diagram illustrating an example communications system 100 in which one or more disclosed embodiments may be implemented. The communications system 100 may be a multiple access system that provides content, such as voice, data, video, messaging, broadcast, etc., to multiple wireless users. The communications system 100 may enable multiple wireless users to access such content through the sharing of system resources, including wireless bandwidth. For example, the communications systems 100 may employ one or more channel access methods, such as code division multiple access (CDMA), time division multiple access (TDMA), frequency division multiple access (FDMA), orthogonal FDMA (OFDMA), single-carrier FDMA (SC-FDMA), zero-tail unique-word DFT-Spread OFDM (ZT UW DTS-s OFDM), unique word OFDM (UW-OFDM), resource block-filtered OFDM, filter bank multicarrier (FBMC), and the like.

As shown in FIG. 1A, the communications system 100 may include wireless transmit/receive units (WTRUs) 102*a*, 102*b*, 102*c*, 102*d*, a RAN 104/113, a CN 106/115, a public switched telephone network (PSTN) 108, the Internet 110, and other networks 112, though it will be appreciated that the disclosed embodiments contemplate any number of WTRUs, base stations, networks, and/or network elements. Each of the WTRUs 102*a*, 102*b*, 102*c*, 102*d* may be any type of device configured to operate and/or communicate in a wireless environment. By way of example, the WTRUs 102*a*, 102*b*, 102*c*, 102*d*, any of which may be referred to as a "station" and/or a "STA", may be configured to transmit and/or receive wireless signals and may include a user equipment (UE), a mobile station, a fixed or mobile subscriber unit, a subscription-based unit, a pager, a cellular telephone, a personal digital assistant (PDA), a smartphone, a laptop, a netbook, a personal computer, a wireless sensor, a hotspot or Mi-Fi device, an Internet of Things (IoT) device, a watch or other wearable, a head-mounted display (HMD), a vehicle, a drone, a medical device and applications (e.g., remote surgery), an industrial device and applications (e.g., a robot and/or other wireless devices operating in an industrial and/or an automated processing chain contexts), a consumer electronics device, a device operating on commercial and/or industrial wireless networks, and the like. Any of the WTRUs 102a, 102b, 102c and 102d may be interchangeably referred to as a UE.

The communications systems 100 may also include a base station 114a and/or a base station 114b. Each of the base stations 114a, 114b may be any type of device configured to wirelessly interface with at least one of the WTRUs 102a, 102b, 102c, 102d to facilitate access to one or more communication networks, such as the CN 106/115, the Internet 110, and/or the other networks 112. By way of example, the base stations 114a, 114b may be a base transceiver station (BTS), a Node-B, an eNode B, a Home Node B, a Home eNode B, a gNB, a NR NodeB, a site controller, an access point (AP), a wireless router, and the like. While the base stations 114a, 114b are each depicted as a single element, it will be appreciated that the base stations 114a, 114b may include any number of interconnected base stations and/or network elements.

The base station 114a may be part of the RAN 104/113, which may also include other base stations and/or network elements (not shown), such as a base station controller (BSC), a radio network controller (RNC), relay nodes, etc. The base station 114a and/or the base station 114b may be configured to transmit and/or receive wireless signals on one or more carrier frequencies, which may be referred to as a cell (not shown). These frequencies may be in licensed spectrum, unlicensed spectrum, or a combination of licensed and unlicensed spectrum. A cell may provide coverage for a wireless service to a specific geographical area that may be relatively fixed or that may change over time. The cell may further be divided into cell sectors. For example, the cell associated with the base station 114a may be divided into three sectors. Thus, in one embodiment, the base station 114a may include three transceivers, i.e., one for each sector of the cell. In an embodiment, the base station 114a may employ multiple-input multiple output (MIMO) technology and may utilize multiple transceivers for each sector of the cell. For example, beamforming may be used to transmit and/or receive signals in desired spatial directions.

The base stations 114a, 114b may communicate with one or more of the WTRUs 102a, 102b, 102c, 102d over an air interface 116, which may be any suitable wireless communication link (e.g., radio frequency (RF), microwave, centimeter wave, micrometer wave, infrared (IR), ultraviolet (UV), visible light, etc.). The air interface 116 may be established using any suitable radio access technology (RAT).

More specifically, as noted above, the communications system 100 may be a multiple access system and may employ one or more channel access schemes, such as CDMA, TDMA, FDMA, OFDMA, SC-FDMA, and the like. For example, the base station 114a in the RAN 104/113 and the WTRUs 102a, 102b, 102c may implement a radio technology such as Universal Mobile Telecommunications System (UMTS) Terrestrial Radio Access (UTRA), which may establish the air interface 115/116/117 using wideband CDMA (WCDMA). WCDMA may include communication protocols such as High-Speed Packet Access (HSPA) and/or Evolved HSPA (HSPA+). HSPA may include High-Speed Downlink (DL) Packet Access (HSDPA) and/or High-Speed UL Packet Access (HSUPA).

In an embodiment, the base station 114a and the WTRUs 102a, 102b, 102c may implement a radio technology such as Evolved UMTS Terrestrial Radio Access (E-UTRA), which may establish the air interface 116 using Long Term Evolution (LTE) and/or LTE-Advanced (LTE-A) and/or LTE-Advanced Pro (LTE-A Pro).

In an embodiment, the base station 114a and the WTRUs 102a, 102b, 102c may implement a radio technology such as NR Radio Access, which may establish the air interface 116 using New Radio (NR).

In an embodiment, the base station 114a and the WTRUs 102a, 102b, 102c may implement multiple radio access technologies. For example, the base station 114a and the WTRUs 102a, 102b, 102c may implement LTE radio access and NR radio access together, for instance using dual connectivity (DC) principles. Thus, the air interface utilized by WTRUs 102a, 102b, 102c may be characterized by multiple types of radio access technologies and/or transmissions sent to/from multiple types of base stations (e.g., a eNB and a gNB).

In other embodiments, the base station 114a and the WTRUs 102a, 102b, 102c may implement radio technologies such as IEEE 802.11 (i.e., Wireless Fidelity (WiFi), IEEE 802.16 (i.e., Worldwide Interoperability for Microwave Access (WiMAX)), CDMA2000, CDMA2000 1x, CDMA2000 EV-DO, Interim Standard 2000 (IS-2000), Interim Standard 95 (IS-95), Interim Standard 856 (IS-856), Global System for Mobile communications (GSM), Enhanced Data rates for GSM Evolution (EDGE), GSM EDGE (GERAN), and the like.

The base station 114b in FIG. 1A may be a wireless router, Home Node B, Home eNode B, or access point, for example, and may utilize any suitable RAT for facilitating wireless connectivity in a localized area, such as a place of business, a home, a vehicle, a campus, an industrial facility, an air corridor (e.g., for use by drones), a roadway, and the like. In one embodiment, the base station 114b and the WTRUs 102c, 102d may implement a radio technology such as IEEE 802.11 to establish a wireless local area network (WLAN). In an embodiment, the base station 114b and the WTRUs 102c, 102d may implement a radio technology such as IEEE 802.15 to establish a wireless personal area network (WPAN). In yet another embodiment, the base station 114b and the WTRUs 102c, 102d may utilize a cellular-based RAT (e.g., WCDMA, CDMA2000, GSM, LTE, LTE-A, LTE-A Pro, NR etc.) to establish a picocell or femtocell. As shown in FIG. 1A, the base station 114b may have a direct connection to the Internet 110. Thus, the base station 114b may not be required to access the Internet 110 via the CN 106/115.

The RAN 104/113 may be in communication with the CN 106/115, which may be any type of network configured to provide voice, data, applications, and/or voice over internet protocol (VoIP) services to one or more of the WTRUs 102a, 102b, 102c, 102d. The data may have varying quality of service (QoS) requirements, such as differing throughput requirements, latency requirements, error tolerance requirements, reliability requirements, data throughput requirements, mobility requirements, and the like. The CN 106/115 may provide call control, billing services, mobile location-based services, pre-paid calling, Internet connectivity, video distribution, etc., and/or perform high-level security functions, such as user authentication. Although not shown in FIG. 1A, it will be appreciated that the RAN 104/113 and/or the CN 106/115 may be in direct or indirect communication with other RANs that employ the same RAT as the RAN 104/113 or a different RAT. For example, in addition to being connected to the RAN 104/113, which may be utilizing a NR radio technology, the CN 106/115 may also be in communication with another RAN (not shown) employing a GSM, UMTS, CDMA 2000, WiMAX, E-UTRA, or WiFi radio technology.

The CN 106/115 may also serve as a gateway for the WTRUs 102a, 102b, 102c, 102d to access the PSTN 108, the Internet 110, and/or the other networks 112. The PSTN 108 may include circuit-switched telephone networks that provide plain old telephone service (POTS). The Internet 110 may include a global system of interconnected computer networks and devices that use common communication protocols, such as the transmission control protocol (TCP), user datagram protocol (UDP) and/or the internet protocol (IP) in the TCP/IP internet protocol suite. The networks 112 may include wired and/or wireless communications networks owned and/or operated by other service providers. For example, the networks 112 may include another CN connected to one or more RANs, which may employ the same RAT as the RAN 104/113 or a different RAT.

Some or all of the WTRUs 102a, 102b, 102c, 102d in the communications system 100 may include multi-mode capabilities (e.g., the WTRUs 102a, 102b, 102c, 102d may include multiple transceivers for communicating with different wireless networks over different wireless links). For example, the WTRU 102c shown in FIG. 1A may be configured to communicate with the base station 114a, which may employ a cellular-based radio technology, and with the base station 114b, which may employ an IEEE 802 radio technology.

Figure 1B:
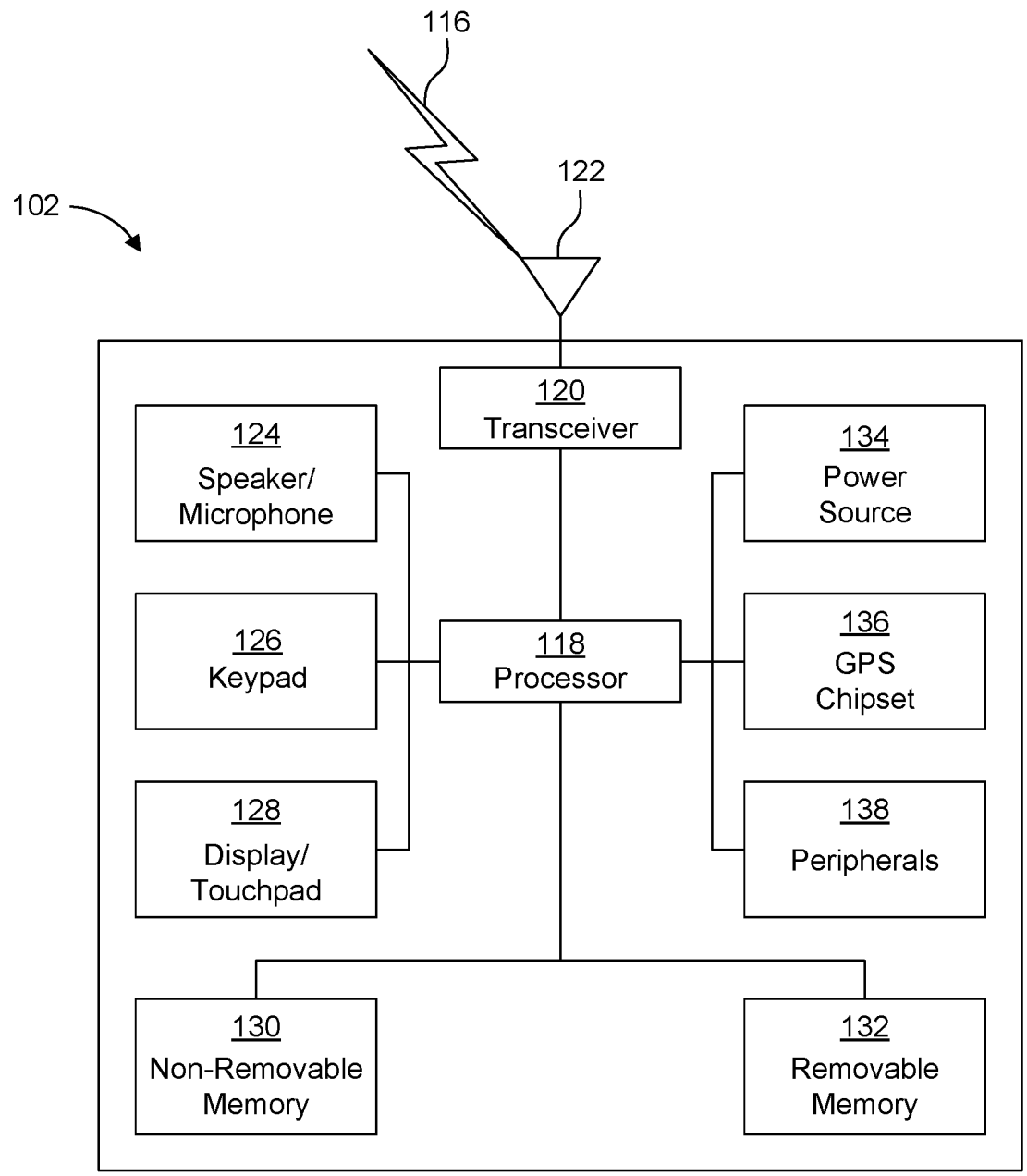
FIG. 1B is a system diagram illustrating an example wireless transmit/receive unit (WTRU) that may be used within the communications system illustrated in FIG. 1A according to an embodiment.

FIG. 1B is a system diagram illustrating an example WTRU 102. As shown in FIG. 1B, the WTRU 102 may include a processor 118, a transceiver 120, a transmit/receive element 122, a speaker/microphone 124, a keypad 126, a display/touchpad 128, non-removable memory 130, removable memory 132, a power source 134, a global positioning system (GPS) chipset 136, and/or other peripherals 138, among others. It will be appreciated that the WTRU 102 may include any sub-combination of the foregoing elements while remaining consistent with an embodiment.

The processor 118 may be a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Arrays (FPGAs) circuits, any other type of integrated circuit (IC), a state machine, and the like. The processor 118 may perform signal coding, data processing, power control, input/output processing, and/or any other functionality that enables the WTRU 102 to operate in a wireless environment. The processor 118 may be coupled to the transceiver 120, which may be coupled to the transmit/receive element 122. While FIG. 1B depicts the processor 118 and the transceiver 120 as separate components, it will be appreciated that the processor 118 and the transceiver 120 may be integrated together in an electronic package or chip.

The transmit/receive element 122 may be configured to transmit signals to, or receive signals from, a base station (e.g., the base station 114a) over the air interface 116. For example, in one embodiment, the transmit/receive element 122 may be an antenna configured to transmit and/or receive RF signals. In an embodiment, the transmit/receive element 122 may be an emitter/detector configured to transmit and/or receive IR, UV, or visible light signals, for example. In yet another embodiment, the transmit/receive element 122 may be configured to transmit and/or receive both RF and light signals. It will be appreciated that the transmit/receive element 122 may be configured to transmit and/or receive any combination of wireless signals.

Although the transmit/receive element 122 is depicted in FIG. 1B as a single element, the WTRU 102 may include any number of transmit/receive elements 122. More specifically, the WTRU 102 may employ MIMO technology. Thus, in one embodiment, the WTRU 102 may include two or more transmit/receive elements 122 (e.g., multiple antennas) for transmitting and receiving wireless signals over the air interface 116.

The transceiver 120 may be configured to modulate the signals that are to be transmitted by the transmit/receive element 122 and to demodulate the signals that are received by the transmit/receive element 122. As noted above, the WTRU 102 may have multi-mode capabilities. Thus, the transceiver 120 may include multiple transceivers for enabling the WTRU 102 to communicate via multiple RATs, such as NR and IEEE 802.11, for example.

The processor 118 of the WTRU 102 may be coupled to, and may receive user input data from, the speaker/microphone 124, the keypad 126, and/or the display/touchpad 128 (e.g., a liquid crystal display (LCD) display unit or organic light-emitting diode (OLED) display unit). The processor 118 may also output user data to the speaker/microphone 124, the keypad 126, and/or the display/touchpad 128. In addition, the processor 118 may access information from, and store data in, any type of suitable memory, such as the non-removable memory 130 and/or the removable memory 132. The non-removable memory 130 may include random-access memory (RAM), read-only memory (ROM), a hard disk, or any other type of memory storage device. The removable memory 132 may include a subscriber identity module (SIM) card, a memory stick, a secure digital (SD) memory card, and the like. In other embodiments, the processor 118 may access information from, and store data in, memory that is not physically located on the WTRU 102, such as on a server or a home computer (not shown).

The processor 118 may receive power from the power source 134, and may be configured to distribute and/or control the power to the other components in the WTRU 102. The power source 134 may be any suitable device for powering the WTRU 102. For example, the power source 134 may include one or more dry cell batteries (e.g., nickel-cadmium (NiCd), nickel-zinc (NiZn), nickel metal hydride (NiMH), lithium-ion (Li-ion), etc.), solar cells, fuel cells, and the like.

The processor 118 may also be coupled to the GPS chipset 136, which may be configured to provide location information (e.g., longitude and latitude) regarding the current location of the WTRU 102. In addition to, or in lieu of, the information from the GPS chipset 136, the WTRU 102 may receive location information over the air interface 116 from a base station (e.g., base stations 114a, 114b) and/or determine its location based on the timing of the signals being received from two or more nearby base stations. It will be appreciated that the WTRU 102 may acquire location information by way of any suitable location-determination method while remaining consistent with an embodiment.

The processor 118 may further be coupled to other peripherals 138, which may include one or more software and/or hardware modules that provide additional features, functionality and/or wired or wireless connectivity. For example, the peripherals 138 may include an accelerometer, an e-compass, a satellite transceiver, a digital camera (for photographs and/or video), a universal serial bus (USB) port, a vibration device, a television transceiver, a hands free headset, a Bluetooth® module, a frequency modulated (FM)

radio unit, a digital music player, a media player, a video game player module, an Internet browser, a Virtual Reality and/or Augmented Reality (VR/AR) device, an activity tracker, and the like. The peripherals 138 may include one or more sensors, the sensors may be one or more of a gyroscope, an accelerometer, a hall effect sensor, a magnetometer, an orientation sensor, a proximity sensor, a temperature sensor, a time sensor; a geolocation sensor; an altimeter, a light sensor, a touch sensor, a magnetometer, a barometer, a gesture sensor, a biometric sensor, and/or a humidity sensor.

The WTRU 102 may include a full duplex radio for which transmission and reception of some or all of the signals (e.g., associated with particular subframes for both the UL (e.g., for transmission) and downlink (e.g., for reception) may be concurrent and/or simultaneous. The full duplex radio may include an interference management unit to reduce and or substantially eliminate self-interference via either hardware (e.g., a choke) or signal processing via a processor (e.g., a separate processor (not shown) or via processor 118). In an embodiment, the WTRU 102 may include a half-duplex radio for which transmission and reception of some or all of the signals (e.g., associated with particular subframes for either the UL (e.g., for transmission) or the downlink (e.g., for reception)).

Figure 1C:
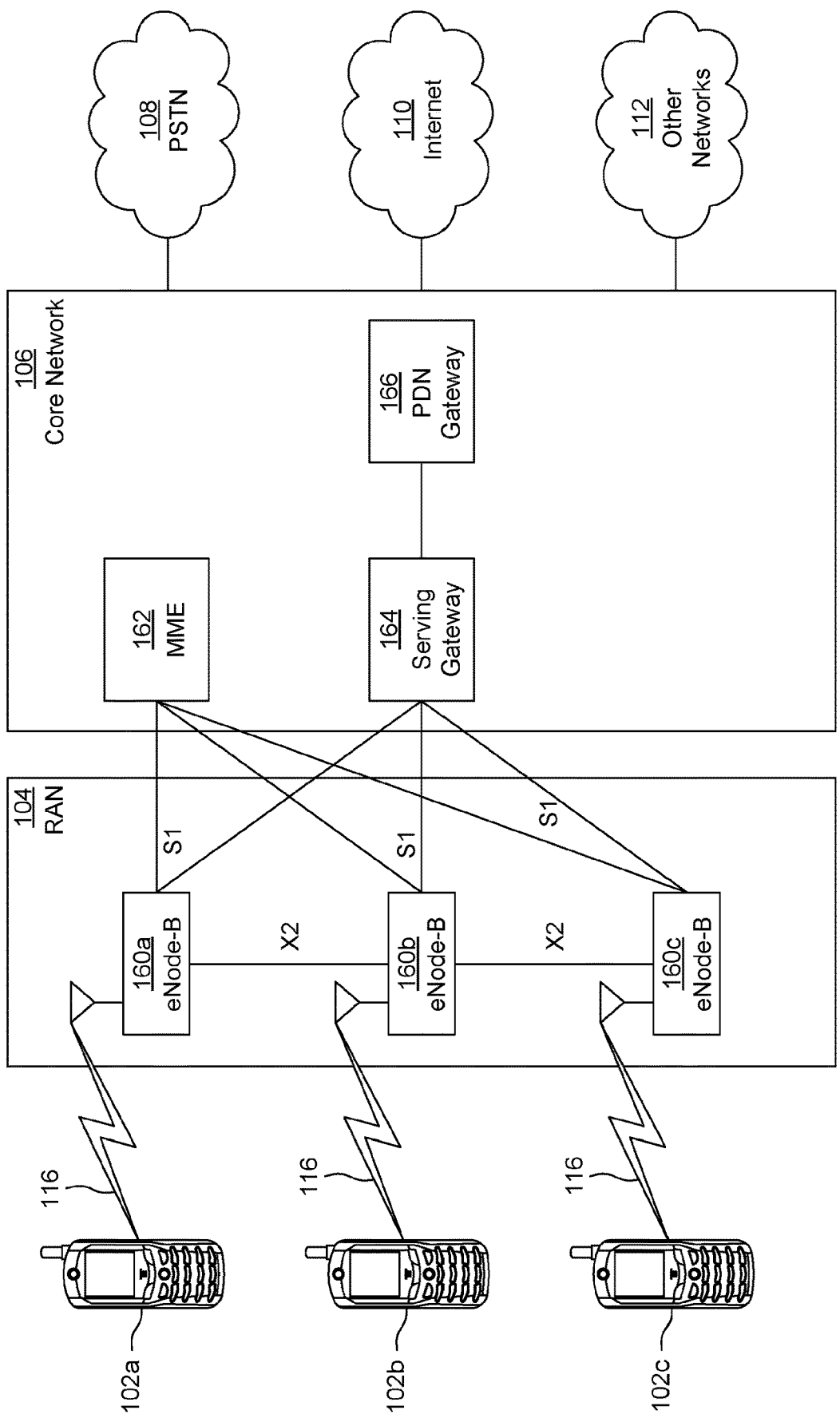
FIG. 1C is a system diagram illustrating an example radio access network (RAN) and an example core network (CN) that may be used within the communications system illustrated in FIG. 1A according to an embodiment.

FIG. 1C is a system diagram illustrating the RAN 104 and the CN 106 according to an embodiment. As noted above, the RAN 104 may employ an E-UTRA radio technology to communicate with the WTRUs 102a, 102b, 102c over the air interface 116. The RAN 104 may also be in communication with the CN 106.

The RAN 104 may include eNode-Bs 160a, 160b, 160c, though it will be appreciated that the RAN 104 may include any number of eNode-Bs while remaining consistent with an embodiment. The eNode-Bs 160a, 160b, 160c may each include one or more transceivers for communicating with the WTRUs 102a, 102b, 102c over the air interface 116. In one embodiment, the eNode-Bs 160a, 160b, 160c may implement MIMO technology. Thus, the eNode-B 160a, for example, may use multiple antennas to transmit wireless signals to, and/or receive wireless signals from, the WTRU 102a.

Each of the eNode-Bs 160a, 160b, 160c may be associated with a particular cell (not shown) and may be configured to handle radio resource management decisions, handover decisions, scheduling of users in the UL and/or DL, and the like. As shown in FIG. 10, the eNode-Bs 160a, 160b, 160c may communicate with one another over an X2 interface.

The CN 106 shown in FIG. 1C may include a mobility management entity (MME) 162, a serving gateway (SGW) 164, and a packet data network (PDN) gateway (or PGW) 166. While each of the foregoing elements are depicted as part of the CN 106, it will be appreciated that any of these elements may be owned and/or operated by an entity other than the CN operator.

The MME 162 may be connected to each of the eNode-Bs 162a, 162b, 162c in the RAN 104 via an S1 interface and may serve as a control node. For example, the MME 162 may be responsible for authenticating users of the WTRUs 102a, 102b, 102c, bearer activation/deactivation, selecting a particular serving gateway during an initial attach of the WTRUs 102a, 102b, 102c, and the like. The MME 162 may provide a control plane function for switching between the RAN 104 and other RANs (not shown) that employ other radio technologies, such as GSM and/or WCDMA.

The SGW 164 may be connected to each of the eNode Bs 160a, 160b, 160c in the RAN 104 via the S1 interface. The SGW 164 may generally route and forward user data packets to/from the WTRUs 102a, 102b, 102c. The SGW 164 may perform other functions, such as anchoring user planes during inter-eNode B handovers, triggering paging when DL data is available for the WTRUs 102a, 102b, 102c, managing and storing contexts of the WTRUs 102a, 102b, 102c, and the like.

The SGW 164 may be connected to the PGW 166, which may provide the WTRUs 102a, 102b, 102c with access to packet-switched networks, such as the Internet 110, to facilitate communications between the WTRUs 102a, 102b, 102c and IP-enabled devices.

The CN 106 may facilitate communications with other networks. For example, the CN 106 may provide the WTRUs 102a, 102b, 102c with access to circuit-switched networks, such as the PSTN 108, to facilitate communications between the WTRUs 102a, 102b, 102c and traditional land-line communications devices. For example, the CN 106 may include, or may communicate with, an IP gateway (e.g., an IP multimedia subsystem (IMS) server) that serves as an interface between the CN 106 and the PSTN 108. In addition, the CN 106 may provide the WTRUs 102a, 102b, 102c with access to the other networks 112, which may include other wired and/or wireless networks that are owned and/or operated by other service providers.

Although the WTRU is described in FIGS. 1A-1D as a wireless terminal, it is contemplated that in certain representative embodiments that such a terminal may use (e.g., temporarily or permanently) wired communication interfaces with the communication network.

In representative embodiments, the other network 112 may be a WLAN.

A WLAN in Infrastructure Basic Service Set (BSS) mode may have an Access Point (AP) for the BSS and one or more stations (STAs) associated with the AP. The AP may have an access or an interface to a Distribution System (DS) or another type of wired/wireless network that carries traffic in to and/or out of the BSS. Traffic to STAs that originates from outside the BSS may arrive through the AP and may be delivered to the STAs. Traffic originating from STAs to destinations outside the BSS may be sent to the AP to be delivered to respective destinations. Traffic between STAs within the BSS may be sent through the AP, for example, where the source STA may send traffic to the AP and the AP may deliver the traffic to the destination STA. The traffic between STAs within a BSS may be considered and/or referred to as peer-to-peer traffic. The peer-to-peer traffic may be sent between (e.g., directly between) the source and destination STAs with a direct link setup (DLS). In certain representative embodiments, the DLS may use an 802.11e DLS or an 802.11z tunneled DLS (TDLS). A WLAN using an Independent BSS (IBSS) mode may not have an AP, and the STAs (e.g., all of the STAs) within or using the IBSS may communicate directly with each other. The IBSS mode of communication may sometimes be referred to herein as an "ad-hoc" mode of communication.

When using the 802.11ac infrastructure mode of operation or a similar mode of operations, the AP may transmit a beacon on a fixed channel, such as a primary channel. The primary channel may be a fixed width (e.g., 20 MHz wide bandwidth) or a dynamically set width via signaling. The primary channel may be the operating channel of the BSS and may be used by the STAs to establish a connection with the AP. In certain representative embodiments, Carrier Sense Multiple Access with Collision Avoidance (CSMA/CA) may be implemented, for example in in 802.11 systems. For CSMA/CA, the STAs (e.g., every STA), including the AP, may sense the primary channel. If the primary channel is sensed/detected and/or determined to be busy by a particular STA, the particular STA may back off. One STA (e.g., only one station) may transmit at any given time in a given BSS.

High Throughput (HT) STAs may use a 40 MHz wide channel for communication, for example, via a combination of the primary 20 MHz channel with an adjacent or nonadjacent 20 MHz channel to form a 40 MHz wide channel.

Very High Throughput (VHT) STAs may support 20 MHz, 40 MHz, 80 MHz, and/or 160 MHz wide channels. The 40 MHz, and/or 80 MHz, channels may be formed by combining contiguous 20 MHz channels. A 160 MHz channel may be formed by combining 8 contiguous 20 MHz channels, or by combining two non-contiguous 80 MHz channels, which may be referred to as an 80+80 configuration. For the 80+80 configuration, the data, after channel encoding, may be passed through a segment parser that may divide the data into two streams. Inverse Fast Fourier Transform (IFFT) processing, and time domain processing, may be done on each stream separately. The streams may be mapped on to the two 80 MHz channels, and the data may be transmitted by a transmitting STA. At the receiver of the receiving STA, the above described operation for the 80+80 configuration may be reversed, and the combined data may be sent to the Medium Access Control (MAC).

Sub 1 GHz modes of operation are supported by 802.11af and 802.11ah. The channel operating bandwidths, and carriers, are reduced in 802.11af and 802.11ah relative to those used in 802.11n, and 802.11ac. 802.11af supports 5 MHz, 10 MHz and 20 MHz bandwidths in the TV White Space (TVWS) spectrum, and 802.11ah supports 1 MHz, 2 MHz, 4 MHz, 8 MHz, and 16 MHz bandwidths using non-TVWS spectrum. According to a representative embodiment, 802.11ah may support Meter Type Control/Machine-Type Communications, such as MTC devices in a macro coverage area. MTC devices may have certain capabilities, for example, limited capabilities including support for (e.g., only support for) certain and/or limited bandwidths. The MTC devices may include a battery with a battery life above a threshold (e.g., to maintain a very long battery life).

WLAN systems, which may support multiple channels, and channel bandwidths, such as 802.11n, 802.11ac, 802.11af, and 802.11ah, include a channel which may be designated as the primary channel. The primary channel may have a bandwidth equal to the largest common operating bandwidth supported by all STAs in the BSS. The bandwidth of the primary channel may be set and/or limited by a STA, from among all STAs in operating in a BSS, which supports the smallest bandwidth operating mode. In the example of 802.11ah, the primary channel may be 1 MHz wide for STAs (e.g., MTC type devices) that support (e.g., only support) a 1 MHz mode, even if the AP, and other STAs in the BSS support 2 MHz, 4 MHz, 8 MHz, 16 MHz, and/or other channel bandwidth operating modes. Carrier sensing and/or Network Allocation Vector (NAV) settings may depend on the status of the primary channel. If the primary channel is busy, for example, due to a STA (which supports only a 1 MHz operating mode), transmitting to the AP, the entire available frequency bands may be considered busy even though a majority of the frequency bands remains idle and may be available.

In the United States, the available frequency bands, which may be used by 802.11ah, are from 902 MHz to 928 MHz. In Korea, the available frequency bands are from 917.5 MHz to 923.5 MHz. In Japan, the available frequency bands are from 916.5 MHz to 927.5 MHz. The total bandwidth available for 802.11ah is 6 MHz to 26 MHz depending on the country code.

Figure 1D:
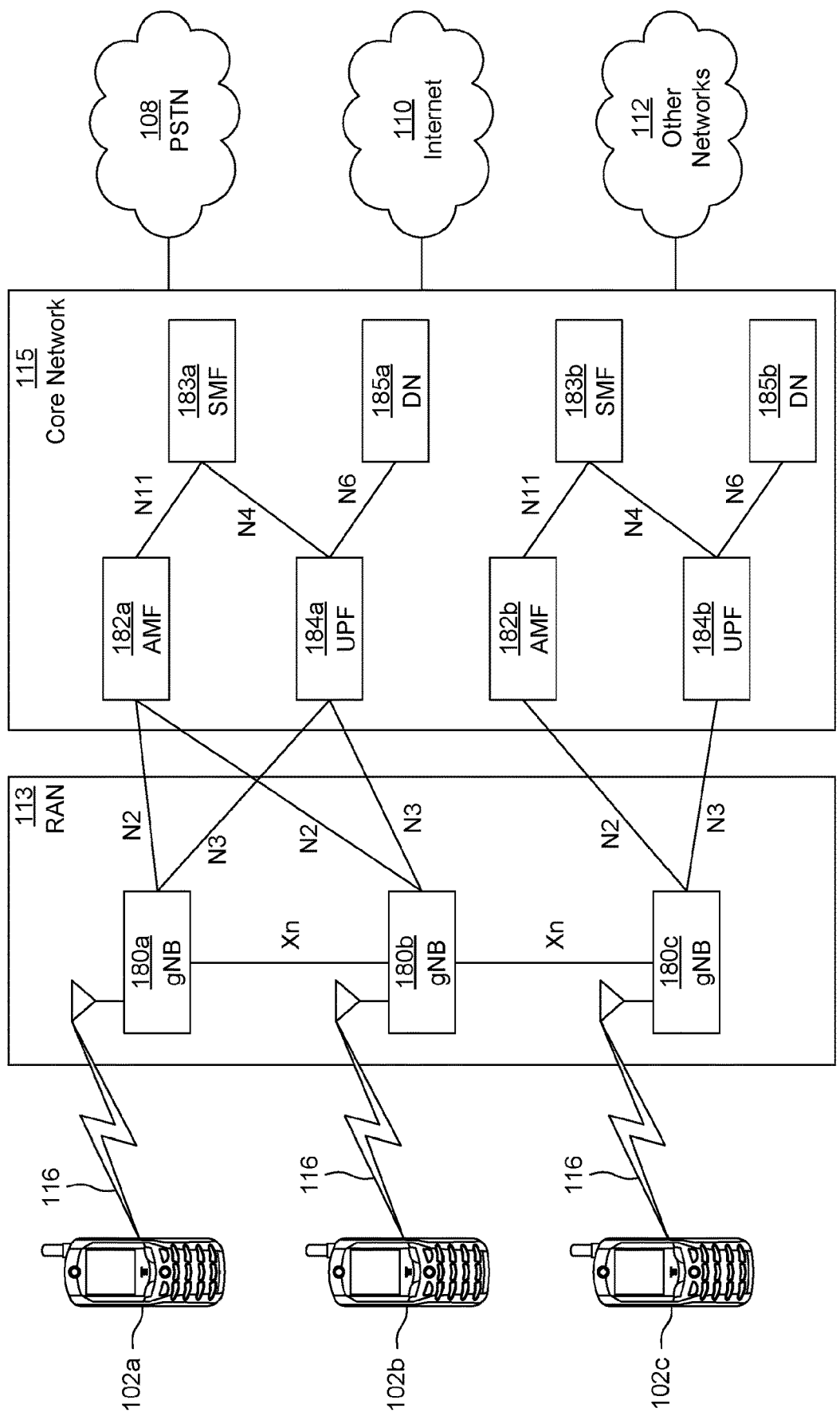
FIG. 1D is a system diagram illustrating a further example RAN and a further example CN that may be used within the communications system illustrated in FIG. 1A according to an embodiment.

FIG. 1D is a system diagram illustrating the RAN 113 and the CN 115 according to an embodiment. As noted above, the RAN 113 may employ an NR radio technology to communicate with the WTRUs 102a, 102b, 102c over the air interface 116. The RAN 113 may also be in communication with the CN 115.

The RAN 113 may include gNBs 180a, 180b, 180c, though it will be appreciated that the RAN 113 may include any number of gNBs while remaining consistent with an embodiment. The gNBs 180a, 180b, 180c may each include one or more transceivers for communicating with the WTRUs 102a, 102b, 102c over the air interface 116. In one embodiment, the gNBs 180a, 180b, 180c may implement MIMO technology. For example, gNBs 180a, 108b may utilize beamforming to transmit signals to and/or receive signals from the gNBs 180a, 180b, 180c. Thus, the gNB 180a, for example, may use multiple antennas to transmit wireless signals to, and/or receive wireless signals from, the WTRU 102a. In an embodiment, the gNBs 180a, 180b, 180c may implement carrier aggregation technology. For example, the gNB 180a may transmit multiple component carriers to the WTRU 102a (not shown). A subset of these component carriers may be on unlicensed spectrum while the remaining component carriers may be on licensed spectrum. In an embodiment, the gNBs 180a, 180b, 180c may implement Coordinated Multi-Point (CoMP) technology. For example, WTRU 102a may receive coordinated transmissions from gNB 180a and gNB 180b (and/or gNB 180c).

The WTRUs 102a, 102b, 102c may communicate with gNBs 180a, 180b, 180c using transmissions associated with a scalable numerology. For example, the OFDM symbol spacing and/or OFDM subcarrier spacing may vary for different transmissions, different cells, and/or different portions of the wireless transmission spectrum. The WTRUs 102a, 102b, 102c may communicate with gNBs 180a, 180b, 180c using subframe or transmission time intervals (TTIs) of various or scalable lengths (e.g., containing varying number of OFDM symbols and/or lasting varying lengths of absolute time).

The gNBs 180a, 180b, 180c may be configured to communicate with the WTRUs 102a, 102b, 102c in a standalone configuration and/or a non-standalone configuration. In the standalone configuration, WTRUs 102a, 102b, 102c may communicate with gNBs 180a, 180b, 180c without also accessing other RANs (e.g., such as eNode-Bs 160a, 160b, 160c). In the standalone configuration, WTRUs 102a, 102b, 102c may utilize one or more of gNBs 180a, 180b, 180c as a mobility anchor point. In the standalone configuration, WTRUs 102a, 102b, 102c may communicate with gNBs 180a, 180b, 180c using signals in an unlicensed band. In a non-standalone configuration WTRUs 102a, 102b, 102c may communicate with/connect to gNBs 180a, 180b, 180c while also communicating with/connecting to another RAN such as eNode-Bs 160a, 160b, 160c. For example, WTRUs 102a, 102b, 102c may implement DC principles to communicate with one or more gNBs 180a, 180b, 180c and one or more eNode-Bs 160a, 160b, 160c substantially simultaneously. In the non-standalone configuration, eNode-Bs 160a, 160b, 160c may serve as a mobility anchor for WTRUs 102a, 102b, 102c and gNBs 180a, 180b, 180c may provide additional coverage and/or throughput for servicing WTRUs 102a, 102b, 102c.

Each of the gNBs 180a, 180b, 180c may be associated with a particular cell (not shown) and may be configured to handle radio resource management decisions, handover decisions, scheduling of users in the UL and/or DL, support of network slicing, dual connectivity, interworking between NR and E-UTRA, routing of user plane data towards User Plane Function (UPF) 184*a*, 184*b*, routing of control plane information towards Access and Mobility Management Function (AMF) 182*a*, 182*b* and the like. As shown in FIG. 1D, the gNBs 180*a*, 180*b*, 180*c* may communicate with one another over an Xn interface.

The CN 115 shown in FIG. 1D may include at least one AMF 182*a*, 182*b*, at least one UPF 184*a*,184*b*, at least one Session Management Function (SMF) 183*a*, 183*b*, and possibly a Data Network (DN) 185*a*, 185*b*. While each of the foregoing elements are depicted as part of the CN 115, it will be appreciated that any of these elements may be owned and/or operated by an entity other than the CN operator.

The AMF 182*a*, 182*b* may be connected to one or more of the gNBs 180*a*, 180*b*, 180*c* in the RAN 113 via an N2 interface and may serve as a control node. For example, the AMF 182*a*, 182*b* may be responsible for authenticating users of the WTRUs 102*a*, 102*b*, 102*c*, support for network slicing (e.g., handling of different PDU sessions with different requirements), selecting a particular SMF 183*a*, 183*b*, management of the registration area, termination of NAS signaling, mobility management, and the like. Network slicing may be used by the AMF 182*a*, 182*b* in order to customize CN support for WTRUs 102*a*, 102*b*, 102*c* based on the types of services being utilized WTRUs 102*a*, 102*b*, 102*c*. For example, different network slices may be established for different use cases such as services relying on ultra-reliable low latency (URLLC) access, services relying on enhanced massive mobile broadband (eMBB) access, services for machine type communication (MTC) access, and/or the like. The AMF 162 may provide a control plane function for switching between the RAN 113 and other RANs (not shown) that employ other radio technologies, such as LTE, LTE-A, LTE-A Pro, and/or non-3GPP access technologies such as WiFi.

The SMF 183*a*, 183*b* may be connected to an AMF 182*a*, 182*b* in the CN 115 via an N11 interface. The SMF 183*a*, 183*b* may also be connected to a UPF 184*a*, 184*b* in the CN 115 via an N4 interface. The SMF 183*a*, 183*b* may select and control the UPF 184*a*, 184*b* and configure the routing of traffic through the UPF 184*a*, 184*b*. The SMF 183*a*, 183*b* may perform other functions, such as managing and allocating UE IP address, managing PDU sessions, controlling policy enforcement and QoS, providing downlink data notifications, and the like. A PDU session type may be IP-based, non-IP based, Ethernet-based, and the like.

The UPF 184*a*, 184*b* may be connected to one or more of the gNBs 180*a*, 180*b*, 180*c* in the RAN 113 via an N3 interface, which may provide the WTRUs 102*a*, 102*b*, 102*c* with access to packet-switched networks, such as the Internet 110, to facilitate communications between the WTRUs 102*a*, 102*b*, 102*c* and IP-enabled devices. The UPF 184, 184*b* may perform other functions, such as routing and forwarding packets, enforcing user plane policies, supporting multi-homed PDU sessions, handling user plane QoS, buffering downlink packets, providing mobility anchoring, and the like.

The CN 115 may facilitate communications with other networks. For example, the CN 115 may include, or may communicate with, an IP gateway (e.g., an IP multimedia subsystem (IMS) server) that serves as an interface between the CN 115 and the PSTN 108. In addition, the CN 115 may provide the WTRUs 102*a*, 102*b*, 102*c* with access to the other networks 112, which may include other wired and/or wireless networks that are owned and/or operated by other service providers. In one embodiment, the WTRUs 102*a*, 102*b*, 102*c* may be connected to a local Data Network (DN) 185*a*, 185*b* through the UPF 184*a*, 184*b* via the N3 interface to the UPF 184*a*, 184*b* and an N6 interface between the UPF 184*a*, 184*b* and the DN 185*a*, 185*b*.

In view of FIGS. 1A-1D, and the corresponding description of FIGS. 1A-1D, one or more, or all, of the functions described herein with regard to one or more of: WTRU 102*a-d*, Base Station 114*a-b*, eNode-B 160*a-c*, MME 162, SGW 164, PGW 166, gNB 180*a-c*, AMF 182*a-b*, UPF 184*a-b*, SMF 183*a-b*, DN 185*a-b*, and/or any other device(s) described herein, may be performed by one or more emulation devices (not shown). The emulation devices may be one or more devices configured to emulate one or more, or all, of the functions described herein. For example, the emulation devices may be used to test other devices and/or to simulate network and/or WTRU functions.

The emulation devices may be designed to implement one or more tests of other devices in a lab environment and/or in an operator network environment. For example, the one or more emulation devices may perform the one or more, or all, functions while being fully or partially implemented and/or deployed as part of a wired and/or wireless communication network in order to test other devices within the communication network. The one or more emulation devices may perform the one or more, or all, functions while being temporarily implemented/deployed as part of a wired and/or wireless communication network. The emulation device may be directly coupled to another device for purposes of testing and/or may performing testing using over-the-air wireless communications.

The one or more emulation devices may perform the one or more, including all, functions while not being implemented/deployed as part of a wired and/or wireless communication network. For example, the emulation devices may be utilized in a testing scenario in a testing laboratory and/or a non-deployed (e.g., testing) wired and/or wireless communication network in order to implement testing of one or more components. The one or more emulation devices may be test equipment. Direct RF coupling and/or wireless communications via RF circuitry (e.g., which may include one or more antennas) may be used by the emulation devices to transmit and/or receive data.

Vehicular Communication

As mentioned previously, vehicular communication is a mode of communication whereby WTRUs can communicate with each other directly. Scenarios for V2X operations may exist such as an in-coverage scenario, where WTRUs receive assistance from the network to start transmitting and receiving V2X messages, and an out-of-coverage scenario, where WTRUs use some pre-configured parameters such as resource pools, to start transmitting and receiving V2X messages without assistance from the network. V2X communications may, for example, consist of different types such as:

V2V (Vehicle to Vehicle): Vehicular WTRUs can communicate with each other directly.

V2I (Vehicle to infrastructure): Vehicular WTRUs can communicate with Road Side Units (RSUs)/eNBs.

V2N (Vehicle to Network): Vehicular WTRUs can communicate with core network.

V2P (Vehicle to Pedestrian): Vehicular WTRUs can communicate with WTRUs with special conditions e.g., low battery capacity.

Resource Allocation

LTE defines two modes of operation in V2X communication. According to Mode 3 (in-coverage mode), the network gives the WTRU a scheduling assignment for V2X sidelink transmission. In Mode 4 (out-of-coverage mode), the WTRU autonomously selects the resources from a (pre-)configured resource pool. Furthermore, V2X LTE defines two categories of resource pools, receiving pools which are monitored for receiving V2X transmission, and V2X transmitting pools which are used by WTRUs to select the transmission resource in Mode 4. Transmitting pools are not used by WTRUs configured in Mode 3.

Further in LTE, the resource pools are semi-statically signaled to WTRUs via Radio Resource Control (RRC) signaling. In Mode 4, the WTRU uses sensing before selecting a resource from the RRC configured transmitting pool. LTE V2X does not support dynamic resource pool reconfiguration; pool configuration may only be carried via System Information Block (SIB) and/or dedicated RRC signaling.

NR V2X Use Cases

As mentioned previously, next generation wireless systems such as New Radio (NR) may offer opportunities to support use cases such as:

Vehicle platooning, where a number of vehicles form a group (platoon) travelling together. All the vehicles in the platoon may receive periodic data from the leading vehicle, in order to carry on platoon operations. This information may allow the distance between vehicles to become extremely small, i.e., the gap distance translated to time may be very low (sub second). Platooning applications may allow the vehicles following to be autonomously driven;

Advanced Driving enables for example semi-automated or fully-automated driving. Longer inter-vehicle distance may be assumed. Each vehicle and/or RSU shares data obtained from its local sensors with vehicles in proximity, thus allowing vehicles to coordinate their trajectories or maneuvers. In addition, each vehicle may share its driving intention with vehicles in proximity. The benefits of this use case group are for example safer traveling, collision avoidance, and improved traffic efficiency;

Extended Sensors may enable the exchange of raw or processed data gathered for example through local sensors or live video data among vehicles, RSUs, devices of pedestrians and V2X application servers. The vehicles may enhance the perception of their environment beyond what their own sensors can detect and may therefore obtain a more holistic view of the local situation;

Remote Driving enables a remote driver or a V2X application to operate a remote vehicle for, for example, those passengers who cannot drive themselves or a remote vehicle located in dangerous environments. Where variation is limited and routes are predictable, such as public transportation, driving based on cloud computing may be used. In addition, access to cloud-based back-end service platform may be considered for this use case group.

One-to-One Link Establishment in LTE D2D

LTE D2D relied on broadcast communication only, and therefore, there is no notion of link establishment. Link establishment over sidelink was, however, developed for LTE D2D, on which NR V2X sidelink is based. In LTE D2D, two WTRUs could establish for example a one-to-one Proximity-based Services (ProSe) Direct Communication over the PC5 protocol layer on top of the Packet Data Convergence Protocol (PDCP).

In LTE D2D, one-to-one ProSe Direct Communication is realized by establishing a secure layer-2 link over PC5 between two WTRUs. Each WTRU has a Layer-2 identifier (ID) for unicast communication that is included in the Source Layer-2 ID field of every frame that it sends on the layer-2 link and in the Destination Layer-2 ID of every frame that it receives on the layer-2 link. The layer-2 link for one-to-one ProSe Direct Communication is identified by the combination of the Layer-2 IDs of the two WTRUs. This means that the WTRU can engage in multiple layer-2 links for one-to-one ProSe Direct Communication using the same Layer-2 ID.

In LTE D2D, WTRUs engaged in isolated (non-relay) one to one communication negotiate IP address allocation mechanisms and optionally exchange link-local IPv6 addresses if needed during the link establishment procedure.

Figure 2:
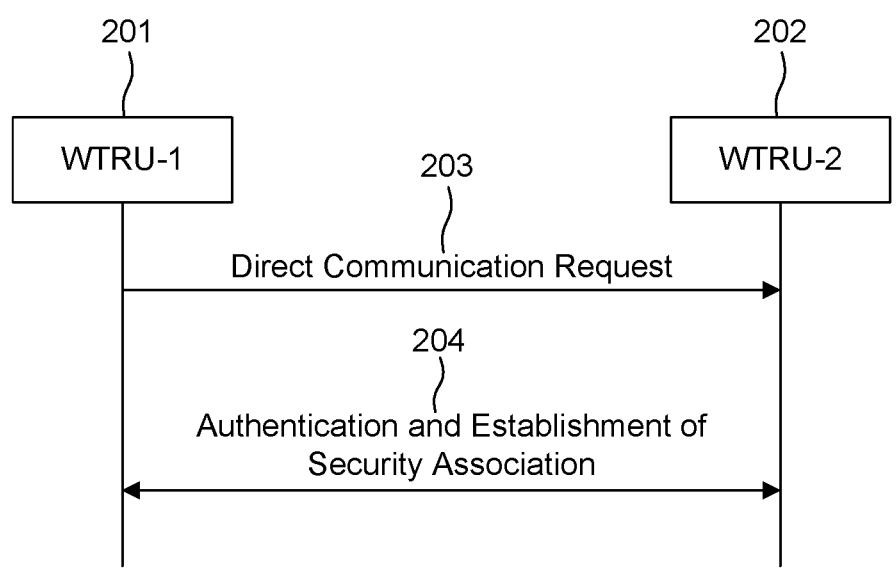
FIG. 2 is an example one-to-one communication according to LTE D2D.

FIG. 2 is an example one-to-one communication according to LTE D2D. A first WTRU 201 may send a Direct Communication Request message 203 to a second WTRU 202 in order to trigger mutual authentication. This message may include User Info. The second WTRU 202 may initiate the procedure for mutual authentication 204.

The PC5 Signaling Protocol supports keep-alive functionality that is used to detect when the WTRUs are not in ProSe Communication range, so that they can proceed with implicit layer-2 link release.

Link Establishment for NR V2X

Embodiments for enhancement for link establishment under NR V2X are described here. While procedures for establishment and maintenance of secure L2 link over PC5 may be defined, embodiments are proposed according to which these procedures are enhanced and adapted for V2X. Additional considerations for the V2X for link/group handling may be required. For V2X communication, not all WTRUs will be supporting or use unicast communication. To support link establishment, there may be a need for embodiments with service announcement in order to inform a peer WTRU of the existence of the WTRU and the capability of the WTRU for unicast communication, e.g., channel to operate, or services supported, etc.

According to an embodiment, such service announcement may be made accessible to all WTRUs that are interested in using an announced service. For example, such announcement could be either configured to be sent over a dedicated channel, and may be similar to how WAVE Service Advertisement (WSA) is handled, or, according to an embodiment, to be piggybacked on the periodical messages from the supporting WTRUs.

Quality of Service (QoS) for NR V2X

QoS over PC5 may be supported with the ProSe Per-Packet Priority (PPPP). The application layer may be allowed to mark the packets with the PPPP, which indicates the required QoS level. Certain enhancement may be added, e.g., by allowing deriving of PDB from the PPPP.

New QoS requirements for NR V2X may be captured. New performance KPIs may have, for example, parameters such as payload (in bytes), transmission rate (in message/sec), maximum end-to-end latency (in ms), reliability (in %), data rate (in Mbps), and minimum required communication range (in meters).

A same set of service requirements may apply to both PC5 based V2X communication and Uu based V2X communication, where Uu is an interface between 5G WTRU and 5G-RAN, also referred to air interface. These QoS characteristics may be represented with a 5G-QoS indicator (5QI).

There may be a possibility to have a unified QoS model for PC5 and Uu, i.e. also use 5QIs for V2X communication over PC5, such that the application layer can have a consistent way of indicating QoS requirements regardless of the link used.

Considering the NR V2X capable WTRUs, there may be at least three different types of traffic: broadcast, multicast, and unicast. For unicast type of traffic, the same QoS model as that of Uu may be utilized, i.e., each of the unicast link may be treated as a bearer, and QoS flows may be associated with it. All the QoS characteristics defined in 5QI and the additional parameter of data rate may apply. In addition, the minimum required communication range parameter may be treated as an additional parameter specifically for PC5 use. Similar considerations apply to multicast traffic, as it may be treated as a special case of unicast, i.e., with multiple defined receivers of the traffic. For broadcast traffic, there may be no bearer concept. Therefore, each message transmitted by the WTRU may have different characteristics according to the application requirements. The 5QI may then be used in the similar manner as that of the PPPP/PPPR, i.e., to be tagged with each of the packet. 5QI is able to represent all the characteristics needed for the PC5 broadcast operation, e.g., in terms of latency, priority, reliability, etc. A group of V2X broadcast specific 5QIs (i.e. VQIs' for V2X 5QIs) could be defined for PC5 use.

The PC5 QoS parameters may be negotiated at the establishment of the one-to-one communication procedure, and the one-to-one communication establishment procedure defined may be enhanced to support PC5 QoS parameters negotiation between two WTRUs. After the PC5 QoS parameters negotiation procedure, the same QoS may be used in both directions.

Figure 3:
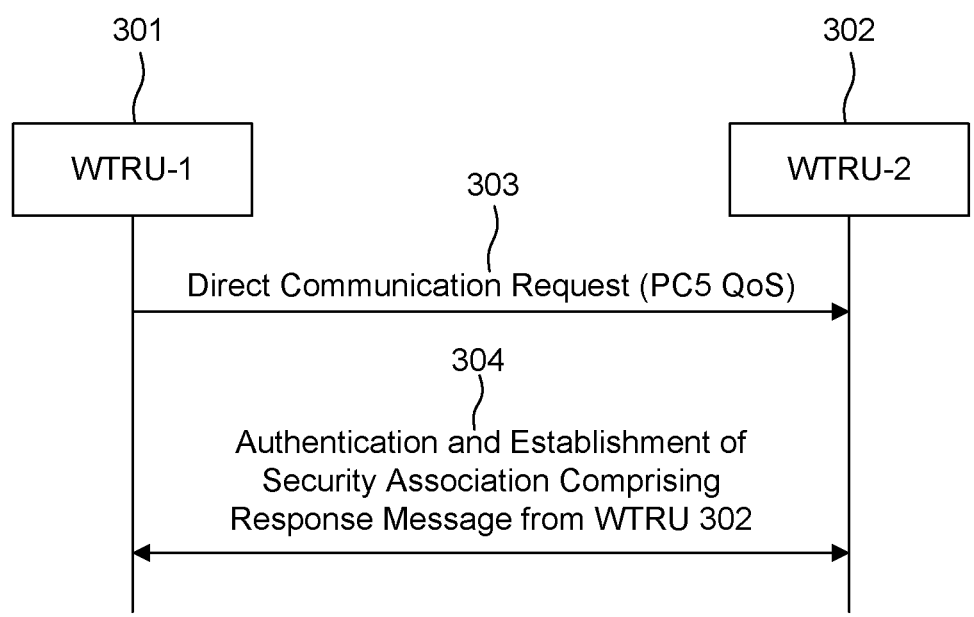
FIG. 3 are two WTRUs engaged in a one-to-one communication and which negotiate PC5 QoS parameters during the link establishment procedure.

FIG. 3 represents two WTRUs engaged in a one-to-one communication and which negotiate PC5 QoS parameters during the link establishment procedure. A first WTRU 301 sends a Direct Communication Request message to a second WTRU 302 in order to trigger mutual authentication. The message includes requested PC5 QoS parameters. In 304, WTRU 302 initiates the procedure for mutual authentication. WTRU 302 includes the accepted PC5 QoS parameters in the response message.

NR V2X may support unicast links between two WTRUs, in which one or more sidelink radio bearer may be established. In order to maintain some reliability link for signaling between the WTRUs in the unicast link, some form of radio link monitoring procedure (Radio Link Monitoring (RLM)/Radio Link Failure (RLF)) may be required and can be extended to sidelink.

Given that reliable signaling may be required in both directions and may be initiated by any WTRU, the RLF/RLF procedure on Uu may not be applicable directly to sidelink. Specifically, a number of issues arise from the extension of RLM/RLF to sidelink, such as:

- absence of a single entity coordinating reference signals. Reference Signals (RS) required for In Sync/Out of Sync (IS/OOS) determination need to be transmitted by a WTRU on sidelink, and the resources for such signal need to be defined so that they are coordinated between the two WTRUs, in addition with other WTRUs using the sidelink;
- half-duplex constraint: IS/OOS model is based on regular reception of RLM RS, which may not be assumed for sidelink (SL) due to half-duplex. A model of RLM RS which is tailored to RS reception that is not perfectly periodic may be needed to avoid constraining a WTRU to transmit periodic RS;
- QoS enforcement may also depend on RS reception. Distributed QoS enforcement between WTRUs for a sidelink radio bearer (SLRB) may be needed. The interaction between failed QoS on a SLRB, and link failure may require to be defined;
- Link failure determined independently by two WTRUs may lead to a situation where one WTRU may continue unicast transmissions, thus utilizing sidelink resources unnecessarily.

Methods for Radio Link Monitoring (RLM)/Radio Link Failure (RLF)

Radio Link Monitoring Reference Signal Transmission/Reception in V2X

In this disclosure, discussion of reference signal transmissions for the purposes of RLM is discussed. However, the described embodiments associated with RS transmission/reception may apply to any type of RS transmission, for example: RS for the purposes of Channel Quality Indicator (CQI) reporting, QoS, power control, and probe transmission.

A WTRU may transmit RS over sidelink for the purposes of having other WTRUs involved in a unicast/groupcast link with the said WTRU to perform RLM/RLF. A WTRU may transmit a single RLM RS (or pattern of RLM RS) for all unicast/groupcast transmissions. Alternatively, a WTRU may transmit a separate set of RLM RS per unicast link, and/or a different set of RLM RS per carrier.

WTRU Transmits RS on a Physical Sidelink Channel Associated with Data Transmission A WTRU may transmit RS in the same resources used for data transmission (i.e., the data transmission pool). A WTRU may transmit RS in any or a combination of the following sidelink channels:

Physical Sidelink Control Channel (PSCCH)
  a. RLM RS Embedded in Sidelink Control Information (SCI): for example, a WTRU may transmit reference signals embedded in an SCI transmission. Specifically, a WTRU may be configured with one or more SCI formats for transmission of SCI with RS, and may transmit such SCI format when it decides to transmit the RS; for example, for a subset or all of the transmissions associated with a unicast link.
  b. RLM RS in dedicated PSCCH resources: for example, a WTRU may transmit references signals within the set of symbols reserved or associated with SCI transmissions and may perform such transmission in a standalone manner. Specifically, a WTRU may be configured with, dedicated resources in PSCCH on which it is expected to transmit RS Physical Sidelink Shared Channel (PSSCH)
  a. RLM RS embedded in data transmission on PSSCH: for example, a WTRU may transmit reference signals embedded in a data transmission (Transport Block (TB) transmission) on PSSCH.
  b. RLM RS in PSSCH resources indicated by SCI: for example, a WTRU may transmit reference signals on PSSCH without any data, such as on one or a set of subchannels indicated by SCI. Specifically, an SCI may indicate the presence of one or more subchannels used for transmission of RS only.

Physical Sidelink Feedback Channel (PSFCH)
  a. for example, a WTRU may transmit a reference signal embedded in a feedback resource, such as a resource associated with transmission of Hybrid ARQ (HARQ) feedback, CQI, or similar channel quality feedback associated with two or more WTRUs.

Physical Sidelink Data Channel (PSDCH)
  a. for example, a WTRU may transmit a reference signal on a physical (PHY) layer discovery channel, possibly embedded in the time/frequency resources used for the discovery transmission.

A WTRU may select which sidelink channel (or which combination of sidelink channels) on which to transmit RS based on determination factors discussed further herein.

According to an embodiment, a WTRU may transmit RLM RS on a dedicated set of resources or a resource pool intended for RS transmission. Such set of resources may further be shared with other WTRUs.

WTRU Indicates the RS Resource Presence/Location to Other WTRUs

A WTRU may select an RS resource configuration and indicate such resource configuration to other WTRUs. The WTRU may select from one of a number of allowed RS resource configurations, possibly provided in (pre)configuration.

According to an embodiment, a WTRU may indicate the configuration (e.g., presence and/or time/frequency location of RLM RS) in any of the associated PSCCH/PSSCH/PSFCH/PSDCH via the SCI, using, for example, any of the following:
  An explicit field in the SCI, such as an index associated with a pre-configured configuration of RS (e.g., pattern/location, and/or indication of the presence of RS in the associated channel);
  Implicitly based on a decoding property of the SCI itself, where a different decoding property may correspond, for example, to a different index, possibly associated with a (pre)configured pattern, or may indicate presence/absence of RS. Decoding properties may, for example, include any of:
    a. The aggregation level used by the WTRU to correctly decode the SCI. Specifically, a WTRU may select a first aggregation level for SCI when it does not contain RS, and may select a second aggregation level for SCI when it does contain RS;
    b. The time/frequency location of the SCI within the PSCCH, such as the starting symbol, starting slot, ending symbol, ending slot. Specifically, a WTRU may select a first starting subchannel for SCI within PSCCH when the SCI contains RS, and it may select a second starting subchannel for SCI within PSCCH when the SCI does not contain RS;
    c. The SCI format decoded by the WTRU. Specifically, a WTRU may select a first SCI format to transmit RS with a first configuration, and may choose a second SCI format to transmit RS with a second configuration.
    d. The Radio-Network Temporary Identifier (RNTI) or similar identifier used to decode the SCI.
  (Pre)configuration or predefinition, such as, the RS resources, if present, may be in a predefined time/frequency location of the PSCCH/PSSCH/PSFCH/PSDCH relative to transmission of the SCI.
    a. For example, a WTRU may include RS signals in a predefined location of a PSSCH associated with a WTRU's SCI transmission. A WTRU may further indicate the presence of the RS with an explicit/implicit indication in the SCI.

In the above, configuration of the RS may refer to any of: indication of presence/absence of RLM RS, time/frequency/beam location of the RLM RS, TX power of the RLM RS, PHY layer sequence associated with the RLM RS.

According to another embodiment, a WTRU may indicate the configuration (e.g., time/frequency location of the RLM RS) by providing such information in a SL-Radio Resource Control (RRC) message. Such message may be provided during the link establishment procedure. Such message may also be provided after the link establishment phase and/or to change the location of the RS.

A WTRU which requires RS (e.g. for purposes of RLM) may determine the presence and/or location of such resources based on decoding of the signaling from the other WTRU, based on the information provided in the signaling as described above.

Additionally, a WTRU may also avoid the use of such resources indicated in the above messages during selection of its own resources for RS and/or data.

WTRU Determines RS Resources Based on a Configured Mapping Function

According to an embodiment, a WTRU may determine the specific resources on which to transmit RS based on, for example, any of the following:
  WTRU ID: for example, a WTRU may determine the resources it may use for reference signal transmission using a mapping with a WTRU identifier (ID), such as the WTRU's source ID, the destination ID associated with a unicast link, an ID associated with the unicast link, the WTRU's Cell-specific Radio-Network Temporary Identifier (C-RNTI), or similar. Specifically, if a WTRU transmits RSs which are dedicated to each unicast link, the WTRU may be configured with a mapping between specific resource elements in the pool and destination ID configured for the unicast link. Alternatively, if a WTRU transmits RSs which usable for RLM on all unicast links associated with that WTRU, the WTRU may be configured with a mapping between the specific resource elements in the pool and the source WTRU ID;
  Geographical location: the location of RS transmitted by a WTRU may further be determined based on WTRU location. For example, a WTRU may be configured with a mapping between WTRU ID and reference signal configuration which further depends on the zone ID associated with the WTRU's current location;
  Congestion Level: a location and/or density of RS transmitted by a WTRU may be determined based on congestion level. For example, the WTRU may use a different mapping function depending on the measured CBR. Alternatively, the WTRU may be allowed to change the amount of RS resources and/or transmission power of such resources based on the measured Channel Busy Ratio (CBR).
  Quality of service (QoS): The location and/or density of RS transmitted by a WTRU may be determined based on the QoS of the bearer(s) to be transmitted by the WTRU. For example, a WTRU may determine the density of RS to be transmitted along with its sidelink data transmissions based on the bearer configuration. Specifically, the bearer configuration may explicitly indicate a reference signal density and/or pattern to be used with its data transmissions. Alternatively, the WTRU may select a reference signal density and/or pattern based on a QoS-related parameter in the bearer configuration. A WTRU may adjust its reference signal density and/or pattern to the bearer having the most stringent QoS and may modify such pattern upon establishment or removal of a bearer. Stringency of a QoS may be defined in terms of one or multiple QoS parameters of latency, reliability, data rate, priority, or minimum communication range.

Configuration: a WTRU may receive the specific resources to be used for RS transmission from the network, such as through dedicated signaling, or in cell specific signaling. For the case of cell specific signaling (SIB), the WTRU may receive the set of resources to be used for RS transmission and may then use other factors (e.g. WTRU ID) to determine the specific resources on which the said WTRU should transmit RS.

Alternatively, a WTRU may receive the resources to use for RS from another WTRU, such as a group leader WTRU (in case of a group), or from the peer WTRU in the case of unicast link.

WTRU Determines RLM RS Resources Dynamically Based on Detection of Other WTRU RSs According to a different embodiment, a WTRU may determine the resources on which to transmit RS dynamically based on detection of RS transmissions by other WTRUs. Such resources may further be associated with a dedicated resource pool used for RS transmissions only. Prior to selecting a set of resources for RS transmission, a WTRU may perform detection and dynamically select a set of resources which is not used by other WTRU RS transmissions. Such decision may be based on any or a combination of the following:

Decoding of SCI:
  a. A WTRU may transmit an indication of the resources it is using for RS transmission in the SCI. Such SCI may be dedicated for indication of such information and transmitted periodically. Alternatively, the WTRU may include an indication of its RS resources in each SCI transmission for indicating associated data, or in a subset of the SCI transmission indicating associated data (e.g., SCI tied only to a specific unicast link). The RS resource indication may take the form of an index associated with a (pre)configured resource pattern.
  b. A WTRU may exclude resources for RS transmissions for which SCI transmissions by other WTRUs detected over a (pre)configured sensing period have indicated the use of such resources for RS transmission. A WTRU may further decide to exclude such resources if the SCI reference signal receive power (RSRP) is above a (pre)configured threshold.

Energy sensing:
  a. a WTRU may exclude resources for RS transmissions in which it detects an energy level on such resource being above a (pre)configured threshold. For example, a WTRU may be (pre)configured with number of possible patterns of time/frequency resources for the purpose of RS transmission. The WTRU may measure the average Received Signal Strength Indicator (RSSI) on the set of resources in each of the (pre)configured patterns and select the pattern associated with its own RS transmission as the pattern which minimizes the measured average RSSI.

WTRU Determines when to Transmit RLM RS

A WTRU may be configured to transmit RS for purposes of RLM. Such determination may, for example, be based on any or a combination of the following:

When configured with at least one unicast/groupcast link: a WTRU may perform transmission of RS when it is configured with at least one unicast or groupcast link. A WTRU may receive such indication from upper layers (e.g. RRC layers).

a. According to an embodiment, a WTRU may receive an RRC message (from the network, or from a peer WTRU via SL-RRC) indicating successful link establishment, or link release. The WTRU may inform PHY layers to initiate/stop transmission of RS upon reception of such a message. The RRC layer may further maintain the number of unicast/groupcast links in which the WTRU is involved and may send an indication to start RS transmission when the first link is established. The RRC layer may send indication to stop RS transmission when the last link is released.
  b. According to another embodiment, a WTRU may receive an indication from upper layers upon initiation/termination of a unicast link, and may start/stop transmission of RS associated with that unicast link upon reception of such indication.
  c. According to another embodiment, a WTRU may further include RS transmissions in its broadcast transmissions when it is configured with at least one unicast/groupcast link. For example, a WTRU may include RS transmissions in its broadcast SCI transmissions (e.g. as Demodulation Reference Signal (DMRS)) only when the WTRU has a unicast link established with the peer WTRU. The WTRU may transmit RS in PSCCH only for broadcast transmissions, and transmit RS in PSSCH (and possibly PSCCH) in unicast transmissions. A WTRU may further indicate (e.g. in SCI) whether RS is being transmitted in the broadcast transmissions and the pattern/location of the RS transmissions.

When PDU transmission is associated with a unicast/groupcast link: a WTRU may perform transmission of RS when transmitting a PDU associated with a unicast/groupcast link.
  a. For example, a WTRU may be provided with a PDU from upper layers associated with unicast transmission (for instance, identified by a unicast destination address). Alternatively, a WTRU may have one or more logical channels associated to unicast/groupcast transmissions, possibly to a specific destination WTRU, and may perform a transmission of RS when such transmission is associated with logical channels associated with unicast/groupcast transmission.

When the carrier is configured for RS transmission: a WTRU may perform transmission of RS when performing sidelink transmission on a specific carrier.
  a. For example, a WTRU may perform unicast/groupcast transmissions on multiple carriers and may be configured with one (or a subset) of the carriers on which to perform RS transmission.
  b. A WTRU may further restrict transmission of SL-RRC messages to the carrier on which RS transmission and/or RLM/RLF is being performed.

When RLF is triggered: a WTRU may perform RS transmissions based on the sidelink radio link failure (SL-RLF)-state associated with the WTRU or a specific unicast link. Specifically, a WTRU may stop previously configured RS transmissions upon detection of RLF associated with a unicast link.

Based on data pool congestion: a WTRU may perform RS transmission if the measured congestion on the resource pool (e.g. CBR) is below a threshold.

When receiving network (NW) indication/configuration: a WTRU may perform RS transmission if configured by the network.

a. For example, a WTRU may be configured in dedicated RRC signaling with parameters associated with a unicast link by the network and may perform RS transmission associated with the unicast link if configured by the network.
b. For example, a WTRU may determine, based on a system information broadcast (SIB) whether to perform RS transmission, possibly associated with a specific carrier.

When receiving Signaling from other WTRU(s): a WTRU may perform RS transmission based on signaling received from another WTRU.
  a. According to an embodiment, a WTRU may receive a SL-RRC messages from a peer WTRU indicating whether the peer WTRU supports RLM-based RS, and may transmit RS associated with a unicast link based on this support.
  b. According to another embodiment, a WTRU may receive a SL message (e.g. SL-RRC message, SL-MAC-Control Entity (SL-MAC CE), SCI with dedicated indication) requesting to perform a one-shot RS transmission or to start/stop transmission of periodic/aperiodic RS transmission.

Based on expiry of a timer associated with transmissions by the WTRU or peer WTRU: a WTRU may perform RS transmission upon the expiry of a timer associated with any of the following events or WTRU actions:
  a. A WTRU may transmit RS if a time T has expired since the last transmission of an RS.
  b. A WTRU may transmit RS if a time T has expired since the last transmission of a data PDU, possibly associated with a specific unicast link.
  c. A WTRU may transmit RS if a time T has expired since the last reception of a data PDU from a peer WTRU associated with the unicast link.
  d. A WTRU may transmit RS if a time T has expired since the last reception of an RS from the peer WTRU associated with the unicast link.
  e. A WTRU may transmit RS if a time T has expired since the last reception of HARQ feedback from the peer WTRU associated with the unicast link.

Based on a WTRU's own determination of IS/OOS from the peer WTRU's RS transmissions: a WTRU may trigger an RS transmission based on its own IS/OOS determination from the peer WTRU. For example, a WTRU may trigger a one-shot transmission of RS or a set of RS transmissions for a finite period of time when the WTRU determines the quality of the peer WTRU(s) own RS transmissions is above a threshold, or when the WTRU declares IS for as part of its own RLM process. The same example may be applicable to generation of OOS or No Sync (NS).

A WTRU which Determines to Transmit RS, Transmits Such RS Periodically

A WTRU, upon determination that it may be required to transmit RS for RLM, may transmit the RS periodically. For example, a WTRU may use a dedicated resource pool for RS transmission (as discussed above) and may select a periodic pattern of reference signal resources within this pool using the methods discussed above. Alternatively, a WTRU may use the resource pool for transmission of control and data (as discussed above) and may perform periodic and/or asynchronous data transmission by performing resource selection.

A WTRU may have certain prioritization rules associated with conflicting transmissions of RS and data. For example, a WTRU may prioritize data transmissions over RS transmissions and may delay and/or skip an RS transmission if the WTRU it detects such conflict. In certain conditions, a WTRU may prioritize RS transmissions over data transmissions. For example, if the elapsed time since the last RS transmission exceeds a threshold, the WTRU may perform RS transmission and delay/skip the data transmission.

According to another embodiment, a WTRU may be configured with a table of data QoS/priority and/or elapsed time since last RS transmission and/or CBR. A WTRU may then determine whether to prioritize data or RS based on this table, the priority/QoS of the data to be transmitted, and the elapsed time since the last RS transmission.

A WTRU Determines the Required Periodicity of RLM RS Transmissions Based on Data/SL Conditions According to an embodiment, a WTRU may determine and/or may be configured with a required periodicity for RS transmissions for RLM/RLF. A WTRU may transmit RS at a rate that matches or exceeds the required periodicity. A WTRU may ensure such required periodicity by transmitting RS with data transmissions, or transmitting RS in standalone fashion, or a combination of the two.

A WTRU may determine the required periodicity of RS transmissions based on any or a combination of the following:

The QoS (e.g. required latency, reliability, etc.) associated with the data on the unicast link on which RLM/RLF is being monitored:
  a. Specifically, the WTRU may be (pre)configured with a mapping of QoS parameters and/or QoS Flow Identifier (QFI) and/or SLRB to RS periodicity. A WTRU may determine the RS periodicity based on such configured mapping.
  b. A WTRU may further change the RS transmission periodicity based on the initiation of new flows on the unicast link, or the cancellation/removal of specific flows on the unicast link if the resulting QoS parameters for the unicast link have changed and require a new RS transmission periodicity.
  c. A WTRU may further change the RS transmission periodicity if provided with a new configuration (e.g. via dedicated RRC signaling).

The velocity of the WTRU:
  a. Specifically, the WTRU may be (pre)configured with a mapping of velocity to required RS periodicity.

The measured CBR, or similar measure of resource congestion:
  a. Specifically, the WTRU may be (pre)configured with a mapping of CBR to RS periodicity.

Configured by upper layers:
  a. Specifically, the WTRU may derive the required periodicity based on information provided from upper layers, such as a configuration of an upper layer parameter.
    i. For example, the RS periodicity may be based on or derived from the upper layer timer which is used to determine the frequency of keep-alive signaling.

Maximum allowable transmit power, potentially related to the RS transmissions:
  a. Specifically, the WTRU may derive the required periodicity of RS transmissions based on the maximum power the WTRU may transmit on sidelink and/or the maximum power associated with the actual RS transmissions.

HARQ transmissions received from the peer WTRU:
  a. Specifically, the WTRU may derive the required periodicity of RS transmissions based on the reception of HARQ feedback from the peer WTRU. Specifically, the WTRU may perform more frequency RS transmissions when HARQ feedback indicates less reliable transmissions (e.g. no ACK/NACK received occurs frequently, or the WTRU receives HARQ NACK often).

The above factors for determination of the periodicity of RS transmissions may also be used to determine other RLM/RLF-related configuration such as:

Configuration of the RLM resources such as the TX power of the RLM resources, density of the transmitted RS resources on the PSSCH, and/or sidelink channels over which RS is transmitted (e.g., PSSCH only, PSSCH and PSCCH/PSFCH).

Timers related to RS transmission (e.g. first and/or second timer for RS transmission, as described herein).

Timers related to RLF declaration.

Thresholds related to generation of IS/OOS/NS.

Frequency with which a WTRU measures or indicates IS/OOS/NS.

A WTRU which Determines to Transmit RS, Transmits Such RS when Performing Data Transmission According to another embodiment, upon determination that it may be required to transmit RS for RLM, a WTRU may transmit such RS during the transmission of data on sidelink. The data transmission which "piggybacks" the RS may be associated with the unicast/groupcast link(s) for which the RS is being transmitted. Such may be the case if, for example, the WTRU is configured to transmit different RS signals for the different unicast links. Alternatively, the data transmission may be associated with any transmission by the WTRU (e.g., unicast or broadcast).

According to an embodiment, upon determination that it should transmit RS for RLM, the WTRU may transmit RS with control/data associated with all data transmissions, possibly associated with a specific unicast/groupcast link.

A WTRU Transmits RS with a Subset of Data Transmissions

According to another embodiment, a WTRU may transmit RS on a subset of transmissions (possibly associated with a unicast/groupcast link), or prioritize certain transmissions on which to send RS over other transmissions. The WTRU may select the specific data on which to include and/or prioritize RS transmission with data based on, for example, any or a combination of the following:

a. Timing of the data transmissions: the WTRU may transmit RS on data which meets certain timing characteristics, possibly related to the timing between RS transmissions by the WTRU. Specifically, a WTRU may select the transmissions which are closest to a periodic transmission of RS with a (pre)configured or predefined period. Specifically, a WTRU may transmit RS with its data only following the elapse of a timer. The WTRU may then transmit RS with the data on the next available resource or transmission following the elapse of the timer.

A WTRU May Perform RS Transmissions with Data Such that it Respects a Maximum Allowable Time without RS Transmission In one example, a WTRU may maintain a timer to control the transmission of RS. The value of the timer may be determined by any of the factors described above for determination of the periodicity of RS transmissions. A WTRU may start/restart such timer upon transmission of an RS. Such RS transmission may be initiated by RLM (e.g. following timer expiry) or may be initiated due to required RS for other purposes (e.g. WTRU may determine RS is to be transmitted for Channel State Information Reference Signal (CSI-RS) measurements or may be required as a result of a request for RS transmission by the peer WTRU or gNB). A WTRU may perform data transmission without RS as long as the timer is running. Upon expiry of the timer, the WTRU may transmit data with RS. A WTRU may either transmit data with RS immediately following expiry of the timer, or may transmit RS with data upon the next scheduled or triggered data transmission following timer expiry. Specifically, a WTRU may perform any of the following:

(i) Immediate transmission following timer expiry: A WTRU may perform immediate transmission of RS, either in standalone RS fashion, or in conjunction with data and/or control information. For example, a WTRU may perform a one-shot resource selection procedure initiated by the expiry of the RS transmission timer, and may include any pending data, dummy data (e.g. using an indication that the transmission does not contain useful information) or control information within the transmission resources, along with the RS transmission.

(ii) RS Transmissions at the next available data transmission: Alternatively, the WTRU may perform RS transmission at the next data transmission scheduled or initiated following expiry of the timer.

(iii) Initiation of a second timer: Additionally, a WTRU may initiate a second timer when the first timer expires and, in such case, the WTRU transmits RS at the next data transmission. Such timer may run as long as data transmission to the peer WTRU has not occurred following expiry of the first timer. Upon expiry of this second timer, the WTRU may perform the actions above associated with "immediate transmission following timer expiry".

A WTRU May Associate RS Transmissions with One or More Configured Periodic data transmissions A WTRU may identify one of its periodic sidelink processes as a SL process to be used for RLM by the peer WTRU. One such way to identify such SL process to be used is to transmit RS in the transmissions of such a SL process. Other methods of identification are also possible and not precluded in the methods below. In one example, a WTRU may transmit RS on one of the periodic transmissions processes, such as one of its periodic sidelink processes. A WTRU may select the sidelink process on which RS is transmitted, or the SL process identified to be used by the peer WTRU for RLM, based on any or a combination of the following:

(i) The SL process having periodicity which is at least as frequent as the required RS periodicity (i.e. frequency of transmissions which is higher or equal to the required frequency of RS transmissions). The required RS periodicity may be determined based on mechanisms described above.

(ii) The SL process with the minimum periodicity of the active periodic SL processes at the WTRU.

(iii) The SL process with the maximum periodicity of the active periodic SL processes at the WTRU.

(iv) The SL process which is associated with transmissions to the unicast link, or group of unicast links for which RLM RS should be transmitted.

(v) The SL process for which the WTRU has reserved future resources for the longer period of time, or for which the WTRU will perform reselection last (e.g. associated with the largest value of the reselection counter).

(vi) A SL process which may be associated with an indefinite reservation of resources at the WTRU without the need to perform reselection.

(vii) A SL process which may be associated with a specific value of a QoS parameter. Specifically, a WTRU may associate a SL process with a specific value of a QoS parameter (e.g. minimum communication range, priority, reliability, latency, data rate). The WTRU may then select or prioritize the SL process which is associated with that specific QoS parameter. For example, the WTRU may be configured to select the SL process associated with a specific data rate requirement or associated with a SL process having LCHs for which data rate requirement is configured (e.g. PBR>0). For example, the WTRU may select the SL process associated with LCHs configured with a priority above a threshold, or the SL process associated with higher priority data.

Combinations of the above criteria (in an order) in deciding the SL process are also possible. Such combinations may be configured when there are multiple SL processes which meet a specific criteria, or when a SL process does not meet the required first criteria and a second criteria should be used. For example, the WTRU may select a SL process having a data rate requirement configured and which has the longest period of time without expected reselection. For example, the WTRU may select a SL process having the longest periodicity which is at most the required periodicity configured at the WTRU.

In another example, a WTRU may transmit RS with a subset of data transmissions associated with a sidelink process for periodic transmissions. The WTRU may determine the subset of transmissions (i.e. which transmissions associated with the sidelink process will also contain an RS transmission) such that the periodicity of RS transmissions matches or is at least as frequent as the required periodicity of RS transmissions, as determined using methods discussed herein.

In another example, a WTRU may transmit RS on data transmissions associated with multiple sidelink processes in order to meet the required RS transmission periodicity. The WTRU may select the multiple sidelink processes using similar criteria as described above. For example, the WTRU may transmit RS on a periodic SL process and multiple aperiodic SL process to achieve the required period of RS transmissions.

In another example, a WTRU may indicate the particular SL process for which it will transmit RS to the peer WTRU (e.g. in SCI, or PC5-RRC signaling).

In another example, a WTRU may perform RS transmission with a particular sidelink process as long as the keep counter >0. When the keep counter is 0, the WTRU may perform reselection for the resources associated with the sidelink process. The WTRU may then select a new SL process for transmission of the RS, based on criteria described herein. For example, if new resources for the SL process are not reselected, the WTRU may decide to send RS transmissions on a different (existing) SL process. The WTRU may further indicate (e.g. in SCI) to the peer WTRU:
  (i). The new sidelink process that will contain the RS transmissions
  (ii). That the RS transmissions will be stopped for some time (e.g. until resource reselection)
  (iii). The timing of the new RS transmissions, if such timing has changed b. TB size: the WTRU may transmit RS with data depending on the selected TB size. For example, if the TB size is below/above a threshold, a WTRU may include RS. In another example, the WTRU may include RS when the TB size compared to the resource size is such that RS can be inserted without a change in coding or without segmentation.

c. QoS of the packet: the WTRU may transmit RS with data depending on the QoS of the data being transmitted in the PDU. For example, the WTRU may be configured with a set of VQI or a threshold priority above which to include RS. In another example using the contrary, the WTRU may treat a packet containing RS with a higher priority when dealing with such packets during resource selection. For example, the WTRU may use:
  A different LBT wait time for such a packet
  Use more reliable resources for such packet (based on measured RSRP/received signal strength indicator (RSSI) of control/data
  Transmit such a packet earlier in time
  Transmit the packet with higher power d. Carrier on which data is transmitted: a WTRU may transmit RS on one or a subset of carriers when performing multicarrier transmission. The WTRU may determine the carrier on which to transmit RS:
  From upper layer signaling—for instance, the RRC layer of the WTRU may indicate the specific carrier(s) in the set of carriers configured to the WTRU for operation, in which the WTRU is allowed to transmit RS;
  Based on measurements of the resource pool/channel on a specific carrier—for example, the WTRU may select a subset of carriers which have a minimum congestion parameter (e.g. CBR) and may transmit RS along with data only on those carriers. In another example, a WTRU may use the congestion measurements obtained by itself and other WTRUs (possibly the peer WTRU(s) involved in the unicast/groupcast link) to determine the congestion measurement on each carrier and decide the carrier(s) on which to transmit RS; In another example, the WTRU may select a single carrier or a subset of carriers from the carriers on which data is being transmitted, on which to transmit RS (which minimizes the CBR) and may transmit the RS on that/those specific carriers. A WTRU may further be configured with a hysteresis mechanism (e.g., a threshold CBR, below which the carrier on which RS is transmitted is not changed) to avoid frequent changes of the carrier on which RS is transmitted;
  Based on detection of RS from another WTRU—for example, the WTRU may select the subset of carriers which have available resources for RS transmission, or which correspond to carriers in which the peer WTRU is also transmitting RS;
  Based on indication by the network or another WTRU—for example, the WTRU may select the subset of carriers on which to transmit RS based on decision by the network or by a peer WTRU or group manager; In another example, the WTRU may select the subset of carriers on which to transmit RS based on indication of the carriers used by the peer WTRU for data transmission (as indicated by the peer WTRU, or detected by the said WTRU);
  Based on consideration of the carrier(s) being used for unicast transmission by the WTRU. For example, the WTRU may determine the carrier(s) where RS is transmitted by considering all the configured carriers on which it is performing unicast transmission, and selecting the minimum number of carriers for transmission of the RS such that it can transmit RS to each unicast link; and Based on capability/supported carriers of other WTRUs—for example, the WTRU may select the carrier on which to transmit RS based on supported carriers of the other WTRU, in combination with supported carriers of the said WTRU. Specifically, the WTRU may select the carriers for RS transmission from a subset of the carriers supported by the peer WTRU (as, for example, determined through capability signaling).

e. Periodic vs Non-Periodic Data: A WTRU may prioritize transmission of RS on one type (periodic or non-periodic) of data. For example, a WTRU may perform RS transmission on a periodic SL process as long as the WTRU has a periodic SL process active at the WTRU. If the WTRU does not have any periodic SL processes configured, possibly which meet the requirements for RLM RS transmissions, the WTRU may perform RS transmissions on non-periodic SL processes.

f. Type of resource or Resource Selection: A WTRU may prioritize transmission of RS on resources of a specific type or for which resource selection is performed in a specific fashion. For example, the WTRU may transmit RS on pattern-based resources only (i.e. resources for which a WTRU selects a pattern/Time-Frequency Resource Pattern (TFRP).)

A WTRU Performs Resource Selection/Data Transmission (or is Assigned NW Resources) Based on Computed Minimum RS Periodicity In one example embodiment, a WTRU may perform resource selection for periodic data transmission by selecting a period which matches or satisfies the minimum required RS transmission frequency, as calculated by the WTRU. Specifically, the WTRU may determine the selected resource periodicity for a sidelink process such that it is at least as frequent as the required RS periodicity. A WTRU may select resources with a smaller period than the required RS periodicity if the data transmission required at the WTRU necessitates this.

In one example embodiment, a WTRU may be configured (by the network—i.e. for mode 1) or may ensure (through resource selection—i.e. for mode 2) a periodic transmission for the purposes of RS transmission. A WTRU may be configured with an independent sidelink process for the purposes of RS transmission. The WTRU may be configured to transmit any pending data, or pending data associated with only certain sidelink radio bearers on such a sidelink process. In case no data is available for transmission on the said sidelink process, a WTRU may:

transmit dummy data or status/measurements
transmit data associated with a non-allowed sidelink radio bearer or logical channel
perform retransmissions associated with another sidelink process
perform duplication of data associated with another sidelink process
transmit SCI only, without any data (e.g. SCI may be used to indicate no associated data, or may be used to reserve some future resources for control or data transmissions)
transmit RS only—for example, the WTRU may transmit RS only in the PSSCH, and may indicate such RS-only transmission in PSCCH.

In another example embodiment, a WTRU may inform the network of the computed/determined required RS transmission periodicity. Such indication may be made to the network using an RRC message (e.g. Sidelink WTRU Information or Sidelink WTRU Assistance), a MAC CE (e.g. buffer status report (BSR)), or a PHY layer indication (e.g. a scheduling request (SR) resource or physical uplink control channel (PUCCH) resource).

The WTRU may receive a periodic grant (e.g. configured grant or SL semi-persistent scheduling (SPS)), which is intended for transmission of periodic RS for RLM. Specifically, a WTRU may receive, along with a configured grant configuration (e.g. by RRC) or activation (by downlink control information (DCI) an indication that the configured grant should be used for transmission of RS for RLM. Such indication may be explicit (e.g. an explicit field in the RRC message) or implicit, such as by having the value associated with such grant to match some designated value (e.g. the grant size may be below a certain threshold or have a certain predefined value; e.g. the periodicity may match the requested or configured RS periodicity; the grant may be associated with a specific priority, or may be restricted to transmission of certain sidelink resource blocks (SLRBs), etc). A WTRU which receives a periodic grant intended for transmission of periodic RS for RLM may perform RS transmission within such grant, possibly associated with data transmissions. Similarly, a WTRU may be provided with a dynamic grant from the network for the purposes of transmission of RLM RS.

A WTRU Transmits Control Information or Status Information at Times when RS Transmission is Required In one example embodiment, a WTRU may perform transmission of control information to the peer WTRU at a time instance when RS transmission is required in order to maintain a minimum required RS transmission periodicity or within a configured grant intended for RS transmission. Specifically, the WTRU may perform an asynchronous (one-shot) transmission of control/status information following the expiry of a timer from the last transmission of an RS by the WTRU, or the WTRU may perform transmission of control/status information in a configured periodic grant intended for RS transmission when there is no data to be transmitted at the WTRU which can use the grant. The WTRU may transmit any of the following control/status information in such a grant:

Measurement reports, such as a CQI report, report of sidelink RSRP/RSSI/Signal to Interference and Noise Ratio (SINR), report of measured CBR, report of sidelink sensing/occupancy results, etc.

AS Protocol layer status, such as radio link control (RLC), or Packet Data Convergence Protocol (PDCP) status report.

Report of sidelink buffer status.

Power headroom report, or related power control information.

Current measured location (e.g. GPS coordinates or zone ID).

The advantage of such solution is to maintain the required RS transmission frequency despite lack of data to be transmitted and provide useful information to the peer WTRU when performing the RS transmission.

WTRU Determines/Indicates the Carrier/BWP(s) for RS Transmission

In one solution, a WTRU may determine the carrier/bandwidth part (carrier/BWP)(s) on which to transmit RLM RS based on the carrier/BWP for which data transmission allows RS transmission. Specifically, the WTRU may select the carrier/BWP based on any or a combination of the following:

- The carrier/BWP configured with periodic transmission, or containing a periodic SL process
- The carrier/BWP configured with the periodic sidelink process having the smallest transmission period
- The carrier/BWP configured with the sidelink process having a period closest to the required RS period
- The carrier/BWP having the lowest measured CBR
- The carrier/BWP having the best channel quality, as determined from CQI measurements, CBR measurements, RSRP/Reference Signal Received Quality (RSRQ) measurements from the peer WTRU, etc.

A WTRU may further indicate a change of carrier/BWP for RS transmission to the peer WTRU upon determination that a change of carrier/BWP is required based on any of the conditions above.

A WTRU Performs RS-Only Transmission after a Specific Time without any Data Transmission According to an embodiment, a WTRU may perform an RS-only transmission (RS without data or RS with dummy data) following a period of time for which the WTRU does not have any pending data transmissions, e.g., for a specific carrier, for a specific unicast/groupcast link, or for an intended destination WTRU or group of WTRUs.

A WTRU may further determine such timer based, for example, on any of the following:

- Velocity—for example, the WTRU may use a smaller timer (or a different value of the timer) depending on the speed of the WTRU;
- CBR—for example, the WTRU may use a different value of the timer depending on its own measured CBR and/or the measured CBR of a peer WTRU;
- QoS requirements of the SLRB(s) associated with the unicast link—for example, the WTRU may use a different value of the timer depending on the VQI(s) associated with the link.

A WTRU Determines Whether/how to Transmit RS Based on an RLM/RLF Related Event

According to an embodiment, a WTRU may determine whether to transmit RS, and/or how such transmissions are performed, based on RLM/RLF related events. Specifically, a WTRU may turn on/off RS transmissions, possibly associated with a specific unicast link, based on its own RLM/RLF state or the RLM/RLF state of another WTRU. Additionally, a WTRU may change the transmission parameters associated with RS (where any transmission parameters discussed herein can be considered) based on the RLM/RLF state.

According to an embodiment, a WTRU may stop transmission of RS associated with a unicast/groupcast link when it detects RLF associated with that link. According to an embodiment, a WTRU may stop transmission of the RS when it is informed of an RLF from a peer WTRU (either directly or indicated by the network).

According to an embodiment, a WTRU may modify the transmission parameters associated with RS transmission based on RLM/RLF related events such as, for example:

- A WTRU measures one or a number of out of sync (OOS) events associated with a received RS from a peer WTRU;
- A WTRU measures a successive number of IS/OOS;
- A WTRU measures the quality of a peer WTRU RS below/above a threshold;
- A WTRU starts/stops a timer related to an RLF operation, such as a T310-like timer.

One of the advantages of such a mechanism is to allow a peer WTRU to be aware of the RLM/RLF status of a WTRU without explicit transmission of such information.

A WTRU Sets the RS Transmission Parameters Based on QoS Parameters Associated with the Link According to an embodiment, a WTRU may determine how to transmit RS along with data based on the QoS parameters associated with the link or data to be transmitted and/or range parameter associated with the data to be transmitted. Specifically, the WTRU may determine, for example, any of the following based on the QoS parameters and/or range parameter of the data that the RS will be transmitted with:

- Number of resources/Density of the RS: a WTRU may select a density of RS (potentially from different (pre) configuration of RS density or pattern) based on the QoS and/or range of the transmission. For example, a WTRU may be configured with a larger density of RS's within its SCI transmission and/or data transmission;
- Transmit Power of the RS: a WTRU may be configured with a transmit power or allowable maximum transmit power which depends on the QoS and/or range parameter. For example, a WTRU may be allowed to transmit RS with a larger transmit power for data associated with a larger range parameter;
- Configuration of each RS sequence: a WTRU may be configured with a different sequence or set of sequences to be transmitted for RS depending on the QoS and/or range parameter. The WTRU may further determine the number of resources required to transmit each RS based on the range;
- Inclusion of RS in different portion of transmission: a WTRU may determine whether to include RS within the SCI and/or data depending on the QoS and/or range parameter. For example, for transmissions with a larger range parameter, the WTRU may include the RS in both SCI and data, while for transmissions with lower range, the WTRU may include the RS only in the SCI;
- Inclusion of RS in HARQ/CQI feedback: a WTRU may determine whether to include RS in its own HARQ/CQI feedback, or instruct the peer WTRU(s) to include RS in their HARQ/CQI feedback. For example, a WTRU may select a transmission slot format which is associated with RS in the PSFCH when the QoS and/or range parameter has one (set) of values, and select a transmission slot format which is associated with no RS in the PSFCH when the QoS and/or range parameter has another (set) of values. The selected slot format may be indicated in the WTRU's SCI transmission.

A WTRU Enables/Signals a Different RLM/RLF Mechanism when Unable to Transmit/Receive RS In one embodiment, a WTRU may initiate or enable a different RLM/RLF mechanism when it is unable to transmit or receive RS for RLM, possibly with some associated requirements described herein (e.g. required RS periodicity, required QoS of periodic SL process, etc.). A WTRU may initiate or enable any of the following mechanisms for RLF described herein:

- HARQ-based RLM/RLF
- Probe-response based RLF
- CQI-based RLF
- RLC-based RLF
- Etc.

In one family of embodiments, a WTRU which transmits RS may indicate (implicitly or explicitly) to the peer WTRU to use a different RLM/RLF mechanism (other than RS-based RLM). A WTRU may perform such indication when it is unable to satisfy the required RLM-RS transmission requirements. For example, a WTRU may perform such indication or decision when any or a combination of the following occur:

- the WTRU is not configured with a periodic SL process
- none of the SL processes configured at the WTRU can meet the requirements of RS periodicity, where such requirements may be derived from any of the SL process selection criteria described herein
- the WTRU does not have any data transmission for some time. For example, the WTRU may signal a different RLM/RLF mechanism following expiry of a timer following transmission of data by the WTRU.

A WTRU may explicitly enable the different RLM/RLF mechanism at the peer WTRU through an explicit message/indication, such as an SCI, SL MAC CE message, or SL RRC message. Alternatively, the WTRU may implicitly indicate to the peer WTRU to initiate a different RLM/RLF procedure by a transmission associated with the RLF mechanism which should be used by the peer going forward; such as:

- Transmission of HARQ feedback in response to a data transmission by the peer WTRU
- Indication to the peer WTRU to monitor or expect HARQ feedback for its transmissions, where such enable signal may transmitted in, for example, SCI, MAC CE, or SL RRC message
- Transmission of a CQI report
- Transmission of a probe signal, or transmission of an indication initiating probe transmission by the peer WTRU (e.g. via SCI message, SL RRC message or SL MAC CE)

A WTRU which receives such indication from the peer WTRU may stop or pause RS-based RLM/RLF and start performing a different RLM/RLF mechanism based on the type of indication received. For example, such WTRU may perform any of the following:

- Stop monitoring of RLM-RS associated with data transmissions by the peer WTRU
- Clear all timers (e.g. T310-like) and counters (e.g. N310-like) associated with RLM-based RLF
- Start any procedures associated with the alternative RLM/RLF procedure Conversely, a WTRU may signal (implicitly or explicitly) initiation of the RS-based RLM/RLF procedure when the condition for RS-based RLM/RS (as discussed above) re-occurs. For example, the WTRU may signal re-initiation of the RS-based RLM/RS when the WTRU initiates a new periodic SL data transmission process which meets the conditions described herein for use for RLM/RLF.

In another family of embodiments, a WTRU which uses RS transmitted by the peer WTRU for its own determination of RLM/RLF may autonomously determine when to disable RS-based RLM/RLF and initiate other RLF-based procedure. Specifically, a WTRU may initiate another RLF procedure (e.g. HARQ-based, CQI-based, probe-response signaling) upon detection of any of the following triggers:

- Upon determination that the peer WTRU is not transmitting any periodic SL processes, possibly associated with a maximum required periodicity.
  a. For example, a WTRU may determine to enable an alternate RLF procedure upon the absence of any forward reservation signal for a SL process from the peer WTRU, possibly associated with specific SL process (e.g. a SL process containing RLM-RS and/or a sidelink process which meets the maximum RS transmission periodicity).
- At the expiry of a timer associated with reception of RLM-RS by the peer WTRU Such WTRU may initiate an alternate RLM/RLF procedure. Specifically, the WTRU may:

- Transmit a probe signal to the peer WTRU
- Transmit CQI request to the peer WTRU
- Enable HARQ transmissions by the peer WTRU. For example, the WTRU may include a HARQ feedback indicator in subsequent transmissions of SCI for data, possibly associated to transmissions with the peer WTRU.

RLM/RLF Determination at a WTRU

WTRU can have Multiple RLM/RLF Processes

A WTRU may be configured with multiple RLM/RLF procedures for sidelink operation. Specifically, a WTRU may be configured to monitor RLM/RLF independently for different ongoing unicast/multicast links. A WTRU may trigger RLF associated with a specific RLM/RLF process independently of other processes.

A WTRU may be configured with a different RLM/RLF process for each destination ID and/or source ID associated with unicast and/or groupcast.

One RLM/RLF process influencing another RLM/RLF process such may have applicability in instances of multiple unicast links between the same pair of WTRUs, but also for:

a. multiple links of different cast type (unicast and groupcast) coming from the same WTRU;
b. group-based RLM/RLF In one embodiment, a WTRU may have a set of two or more related RLM/RLF processes, whereby the outcome/progression of one RLM/RLF process influences the outcome/progression of another RLM/RLF process. Specifically, any of the following factors/events of one RLM/RLF process:

a. Whether a process triggers RLF
b. The number of consecutive IS/OOS/NS indications received by upper layers
c. Whether the lower layers indicate IS/OOS/NS or no indication for a particular indication period
d. A timer associated to an RLF process is started/stopped/restarted may influence or result in any of the following behaviors of RLM/RLF:
e. The WTRU triggers RLF
f. The WTRU start/stops monitoring RLF
g. The WTRU starts/stops/resets a timer related to RLF, or modifies the value of such timer
h. The WTRU indicates one or more IS/OOS/NS to upper layer
i. The WTRU modifies the number of consecutive IS/OOS/NS indication to upper layers In one example embodiment, RLF triggered on one SL process may result in RLF triggered on a different SL process. In another embodiment, RLF triggered on one SL process may result in the WTRU resetting a RLF timer associated with another SL process. In another example, one or more IS reported from one SL process resets an RLF timer in another SL process.

The WTRU may determine that two or more SL processes should be related such that they influence each other in the above manner based on any of the following conditions:

a. The WTRU is (pre)configured with this relationship (e.g. by the network or upper layers)
b. The WTRU determines that two RLM/RLF processes are associated with the same WTRU (using methods described herein)
c. The WTRU determines that the two RLM/RLF processes are associated with transmissions from WTRUs and/or gNBs which are related (e.g. two WTRUs that are in the same groupcast group)
d. The WTRU determines that the two RLM/RLF processes are associated with transmissions related to the same direction (possibly related to direction of travel of the WTRU)
e. The WTRU determines that the two RLM/RLF processes are associated with transmissions of WTRU with similar dynamics (speed, acceleration, etc).

WTRU Associates Multiple Unicast/Groupcast Links with a Single RLM/RLF Process

In an example embodiment, a WTRU may associate multiple unicast links or groupcast links with a single RLM/RLF process. For example, a WTRU may associate multiple unicast links initiated with the same peer WTRU to the same RLM/RLF process. The WTRU may perform/maintain a single RLM/RLF process for all associated unicast links.

The WTRU, upon triggering RLF, may indicate to upper layers the set of all associated unicast links for which the RLF has been triggered. Specifically, it may provide to upper layers:

The list of all unicast source and/or destination L2 IDs of all unicast links associated with the failed RLM/RLF process The list of all unicast link identifiers maintained by the WTRU associated with the failed RLM/RLF process, where such unicast link identifier may have been provided and/or negotiated with upper layers during link establishment.

A WTRU may associate multiple unicast/groupcast links with a single RLM/RLF process based on any or a combination of the following:

The unicast links are associated with the same peer WTRU or group of WTRUs
a. For example, the WTRU may be provided with the source L2 ID or similar ID of the peer WTRU for which a unicast link should be established. Such ID may be provided to the WTRU from upper layers and/or link establishment signaling from the peer WTRU. A WTRU may create a new RLM/RLF process for a specific unicast link if there are no currently established RLM/RLF processes at the WTRU associated with the same peer WTRU. If such an RLM/RLF process associated with the same peer WTRU already exists, the WTRU associates the established link with existing RLM/RLF process.
b. For example, the WTRU may be provided with a list of associated L2 IDs (source/destination) that correspond to the same peer WTRU. This may be provided by upper layers, or determined by SL-RRC signaling between the peer WTRUs as described below (signaling exchange for determination of related unicast links).

The unicast links are associated with the same service:
a. For example, the WTRU may be provided with the service ID associated with the unicast link. Such service ID may be the destination L2 ID. The WTRU may associate unicast links initiated for the same service with the same RLM/RLF process, and may decide whether or not to create a new RLM/RLF process based on similar rules as above The unicast links are associated with the same QoS:
a. For example, the WTRU may be provided with the QoS parameters associated with a unicast link. A WTRU may associate unicast links associated with similar QoS parameters with the same RLM/RLF process and may decide whether or not to create a new RLM/RLF process based on similar rules as above:
b. A WTRU may further be (pre)configured with different QoS classes (i.e. allowable values of each QoS parameter) or SLRBs which can be associated with the same RLM/RLF process.

A WTRU having multiple unicast links with a single RLM/RLF process assumes a single RLM/RLF configuration (e.g. timers, IS/OOS determination, etc.) for all unicast links. A WTRU which receives RLM RS may assume the RS transmitted for different associated unicast links can be treated as a single set of RS transmissions for RLM determination.

Signaling Exchange for Determination of Related Unicast Links—Sending L2 IDs in RRC A WTRU may initiate multiple unicast links (each with a different source L2/L1 ID) to the same physical peer WTRU. This is because upper layers initiates a new unicast link for each application, regardless of whether this is the same or different physical WTRU. In one embodiment, a WTRU may determine the identifiers (L1 ID, L2 ID, or similar) used by a peer WTRU which are associated with the same physical WTRU using signaling exchange of these peer WTRUs at PC5-RRC layer.

TX WTRU Behavior

In one example embodiment, a WTRU (transmitting WTRU) may send in PC5-RRC (e.g. in unicast link reconfiguration message) the set of all of its L2 IDs and/or L1 IDs used as source IDs in unicast links. Such message may be sent by the (transmitting) WTRU at any of the following times:
a. The transmitting WTRU initiates a new unicast link with a destination
b. The transmitting WTRU indicates the release of a unicast link with a destination
c. The transmitting WTRU changes (e.g. from upper layers) its source L2 and/or L1 ID for a unicast link The WTRU may send such message to the destination (L1/L2 destination ID) associated with the unicast link in question. For example, if a WTRU establishes a unicast link with destination D1, the WTRU may send a PC5-RRC message to D1 containing all of the L2/L1 source IDs currently used for unicast links. Alternatively, the (transmitting) WTRU may send such a message to all destinations (L1/L2 destination IDs) associated with all unicast links it is currently transmitting. For example, if a WTRU establishes a unicast link with destination D5, and already has a unicast link with destinations D1, D2, D3, D4, the WTRU will send such a message to each of D1, D2, D3, D4, and D5.

In one example, the WTRU may transmit, in the message, and indication of all current active L1/L2 source IDs for a unicast link. Alternatively, the WTRU may transmit an indication of addition/removal/change of a specific source L1/L2 ID from its set of source L1/L2 IDs.

In another embodiment, a WTRU may send all of its L1/L2 source IDs, including those for other casts as well (e.g. groupcast broadcast) in such PC5-RRC message. A WTRU may further indicate the cast type associated with each ID in the message.

RX WTRU Behavior

An (RX) WTRU may use such a message to determine the source L1/L2 IDs of unicast links which are associated with the same physical WTRU. Specifically, a WTRU may perform the following logic to determine if two unicast links it has ongoing are associated with the same physical peer WTRU:

a. If two or more L1/L2 IDs received in a single PC5-RRC message correspond to the destination L1/L2 IDs of unicast links at the RX WTRU, then those two or more unicast links (i.e. L1/L2 IDs received that correspond to L1/L2 destination IDs used by the RX WTRU) are considered to be associated with the same physical peer WTRU. For example, WTRU1 has source IDs S1, S2, S3, where S1 is associated with a unicast link with WTRU2, and S2, S3 is associated with a unicast link with WTRU3. WTRU3 has two unicast links with destination IDs S2, and S3. When WTRU3 receives the PC5-RRC message containing S1, S2, S3, it determines that the unicast links with destination IDs S2 and S3 are associated with the same peer WTRU.

WTRU Associates Source and/or Destination ID in SCI with the Same RLM Process

In one embodiment, a WTRU may associate transmissions with a set of associated source and/or destination addresses (e.g. transmitted in SCI) with a single RLM process. Specifically, a WTRU may maintain a list of associated source and/or destination addresses determined as described above. The WTRU may, when performing actions related to RLM/RLF, associate all transmissions from the associated source/destination addresses with a single RLM/RLF process, specifically, any of the following may be performed by the WTRU:

The WTRU receiving RS transmissions with SCI having source/destination addresses which are associated as above, consider these RS transmissions as part of the same RLM process (e.g. perform averaging across each transmission).

The WTRU transmitting RLM RS, may determine to reset a timer for RLM RS transmission upon transmission of RS to any of the associated source/destination addresses.

The WTRU transmitting RLM RS, may determine to transmit control information, or transmit RS with data (e.g. upon expiry of a timer) to any of the associated source/destination addresses.

IS/OOS/NS determination, RLF declaration, maintenance of timers, etc. may assume transmissions associated with the associated source/destination IDs are related to the same RLM/RLF process.

WTRU Associates Single PHY Layer ID with Multiple Unicast Source/Destination IDs In an example embodiment, a WTRU may use a single PHY layer ID for all associated unicast links having a single RLM/RLF process. Specifically, a WTRU may determine a single PHY layer ID transmitted in SCI representing multiple unicast links and multiple L2 source/destination IDs provided by upper layers for the different unicast links. A receiving WTRU may associate an RLM/RLF process to each PHY layer ID transmitted in SCI. The PHY layer ID to which an RLM/RLF process is associated may further consist of the combination of source and destination ID transmitted in SCI.

The WTRU may determine the single PHY source/destination ID using any of the following:

The WTRU may use the L2 source/destination ID provided by upper layers (or any portion or function thereof) of the first unicast link which initiates a new RLM/RLF process. All subsequent unicast links determined to be associated with the same RLM/RLF process may use the same initial source/destination ID of the first unicast link The WTRU may determine a random PHY source/destination ID upon creation of an RLM process and may use the same source/destination ID for all unicast links associated with the same process.

The WTRU may further:
a. Randomly select the ID by excluding all IDs it detected from other WTRU transmissions in decoded SCIs (potentially over a configurable time period)
b. Decide to change the PHY source/destination ID upon detection of a collision whereby another WTRU is using the same source/destination ID
Such decision may further be conditioned on other factors, such as QoS of the transmission, received power of the SCI having colliding address, etc.

Provided by upper layers.

WTRU Uses RS from Both Unicast and Broadcast Signaling for RLM Monitoring of Unicast In one embodiment, a WTRU may monitor RS and/or transmissions (e.g. SCI) associated with broadcast transmissions from a peer WTRU and use the presence of such transmissions as part of RLM/RLF for the unicast link. A WTRU may identify such transmissions from the peer WTRU based on the peer WTRU's broadcast L2 source ID. The peer WTRU's broadcast L2 ID may be received during unicast link establishment signaling or may be provided by upper layers. A WTRU may utilize RS transmissions in the PSCCH and/or PSSCH associated with broadcast of the peer WTRU as part of the RLM/RLF process for unicast links with the peer WTRU. A WTRU may derive its RLM/RLF process based on the reception of RLM-RS associated with both the unicast transmissions (i.e. associated with unicast L2 source ID of the peer WTRU) and the broadcast transmissions (i.e. associated with the broadcast L2 source ID of the peer WTRU).

In one example, a WTRU may measure RLM-RS in PSCCH only from broadcast transmissions by the peer WTRU, while using RLM-RS in PSSCH, and possibly PSCCH as well, from unicast transmissions by the peer WTRU. A WTRU may be configured to generate IS/OOS from broadcast RLM-RS in the same manner as unicast transmissions from the peer WTRU.

Alternatively, a WTRU may be configured to treat broadcast transmissions from the peer WTRU differently than unicast transmissions. Specifically, any of the below, or a combination of such are possible:

The WTRU may be configured with a different threshold for determination of IS/OOS with broadcast transmissions compared with unicast transmissions.
a. For example, a WTRU may be configured with a first set of thresholds for IS/OOS indications for RSs received from unicast transmissions and a second set of thresholds for IS/OOS indications for RSs received from broadcast transmissions.

The WTRU may be configured to generate a different indication to upper layers.
a. For example, a WTRU may indicate a different indication (e.g. no sync (NS)) to upper layers upon reception of RS associated with a broadcast transmission, and possibly measured above a specific threshold. A WTRU may treat such indication (e.g. NS) differently than indications received from unicast transmissions, using any examples of indication treatment described herein. For example, a WTRU may pause any RLF-related timers upon reception of a broadcast SCI transmission associated with the peer WTRU, or a broadcast SCI transmission from the peer WTRU for which the received RS is above a threshold.

The WTRU may be configured to average broadcast RSs separately from unicast RSs, and generate separate indications (IS/OOS/NS) for broadcast and unicast transmissions The WTRU may be configured to use different RLM/RLF parameters for unicast depending on the presence of received broadcast transmissions.
  a. For example, a WTRU may use a different value of a timer (e.g. T310_S), or counter (e.g. N310), or IS/OOS threshold upon the detection of broadcast transmissions from the peer WTRU.

A WTRU may determine that a L2 source ID associated with unicast (used by a peer WTRU) and a L2 source ID associated with another cast (groupcast or broadcast) is associated with the same peer WTRU using mechanisms described herein.

RLF Determination Based on Measurement of RLM Reference Signals

When to Monitor/Indicate Radio Link Quality

WTRU Associates RS for RLM with WTRU Source/Destination Address

A WTRU may identify the RS for RLM associated with a specific RLM/RLF process based on the source and/or destination address of the WTRU that transmits the RS or that is contained in the SCI. According to an embodiment, a WTRU may assume the source address of the WTRU transmitting the RS corresponds to the destination address of the unicast link for the RLM/RLF process, or uniquely identifies the unicast link for the RLM/RLF process. According to another embodiment, a WTRU may be configured with a mapping of destination address for the unicast link to source address or addresses for the RS to monitor (such mapping may be explicitly indicated, or may consist of, for example, taking a subset of bits of the destination address to form the source address)). In another example embodiment, the WTRU may associate the RLM RS with the combination of source and destination addresses transmitted in the SCI. In such an example, RLM RS transmitted in PSSCH having a unique pair of source and destination address are combined by a receiver WTRU or considered as a single set of RSs for RLM.

A WTRU may further associate multiple source ID, destination ID, or source/destination pair with a single RS for RLM, as discussed in the previous section. The multiple source/destination/pair to be associated with the same RS may be provided by upper layer configuration signaling or signaling with the peer WTRU. A WTRU may be re-configured with a new source/destination/pair to be associated with the same set of RLM RS (e.g. add or remove a set of associated IDs).

WTRU Determines when to Monitor for RLM RS

A WTRU may determine the time/frequency location and/or presence/absence of RLM RS associated with a specific RLM/RLF process, and when to use such RLM RS for IS/OOS/NS determination based on one or more of the following:
    Explicit signaling transmitted as part of data transmissions: for example, a WTRU may determine the process for which to associate RLM/RS, based on the source address included in the SCI. A WTRU may further determine whether RS is present on another WTRUs transmission and the pattern of such transmission based on indication of presence/absence and/or pattern indication (as discussed in previous section) transmitted in the SCI;
      a. For example, a WTRU may determine from explicit indication in each SCI that data indicated by the SCI contains RS for RLM. The SCI may contain one bit indication that the SCI contains RLM RS and the receiving WTRU should perform RLM based on measured transmission. The WTRU may assume a (pre)configured set of resources within the data (PSSCH) on which the RS is transmitted. information of the configuration (e.g. resource configuration within the PSSCH, TX power of the RS, etc.) of the RS transmissions by the transmitting WTRU, such as an index to a (pre)configured table of RS configurations
      b. For example, an SCI may indicate that the RS to perform RLM/RLF may be always transmitted with a specific sidelink process.
        The transmitter WTRU may determine the sidelink process on which to transmit RLM RS, and may indicate this with a special SCI or field within the SCI
        The transmitter WTRU may further decide to change the sidelink process on which RLM RS is transmitted, and may indicate such using an SCI.
    Explicit signaling transmitted as part of SL RLM/RLF configuration: for example, a WTRU may receive a SL RRC message (from the peer WTRU) or an RRC message (from the network) which (re)configures the RS time/frequency pattern for a specific source address within a dedicated pool or as part of the transmission in the data pool. Such explicit signaling may also configure the carriers on which to decode RLM RS.
      a. For example, a WTRU may determine the sidelink process or the frequency of sidelink transmissions which contain RLM RS based on a configuration provided by PC5 RRC (from the peer WTRU) or Uu RRC (from the gNB) at link establishment. The WTRU may continue to monitor for RLM RS on the sidelink process or with the associated data transmission frequency until an indication of a change in such process/frequency.
    Implicitly based on properties of the link and/or configuration of the link
      a. For example, a WTRU may determine that the RS is always transmitted with the sidelink process having a minimum/maximum period, having a period closest to the determined required RS periodicity (based on preconfiguration, as described further herein). Such WTRU may decode RLM RS from such determined sidelink process
      b. For example, a WTRU may determine the expected subset of transmissions from the peer WTRU (possibly associated with a single process or all processes) having RLM RS based on properties of the link (e.g. QoS) and/or environment (e.g. CBR)
      c. For example, a WTRU may be configured with a required time between RS transmissions (where such configuration may further depend on the properties of the unicast link and/or occupancy of the channel) and may expect all transmissions by a peer WTRU that exceed such time to contain RS.
    Implicitly based on the timing of peer WTRU's transmissions, possibly derived by the detection of a forward reservation signal in the SCI transmitted by the peer WTRU.
      a. For example, a WTRU may determine to monitor RLM RS on one or more periodic SL processes which meet the maximum configured IS/OOS indication period. The WTRU may further combine or use RLM/RS from multiple SL processes in order to meet the required IS/OOS indication period.
  b. For example, a WTRU may decide to monitor RLM RS from multiple SL processes and combine RLM-RS measurements (e.g. derive IS/OOS from combined RS measurements of the two processes) if the processes are transmitted with the same periodicity and/or have an offset which is below a threshold.
Based on a WTRU's own transmission pattern, in combination with the timing of the other WTRUs transmissions (determined as above).
  a. For example, a WTRU may select a SL process to use for RLM determination which has a minimum overlap with a WTRU's own transmission opportunities (e.g. to reduce the impact of half-duplex during RLM monitoring)
Implicitly, based on other information in SCI
  a. For example, a WTRU may determine that RS is transmitted on PSSCH based on the presence of or value associated with another field in the SCI
    For example, the value of a counter in the SCI (e.g. reselection counter) is above/below a (pre)configured or predetermined value
In a designated carrier and/or BWP
  a. For example, the WTRU may monitor RS on a designated carrier or BWP. Such may be signaled by the peer WTRU (e.g. in PC5 RRC signaling) or changed by the peer WTRU (e.g. in an SCI which contains an RLM carrier/BWP change indication)
  b. Alternatively, a receiving WTRU may determine the designated carrier/BWP for RLM dynamically by
    The carrier on which the WTRU receives with maximum/minimum power from the peer WTRU or with maximum/minimum reliability
    The carrier on which the WTRU determines it is able to receive RLM RS (based on blind reception.
  A receiving WTRU may initiate a change of designated carrier and/or BWP if any of the above conditions are satisfied. A WTRU may further assume a new designated carrier/BWP for a configurable amount of time following a change.
A WTRU may change its RLM-RS monitoring pattern when any of the above conditions change. For example, a WTRU may move from monitoring RLM RS on a first sidelink process transmitted by the peer WTRU to monitoring RLM RS on a second sidelink process transmitted by the peer WTRU when its own transmission pattern (due to a new resource selection) overlaps with the first sidelink process.
WTRU Performs Resource Selection to Avoid Transmission Times Associated with RLM Processes]
In one embodiment, a WTRU may perform resource selection by avoiding/excluding resources which overlap in time with known RLM-RS transmissions by the peer WTRU. For example, a WTRU may exclude, during its resource selection procedure, possibly for any unicast/groupcast/broadcast transmissions, the resources associated with (i.e. having overlapping timing with) a periodic SL process transmitted by the peer that the said WTRU is using to perform RLM-RS monitoring. The WTRU may use the information in the SCI of the peer WTRU (e.g. a reservation signal, including the periodicity of the reservation and/or the indication of RS transmission). A WTRU may further perform resource reselection associated with one of its own SL processes, possibly for transmission of any of unicast/groupcast/broadcast, when the WTRU detects overlap with the peer WTRU SL process being used by the WTRU for RLM-RS monitoring.

RLM/RLF Parameters/Behavior Dependent on QoS or Transmission Characteristics

According to an embodiment, which can be combined with other embodiments described herein, any RLM/RLF parameter may be dependent on one or more V2X specific factors, such as;
  The QoS properties of the unicast link, such as priority, latency, reliability, PQI, minimum communication range, etc.
  The measured load of the sidelink resources (e.g. CBR)
  The periodicity of a WTRU's transmissions or a peer WTRU's transmissions, where such transmissions may be used for RLM purposes (e.g. the periodic process used for RLM determination)
  The configuration of the SLRBs configured/initiated for the unicast link
  For example, a WTRU may disable RLM/RLF, or change the parameters associated with RLM/RLF when it determines that the distance between the TX and RX WTRU is larger than the Minimum communication range associated with the peer WTRU transmissions. The WTRU may determine the distance based on the location information in the TX WTRU's transmission, and the WTRUs own location information.
  For example, a WTRU may consider only transmissions associated with a particular QoS when determining RLM/RLF status. Specifically, a WTRU may measure RS associated with peer WTRU transmissions limited to having a specific value of one or more QoS parameters (e.g. latency, priority, reliability, minimum communication range, etc). The WTRU may determine the applicable QoS parameters for which RLM/RLF determination apply based on (pre)configuration from the network or based on SL RRC configuration from the peer WTRU. Specifically, a WTRU may decide to apply RLM measurement (e.g. measurement of RS for IS/OOS) only to peer WTRU transmissions associated with a QoS indicated in the SL RRC configuration from the peer WTRU. Such QoS may be the best case/worst case QoS from the list of QoS configured in the SL RRC signaling.
  The WTRU may modify any of the following RLM/RLF parameters based on the above factors:—Any timers related to RLF declaration, such as, but not limited to, the timer similar to T310 in Uu (i.e., the timer initiated following the reception of N consecutive OOS indications); —Any values of an event which trigger an action related to RLF, such as, but not limited to, the number of IS/OOS indications which start or stop a timer; —The expected period of the IS/OOS indications (i.e. the indication period); —Any period over which the number of events (e.g., IS/OOS) need to be counted to determine whether to trigger RLF and/or to start/stop a timer related to RLF.
  In addition, a WTRU may modify its RLM/RLF behavior based on the above factors, where RLM/RLF behavior may consist of any of the behaviors described herein, such as:
    Whether a WTRU generates NS indications or not
    What criteria a WTRU uses to generates IS/OOS/NS indications (e.g. RS measurements, SCI reception, HARQ feedback reception, etc)
    Whether a WTRU can initiate probe-based RLM/RLF
    Whether a WTRU can enable/disable HARQ transmissions for RLM/RLF under certain conditions
  For example, a WTRU may be configured with multiple sets of RLM/RLF parameters given above, where each set of RLM/RLF parameter may be used by the WTRU for a given range of measured load values and/or priority values (e.g., CBR and Physical Downlink Shared Channel (PDSCH) Rate Matching and Quasi-Co-Location Indicator (PQI)). Such mapping may be configured in a table of RLF-parameter mapping to CBR and PQI.

For example, a WTRU may be configured with different values of the RLF timers and/or RLF constants (e.g. T310-like or N310-like) based on the indication period determined by the WTRU. The WTRU may further determine the indication period based on periodicity of the peer WTRU's transmission, as per embodiments described herein. Specifically, a WTRU may select a first configuration of RLF timers and/or constants for a first selected indication period and may select a second configuration of RLF timers and/or constants for a second selected indication period. Alternatively, a WTRU may apply a (pre)configured scaling factor to a set of RLF timers/constants when changing from one indication period to another.

For example, a WTRU may be provided with a (pre) configuration of RLF timers/constants to be applicable with a specific indication period and may scale such timers and constants when the indication period changes. The scale factor may further depend on the change in the indication period from the (pre)configuration.

For example, a WTRU may be provided with an RLM/RLF configuration for a specific SLRB. Such configuration may include any of an indication period, a minimum/maximum indication period, a set of thresholds for IS/OOS, any timers related to RLF operation (e.g. T310_S), any constants related to RLF operation (e.g. N310 or similar). A WTRU may further derive its RLM/RLF behavior based on the SLRBs which are active with the peer WTRU, for example:
- A WTRU may use the worst-case/best-case RLM/RLF parameters of all SLRBs configured/active for the unicast link:
  a. For example, worst-case/best-case could be based on the minimum/maximum indication period
  b. For example, worst-case/best-case could be based on the minimum/maximum value of a counter or timer
- A WTRU may combine the RLM/RLF parameters of the configured/active SLRBs to derive the RLM/RLF parameters to be used on the unicast link:
  a. For example, the WTRU may determine the indication period and/or timers/constants to be reduced by a multiple or factor for each SLRB configured/activated in the unicast link
- A WTRU may determine its RLF behavior based on the presence/absence of a specific SLRB in the unicast link:
  a. For example, the presence of or activation of a specific SLRB may allow the WTRU to enable a specific RLM/RLF-related behavior
    For example, a WTRU may enable/perform RLF based on HARQ feedback if a specific SLRB is activated for a unicast link
    For example, a WTRU may enable transmission of a probe signal for RLM/RLF determination if a specific SLRB is activated for a unicast link
    For example, a WTRU may generate NS indication under any of the conditions described herein if a specific SLRB is activated for a unicast link
    For example, a WTRU may use one or multiple SL channels (PDCCH and/or PSSCH) depending on the presence of a specific SLRB WTRU Determines the Link Quality Determination Period (Indication Period) Based on Data Transmission Characteristics In an example embodiment, a WTRU may determine the period of radio link quality determination (IS/OOS determination and/or indication to upper layers) based on the properties of the data transmission on the unicast link. Specifically, a WTRU may determine the rate/frequency with which it determines radio link quality or the rate/frequency with which it indicates such quality to upper layers (RRC layer) based on any or a combination of the following:
- Periodicity of the data transmissions on the unicast link (i.e. of its own transmissions to the peer WTRU and/or transmissions from the peer WTRU)
  a. For example, the WTRU may perform radio link quality determination and may possibly indicate such to upper layers with a periodicity which is a function of the maximum/minimum data transmission periodicity from the peer WTRUs. For example, the WTRU may assume the indication period to be the minimum or maximum periodicity associated with any periodic sidelink process transmitted by the peer WTRU. The WTRU may determine the periodicity of data transmissions by the peer WTRU based on indication of the SCI.
- QoS of the data (flows) on the unicast link
  a. For example, the WTRU may perform radio link quality determination and indicate such to upper layers more frequently for unicast links associated with higher QoS. Specifically, a WTRU may be (pre)configured with a RLM determination/indication period for each set/range of QoS parameters, or for each SLRB configuration. If a WTRU is configured with a radio link quality determination period per radio bearer, a WTRU may determine the radio link quality determination period for the unicast link as the minimum/maximum of the configured periods for each SLRB.
- Occupancy of the resources (e.g. CBR)
  a. For example, the WTRU may be (pre)configured with an RLM determination/indication period for a range of measured CBR
- Periodicity of data transmissions associated with RS
  a. For example, the WTRU may determine the periodicity of data transmissions which contain RS transmissions, and perform link quality determination and/or indication of IS/OOS to upper layer based on this periodicity or a function of this periodicity
- A fixed time, such as a fixed number of frames or subframes
- A function of the sidelink synchronization signal transmission period
- Determined by the reception of SCI and/or data (PSSCH) which is indicated (by one of the methods described herein) to have associated RS transmissions
  a. For example, the WTRU may perform radio link quality determination and may possibly indicate such to upper layers at each reception of an SCI indicating PSSCH for the said WTRU whereby RLM RS is included
  b. For example, the WTRU may further perform radio link quality determination and may possibly indicate such to upper layers at the reception of an SCI indicating RS-only transmission
- A function of an upper layer timer, such as the keep-alive timer or similar a. For example, the WTRU may receive a value of the keep-alive timer and may select from one of a set of values for the indication period such that it is less than the keep-alive timer, or some function of the keep-alive timer.

The relative amount of subframes in which the said WTRU is performing transmission a. For example, a WTRU may determine the percentage of time in which the WTRU performs transmission (and cannot perform RLM or reception of RS as a result), and may perform IS/OOS determination more frequently when the percentage of time spent on transmission is higher A function of the said WTRU or peer WTRU's resource transmission pattern a. For example, a WTRU may be configured with a transmission pattern (e.g. a TFRP—time frequency resource pattern). A WTRU's determination/indication period may be a function of the peer WTRUs TFRP and/or its own TFRP.

In an example embodiment, the determination period may be the maximum, minimum, or combination of two or more of the above conditions. For example, the determination period may be the maximum of a fixed time period (in subframes) and the periodicity of data transmissions associated with the smallest period sidelink process.

In another example embodiment, the determination period may be given by one of the above conditions in one situation or mode of operation and be given by a different above condition in a different situation or mode of operation. The WTRU may change the determination/indication period upon any change of the mode of operation. The mode of operation may be related to:

Resource allocation mode—e.g. mode 1 vs mode 2

The presence or absence of periodic transmissions by the peer WTRU or the WTRU itself One or more QoS parameters of the data being above or below a threshold The occupancy of the medium (CBR) being above or below a threshold The SLRBs configured for the unicast transmission and their associated RLM configuration.

For example, the determination and/or indication period may be set to each reception of data transmitted by the peer WTRU having RS in PSSCH, in the case the WTRU does not detect any periodic transmissions indicated by the peer WTRU. If periodic transmissions are indicated by the peer WTRU, the determination and/or indication period may be the maximum of x ms and the period of the lowest period sidelink process.

For example, the indication period may be set to a fixed or (pre)configured value in case the peer WTRU does not have any periodic transmissions and may be set to the periodicity of one of the sidelink processes of the peer WTRU in the case the peer WTRU has periodic transmissions.

For example, the determination and/or indication period may be set to each reception of data transmission containing RS for a certain value of QoS associated with the services/flows on a unicast link and/or SLRB configuration parameter, and may be a fixed time period for other values of QoS and/or SLRB configuration parameter.

For example, the determination and/or indication period may be set to each reception of data transmission containing RS when the measured CBR is above a threshold, and may be a fixed time period if CBR is below a threshold.

WTRU Selects from a Number of Sidelink Processes for RLM Determination/Indication In one embodiment, a WTRU may determine the indication period for RLM/RLF from the periodicity of one or more SL processes of the peer WTRU, as indicated in the SCI transmissions by the peer WTRU. Specifically, the WTRU may select the process transmitted by the peer WTRU based on any or combination of:

The sidelink process having a periodicity shorter than a (pre)configured periodicity The sidelink process with a larger number of future reserved resources The sidelink process for which the SCI indicates that RS transmissions are included in the PSSCH for the data transmissions associated with that process The sidelink process associated with one or more QoS characteristics, such as a priority, latency, reliability, etc., possibly indicated in the SCI The sidelink process having HARQ enabled The sidelink process which has the least/no amount of overlap with the WTRUs own transmissions A WTRU may further derive the indication period as a combination of any of the above with a (pre)configured maximum or minimum value. Specifically, the WTRU may determine the indication period to be the maximum/minimum between a (pre)configured period and any of the above sidelink processes. For example, a WTRU may use the configured maximum/minimum when a periodic sidelink process having a period larger/smaller than the configured maximum/minimum, possibly with other required conditions, does not exist at the peer WTRU.

A WTRU may use a combination of SL processes from the peer WTRU to determine the indication period. For example, a WTRU may determine the indication period using a combination of multiple peer WTRU SL processes (either unicast or groupcast). Such indication period derived from the combination may be shorter than the periodicities of each of the processes.

A WTRU may change from one indication period to a different indication period based on a change of any conditions associated with the periodic SL process transmitted by the peer WTRU, or based on a change in the timing associated with the peer WTRU SL processes. For example, a WTRU may change the indication period associated with RLM/RLF upon detection of the termination of a SL process by the peer WTRU (i.e. a reservation with that periodicity is not expected in the future). The WTRU may then change the indication period to an indication period that matches a different existing SL process at the peer WTRU, or to a default or (pre)configured indication period in case there are no periodic SL processes transmitted by the peer WTRU. For example, a WTRU may change the indication period associated with RLM/RLF upon detection of a new SL process initiated by the peer WTRU whose properties better match a specific (pre)configured criteria (e.g. shortest periodicity, QoS matching a specific criterion, etc).

Suspended RLM/RLF Process

An RLM/RLF process may be associated with a suspended state. Such suspended RLM/RLF process may be associated with the following WTRU behavior:

a. suspending RLM measurements.
b. suspending RLF counters (e.g. N310) and/or RLF timers (e.g. T310, T3XX defined herein).
c. stopping RLF counters and/or timers.
d. continuing RLM, but not declaring RLF under conditions where RLF would otherwise be declared.

e. Not sending any indications (IS/OOS/NS) to upper layers.
f. Sending only NS indications to upper layers.

RLM/RLF Activated/Suspension from Upper Layers

In one embodiment, a WTRU may receive an indication from upper layers (implicit or explicit) to deactivate or activate RLM/RLF, possibly associated with a specific RLM/RLF process.

Conversely, a WTRU may receive an indication to activate (a potentially suspended/deactivated) RLF process.

A WTRU may suspend an RLM/RLF process upon reception of any of the following indications from upper layers (e.g. RRC layer, V2X layer, application layer):
 a. An explicit indication to suspend the RLM/RLF process
 b. An indication that a unicast link is inactive
 c. An indication that the Minimum Communication Range (MCR) requirements associated with a unicast link have changed. Specifically, if the WTRU determines that the peer WTRU is outside of the minimum communication range following the change in MCR requirements
 d. An indication of a change in location by the WTRU
 e. An indication of a change in group (e.g. a WTRU is added/removed from the group, making such RLM/RLF monitoring unnecessary for the said WTRU)
 f. An indication of a change in WTRU ID (e.g. source/destination L1/L2 ID)

WTRU-Determined Conditions for RLF Suspension

In another embodiment, a WTRU may determine specific conditions in which to suspend an RLM/RLF process. Specifically, a WTRU may determine to suspend an RLF process under the following conditions:
 a. The WTRU has not received data (or a signal) from a peer WTRU for a period of time, or receives an indication from the peer WTRU that it will not receive data for a period of time
   The signal may include at least one of PSCCH, PSSCH, and PSFCH
 b. The CBR goes above/below a threshold
 c. The WTRU determines that the distance to the peer WTRU exceeds a certain threshold, or is a distance larger than a range requirement associated with the unicast link
 d. The WTRU's speed goes above/below a threshold
 e. The WTRU changes its source/destination ID for the unicast link
 f. The parameters of a unicast link (e.g. bearer configuration) is changed
 g. The WTRU changes connectivity state or coverage state with the network
   For example, the WTRU may suspend an RLM/RLF process upon initiation of a connection establishment with the network, or upon moving from out of coverage to in coverage.

The WTRU may resume a suspended RLM/RLF process when any of the above conditions for suspension no longer holds. Alternatively, the WTRU may suspend an RLM/RLF process for a (pre)configured period of time following the occurrence of any of the above triggers, and may re-activate the said process after that period, possibly combined with the condition that the above trigger condition no longer exists.

Indication of IS or OOS when No RLM Signal is Present

In another embodiment, a WTRU may send In-Sync (IS) or Out-of-Sync (OOS) to upper layer in each RLM measurement period (or window) even though the WTRU may not receive any RLM measurement signal from a peer WTRU. One or more of following may apply:
 a. A WTRU may send IS to upper layer when
   the WTRU received at least one SCI (or RLM measurement signal) from the peer WTRU and/or its RLM measurement during the measurement period is above Qin
   the WTRU received at least one SCI from the peer WTRU and its RLM measurement during the measurement period is not lower than Qout and the WTRU sent IS to upper layer in the previous RLM measurement period, where the previous RLM measurement period may be the latest RLM measurement period before the current RLM measurement period
 b. A WTRU may send OOS to upper layer when
   the WTRU received at least one SCI (or RLM measurement signal) from the peer WTRU and/or its RLM measurement during the measurement period is below Qout
   the WTRU received at least one SCI from the peer WTRU and its RLM measurement during the measurement period is not higher than Qin and the WTRU sent OOS to upper layer in the previous RLM measurement period, where the previous RLM measurement period may be the latest RLM measurement period before the current RLM measurement period
 c. A WTRU may send either IS or OOS when the WTRU received no SCI (or RLM measurement signal) from the peer WTRU and the IS or OOS may be determined based on at least one of following:
   The latest indication (IS or OOS) to upper layer. For example, a WTRU may send IS (or OOS) when the latest indication to upper layer in the previous RLM measurement period is IS (or OOS) and the WTRU may not receive any SCI (or RLM measurement signal) in the current RLM measurement period.
   CBR. If a CBR is higher than a threshold, the WTRU may send IS to upper layer, otherwise the WTRU may send OOS to upper layer.
   Random selection. A WTRU may randomly select IS or OOS when the WTRU received no SCI (or RLM measurement signal) during the RLM measurement period from a peer WTRU.
 d. The RLM measurement signal may include at least one of SCI, PSCCH, PSSCH, DM-RS of PSCCH, DM-RS of PSSCH, CSI-RS, and PSFCH In another embodiment, a WTRU may send IS or OOS to upper layer in each RLM measurement period based on successful reception of any signal from a peer WTRU or not.
 a. A WTRU may send IS to upper layer when
   The WTRU received at least one of signal or channel from a peer WTRU during the RLM measurement period
   (i) The signal may include but not limited to SCI, transport block, HARQ feedback, CSI feedback, DMRS of PSCCH, and DMRS of PSSCH
   (ii) The channel may include but not limited to PSCCH, PSSCH, PSFCH
 b. A WTRU may send OOS to upper when the WTRU received no signal from a peer WTRU during the associated RLM measurement period RLM/RLF Activated/Deactivate/Reconfigured By Peer WTRU In one embodiment, a WTRU may modify the RLM/RLF behavior of a peer WTRU using explicit or implicit signaling. Specifically, a WTRU may send a message (e.g. RRC message, MAC CE, or SCI message) to
  a. Enable/disable RLM/RLF
  b. freeze, pause, or reset all counters and/or timers related to RLM/RLF
  c. Reconfigure parameters related to RLM/RLF (e.g. counters, timers, quality thresholds, etc)
  d. Send no indication (or send NS indication) to upper layers for some time period Such message may further be piggybacked with the transmission of data by the TX WTRU to the RX WTRU.

A WTRU may send such a message to the peer WTRU when:
  a. The WTRU detects that it is outside the minimum communication range of its own transmissions or the peer WTRU's transmissions, possibly for all possible transmissions associated with the unicast link
  b. The WTRU decides to change the power and/or configuration associated with its RS transmissions
  c. The WTRU decides to change its source ID associated with a unicast link for which the peer WTRU is performing RLM/RLF
  d. The WTRU does not have any transmissions to perform, possibly for a determined period of time.
  e. The WTRU performs resource reselection Such timer period may include a time period for which the peer WTRU may deactivate/activate RLM/RLF. For example, a WTRU may indicate that the peer WTRU should deactivate RLM/RLF for a period of time given in the message. The RX WTRU, upon reception of the message, may deactivate RLM/RLF for that time period, and resume it once the time has expired. In another example, a WTRU may transmit a message indicating a period of time for which RLM/RLF should be performed following receipt of the message. The receiving WTRU may perform RLM/RLF following reception of the message for that time period, and then suspend it once the time expires.

Triggers for the WTRU to Send the Message to Activate/Deactivate RLM/RLF at the Peer WTRU A WTRU may trigger transmission of the message indicating to the RX WTRU to stop/pause or start/resume RLM/RLF based on any of the following triggers related to data arrival:
  a. Its buffers, potentially associated with a specific QoS or set of logical channels (e.g. for which RLM/RLF is required) are empty (i.e. deactivate RLM/RLF)
  b. Its buffers, potentially associated with a specific QoS or set of logical channels, have an amount of data which is below a threshold (i.e. deactivate RLM/RLF)
  c. New data arrives at the WTRU, potentially associated with a specific QoS or set of logical channels (i.e. activate RLM/RLF)
  d. Its buffers, potentially associated with a specific QoS or set of logical channels, have an amount of data which is above a threshold (i.e. activate RLM/RLF)
  e. A specific bearer or unicast link is initiated/released RLM/RLF Handling Following Change of Source/Destination ID A WTRU may regularly change its source ID. In addition, it may also perform RLM/RLF with a peer WTRU which also changes it source ID regularly.

In one embodiment, a WTRU may replace the source/destination ID associated with an RLM/RLF process with a new source/destination ID. Such source/destination ID may be provided by upper layers. Upon reception of a new source/destination ID, the PHY layer may replace the source/destination ID for which it measures RLM RS with the new source/destination ID provided. Specifically, a WTRU may perform RLM/RLF associated with source ID D1. Upon reception of a new source ID (D2) for that unicast link that was previously associated with source ID D1, the WTRU may perform RLM/RLF associated with source ID D2.

In another embodiment, a WTRU may delete all context (e.g. stop timers, stop RLM associated with the source ID) associated with the RLM/RLF process associated with the old source/destination ID, and create a new RLM/RLF process associated with the new source/destination ID.

In another embodiment, a WTRU may pause RLM/RLF (e.g. pause all timers associated with RLM/RLF, pause measurement of RLM for a specific source/destination address) and resume it at a later time with a new source/destination ID. For example, the RRC/PHY layer WTRU may receive a first indication to pause the timers/RLM measurements from upper layers, and may then receive a second indication to resume the timers/RLM measurements from upper layers. The RRC/PHY layer may receive the first indication when it generates a new upper layer message to inform the peer WTRU of a change of source/destination ID, and may receive the second indication when the message is acknowledged by the peer WTRU.

In another embodiment, a WTRU may pause RLM/RLF (e.g. pause all timers associated with RLM/RLF, pause measurements of RLM) for a (pre)configured period of time from the occurrence of an event, such as the indication from upper layers of the change of source/destination ID.

In another embodiment, a WTRU may perform RLM measurements on both the old source/destination ID and the new source/destination ID for a period of time following the indication to change the source/destination ID. Such time may be (pre)configured or predetermined. Such time may be signaled by the upper layers. Such time may further depend on specific factors such as:
  a. The indication period
  b. The WTRU dynamics (e.g. speed, acceleration)
  c. The channel congestion (e.g. CBR)

WTRU Determines ISI/OOS/NS Based on Decoding of SCI and/or Data

In an example embodiment, a WTRU's indication of radio link quality (IS/OOS/No-Sync (NS) or similar) to upper layers may be based on reception of SCI, possibly indicating data, possibly associated with the unicast link. A WTRU, depending on the condition related to decoding SCI and/or data, may indicate acceptable radio conditions (IS or similar), may indicate radio link below acceptable conditions (OOS or similar) or may indicate to RRC layers that the radio link conditions are unknown or cannot be determined (NS indication, or similar, as described/defined further herein, or no indication at all).

Specifically, the WTRU may indicate IS (or acceptable radio conditions) to RRC layer upon any or a combination of the following events:
  The WTRU receives an SCI from a peer WTRU having source and/or destination address associated with the RLM process (as defined herein)
    a. Hereafter, the SCI associated with the RLM process may be referred to as
    b. RLM-SCI, wherein the RLM-SCI may be different from an SCI for PSSCH scheduling
    c. RLM-SCI may include a set of SCI contents for RLM process including at least one of
      HARQ ACK reporting request when a WTRU successfully received RLM-SCI, wherein successful reception of RLM-SCI may be determined based on CRC check of the SCI Associated HARQ resource. For example, a time/frequency resource for the HARQ ACK reporting associated with the RLM-SCI may be indicated in the SCI The number HARQ ACK reporting and/or gap between two adjacent HARQ ACK reporting. For example, N HARQ ACK reports with X TTIs gap could be indicated, wherein N and/or X values may be indicated in the RLM-SCI Transmission power level of the RLM-RS. For example, an RLM-RS may be transmitted together with an RLM-SCI and the transmission power level of the RLM-RS may be indicated in the RLM-SCI d. The SCI may be monitored in a certain time/frequency resource which may be configured for the RLM process and/or associated with the RLM progress, wherein the certain time/frequency resource may be non-overlapped, partially overlapped, or fully overlapped with a time/frequency resource configured, used, or determined for a PSCCH scheduling PSSCH e. The SCI may be transmitted via a PSCCH The said SCI is received with a signal strength above a (pre)configured threshold, wherein the signaling strength may be measured from an RLM-RS associated with the SCI.

a. The RLM-RS may be a DM-RS of the PSCCH which may carry the RLM-SCI b. The RLM-RS may be a DM-RS of the associated PSSCH c. The RLM-RS may be a CSI-RS which may be transmitted within the associated PSSCH resources d. The signal strength may be L1-RSRP of the RLM-RS The WTRU successfully decodes the PSSCH associated with the received SCI The WTRU may indicate OOS (radio link below acceptable conditions) or NS (radio link conditions are unknown or cannot be determined), or no indication (i.e. none of IS/OOS/NS) to RRC layer upon any or a combination of the following events:

The WTRU receives SCI from a peer WTRU for the unicast link but is not able to decode the associated PSSCH The said SCI is received with a signal strength below a (pre)configured threshold The WTRU does not decode SCI and/or data associated with a unicast link for a period a. For example, a WTRU may be (pre)configured with a timer which is reset at each reception of SCI and/or data. Upon expiry of the timer, the WTRU may indicate OOS or NS to RRC layers.

The WTRU does not receive SCI associated with unicast transmissions in a slot where such SCI is expected based on indication from a previous transmission a. For example, a WTRU may not receive SCI for a unicast transmission on a slot where such is expected due to a forward booking signal received from a previous transmission, and may indicate OOS or NS to RRC layers in such case.

The WTRU was unable to receive an expected SCI transmission from the peer WTRU (and consequently any RLM-RS) because it was busy performing transmissions at the same time instant The WTRU determines that it is outside the required TX-RX distance (e.g. as required based on the minimum communication range)

a. For example, a WTRU may generate a NS indication as long as it is determines that the distance between the TX and RX WTRU is larger than the minimum communication range b. For example, a WTRU may generate a signal to RRC layers to disable RLF or trigger RLF procedure when the WTRU is outside the minimum communication range of its own or peer WTRUs transmissions.

The peer WTRU does not have any periodic transmissions configured and the WTRU does not receive SCI from the peer WTRU over the current indication period The WTRU exceeds the limit of (pre)configured blind decoding a. Rules for generation of OOS, NS, or no indication based on the above may further depend on conditions in the following solution/embodiment family (i.e. dependence on measurements at the WTRU).

WTRU Decides Whether to Send IS/OOS/NS when No SCI/RS is Available for an Indication Period In some solution/embodiment families, a WTRU may assume periodic IS/OOS/NS indications from lower layers and lower layers may provide or determine whether to send IS, OOS, NS or no indication at all each indication period, without information from the reception of any RLM-RS from the peer WTRU and/or any decoded SCI transmitted by the peer WTRU. Without loss of generality, these same solutions/embodiments may be used to determine whether to send NS (in the case where such additional indication is supported) or whether to send IS/OOS or no indication (when no additional indication is supported). In these solutions/embodiments, whether to send IS, OOS, NS, or no indication may depend on factors at the WTRU at the time of the indication period. In such embodiments, a WTRU may determine whether to send IS, whether to send OOS, whether to send NS (if supported) or whether to send no indication to upper layers based on any or a combination of the following:

Number of SCI transmissions received a. For example, the WTRU may indicate NS if the number of SCI transmissions received from the peer WTRU (possibly associated with unicast transmissions of a specific type, possibly over a period of time) is below a threshold. The WTRU may otherwise generate IS or OOS, and base such determination on the quality of the RS received in the transmissions Load measurement (e.g. CBR) of the sidelink channel a. For example, the WTRU may be configured with a threshold CBR and may indicate IS to upper layers in the case of lack of RS when the CBR is above the threshold, and may indicate OOS or may send no indication in case of lack of RS when the CBR is below the threshold WTRU speed a. For example, the WTRU may indicate NS if WTRU speed is below a threshold, and may send no indication if the WTRU speed is above a threshold QoS properties of the data to be received on the unicast link a. For example, the WTRU may be configured upon lack of RS or received SCI to indicate IS for a unicast link with certain QoS associated with its SLRB(s) and OOS for other QoS Reception of other feedback (e.g. HARQ, CQI) received by the WTRU at some time related to the lack of RS or SCI
   a. For example, the WTRU may be configured to indicate IS if the WTRU receives some feedback from the peer WTRU (e.g. HARQ, CQI, etc) during a (pre)configured or predetermined time window prior to the indication period where no RS and/or SCI is received.
Whether the WTRU declared an IS or OOS based on received reference signal measurements, prior to the indication period where no RS was received
   a. For example, the WTRU may decide whether to report IS or OOS during periods where no SCI is received based on previous indications of IS or OOS when SCI had been received, or when RS could be measured. The following are possible examples of how the WTRU determines IS/OOS when it receives no SCI (or insufficient RS) over an indication period based on previous indication periods where sufficient RS or SCI was present
      The WTRU may repeat the same indication (IS or OOS) as the last indication that was provided to upper layers
         (i) The WTRU may further provide the same indications the last indication up to a maximum number of indications, and possibly of a specific type. For example, a WTRU may indicate OOS if the last indication is OOS. On the other hand, a WTRU may indicate IS if the last indication is IS but only up to a number k consecutive IS generated without SCI. Following k consecutive IS generated without SCI (due to the repetition of the last IS) the WTRU may generate an OOS. If IS is generated following reception of SCI, the counter corresponding to determination of when to send OOS instead of IS is reset. The value of k may further be dependent on other factors specified herein (e.g. CBR, QoS, data periodicity, etc) or potentially configured as part of the unicast link.
      The WTRU may determine IS or OOS based on the last N indications to upper layers and some specific rule for calculating IS or OOS depending on the status (IS/OOS) of these last indications. For instance, the WTRU may determine IS if a certain percentage of the last indications were IS, and may determine OOS otherwise. The last N indications to upper layers used in such determination may be limited to those indications which are generated when SCI and/or sufficient RS is present. The percentage may further be dependent on other factors specified herein (e.g. CBR, QoS, data periodicity, etc.) or potentially configured as part of the unicast link.
      For example, a WTRU may indicate IS to upper layers for a (pre)configured or predetermined number of indication periods where no RS/SCI is received, following one or more indication period(s) in which the WTRU determined IS based on RS/SCI
      For example, a WTRU may indicate OOS to upper layers for a (pre)configured or predetermined number of indication periods following one or more indication period(s) in which the WTRU determined OOS based on RS/SCI b. In any of the cases above, the WTRU may use information from previous indication periods for a certain time (e.g. based on a timer). Specifically, a WTRU may start a timer upon the occurrence of an indication period in which no SCI/RS is received. Such timer may be reset at the reception of SCI/RS. After expiry of such timer, the WTRU may always indicate OOS to upper layers for any indication periods in which no SCI/RS is received, until the reception of SCI/RS following this.
Reception of broadcast transmissions by the peer WTRU
   a. For example, the WTRU may be configured to indicate IS if the WTRU receives broadcast transmissions from the peer WTRU during a (pre)configured or predetermined time window prior to the indication period where no RS and/or SCI is received.
Reception of feedback from the peer WTRU prior to no RS/SCI transmission
   a. Specifically, the WTRU may determine whether to generate IS or OOS during periods of no reception of RS/SCI based on reception of feedback from the peer WTRU which may have occurred prior to the periods of no reception of RS/SCI. Such feedback may consist of CSI reports, HARQ ACK NACK, location information associated with the peer WTRU, etc.
      For example, the WTRU may generate IS if feedback from the peer WTRU is associated to an "acceptable" measure over some time period prior to lack of SCI/RS. An "acceptable" measure may be associated with reception of CQI report above a threshold, reception of one or more (potentially consecutive) HARQ ACK, reception of WTRU location such that the distance to the peer WTRU is below a threshold, or some amount below the MCR associated with the transmitted data or the unicast link. The WTRU may generate OOS if such conditions are not met. When the above conditions are met, the WTRU may continue to generate IS:
         (i) For a certain period of where SCI/RS is not received. Following expiry of that time, the WTRU may generate OOS.
         (ii) While the WTRU continues to receive the said feedback that is deemed to be "acceptable"
A rule for generation of IS, OOS, NS based on a combination of the above factors is also possible. For example, a WTRU may generate IS (or NS, or no indication) during periods of no RS/SCI when the CBR of the sidelink channel is above a (pre)configured threshold and previous X indication periods when RS/SCI was available generated an IS indication. The WTRU may generate OOS when previous X indication periods when RS/SCI was not available and CBR is below a threshold. The WTRU may generate NS under all other conditions.

WTRU Generates Different Types of NS Indication

A WTRU may further be configured to generate different types of NS indications to upper layers which may be handled differently by upper layers as part of the RLF procedure described in following sections. For example, the WTRU may generate a first type of NS when SCI was expected at a specific slot (based on periodic transmissions) but not received. A WTRU may generate a second type of NS when the WTRU does not receive an expected SCI because it is busy performing its own transmission and/or exceeds its blind decoding limit. A WTRU may generate a third type of NS when the WTRU does not receive a SCI during the indication period and does not detect periodic transmissions from the peer WTRU.

WTRU Reports IS/OOS/NS Based on Quality of RS

A WTRU may report IS/OOS/NS based on the measured quality of the received RLM RSs from the peer WTRU in a unicast link. Determination of each indication may be based on the measured quality being above/below one or more (pre)configured thresholds.

WTRU Determines NS Based on the Thresholds for IS and/or OOS

In an example embodiment, a WTRU may be configured with threshold(s) for RS quality and may determine IS/OOS/NS depending on whether the measured quality of RS is below or above the configured thresholds. For example, a WTRU may be configured with threshold T in and T out, and may report IS when the measured RS quality is above T in, report OOS when the measured RS quality is below T out, and may report NS when the measured RS quality is between T in and T out. A WTRU may determine link quality from an individual RLM RS or individual set of RLM RS. Alternatively, a WTRU may determine link quality based on the average of multiple RS or multiple sets of RLM RS over time.

WTRU Determines IS/OOS/NS for Beam Transmissions Based on Properties of the Unicast Link In an example embodiment, a WTRU may determine the conditions for IS/OOS/NS when operating with multiple beams based on properties of the unicast link. Specific conditions for determining IS/OOS/NS for multiple beams may consist of any or a combination of:
  The number of beams, or percentage of beams, having a quality above a threshold for which the WTRU reports IS or similar to RRC layers
  The number of beams, or percentage of beams, having a quality below a threshold for which the WTRU reports OOS or similar to RRC layers
  The number of beams, or percentage of beams, having a quality above/below a threshold for which the WTRU reports NS to the RRC layer.
  Parameters associated with the above conditions (e.g. the number of beams, threshold, etc.), may be further dependent on one or a combination of the following conditions: Specifically, a WTRU may be configured with a different value of the parameter for determining the above conditions, or may be evaluate a specific condition different depending on any or a combination of:
  QoS of the service/flows on the established link, or the configuration of the SLRBs on the established link
  Congestion on the link (e.g. CBR measurement)
  Velocity of the WTRU
  Distance between the WTRUs, possibly combined with range requirements of the data being transmitted
  Periodicity and/or rate of transmissions by the peer WTRU In an example embodiment, a WTRU may indicate IS to upper layers if a minimum number/percentage of beams or RLM RSs measured by the WTRU are above a threshold. Such minimum number/percentage of beams may be (pre)configured and may depend on the periodicity of data and/or received RLM RS. Specifically, a WTRU may declare IS when a percentage P1 of beams has a measured quality above a threshold when the periodicity of data/RS transmissions from the peer WTRU is larger than a threshold period X. A WTRU may declare IS when a different percentage P2 of beams has a measured quality above a threshold when the periodicity of data/RS transmissions from the peer WTRU below the threshold period X. Without loss of generality, such example may be extended to indication of OOS or NS to upper layers. With such a solution, a WTRU may indicate radio link problems to upper layers more quickly when data transmissions from the peer WTRU are less frequent while in the condition that only a small subset of the beams serving the WTRU are above a threshold.

WTRU Determines NS Based on Insufficient Amount of Received RS

In an example embodiment, a WTRU may indicate NS based on its inability to determine the quality of the radio link due to insufficient amount of RS received from the peer WTRU, possibly over a (pre)configured time period.

In an example embodiment, a WTRU may be (pre)configured with a timer for determination of each indication (IS/OOS/NS) to upper layers. Upon expiry of the timer, if the WTRU has not received sufficient RS from the peer WTRU to reliably determine whether the radio link quality is above/below configured threshold(s), it may indicate NS to the upper layers. For example, an amount of sufficient RS may be determined by the reception of at least a (pre)configured number of RLM RS over a (pre)configured averaging window. For example, an amount of sufficient RS resources may be determined by the reception of at least one RS or RS set in a (pre)configured time period, where such timer period may be dependent on QoS, CBR, velocity or similar unicast link conditions.

WTRU Uses Different Thresholds of RS Generation Depending on V2X Specific Measurements In one embodiment, a WTRU may determine the thresholds to be used for IS/OOS determination based on measurements at the WTRU and/or factors specific to V2X transmission. For example, the WTRU may be configured with a different set of thresholds for determination of IS/OOS for different ranges of the following measurements or factors:
  Load on the sidelink (CBR)
  WTRU speed
  Reception of other feedback (e.g. HARQ, CQI)
  Reception of broadcast transmissions by the peer WTRU WTRU Processes RS Associated to Each Sidelink Process or Set of Subchannels for IS/OOS/NS Determination In one embodiment, a WTRU may determine IS/OOS/NS based on measurement of multiple RS resource sets, where each RS resource set is associated with a sidelink process (periodic and/or one-shot) active at the peer WTRU. Such process may further be associated with a sidelink process associated with unicast transmissions to the WTRU measuring IS/OOS/NS. A WTRU may associate all RS resources associated with the same sidelink process to the same RS resource set. A WTRU may identify a sidelink process from the peer WTRU based on indication of periodic transmission and/or selection of a periodic pattern of resources by the peer WTRU. A WTRU may associate a sidelink process with a specific non-periodic transmission (one shot) by the peer WTRU.

In another embodiment, a WTRU may determine the IS/OOS/NS based on measurements of multiple resource sets, where each RS resource set is associated with any RS received from the peer WTRU on a subchannel, a set of subchannels, a set of beams, a (set of) BWP, or a (set of) carrier. For example, a WTRU may be (pre)configured with groups of subchannels and may measure RS resources on each subgroup to determine the quality associated with each RS resource set.

A WTRU may determine the IS/OOS/NS status of the SL based on the multiple RS resource sets. For example, a WTRU may report IS as long as any of the following conditions is met, and may report OOS otherwise:
  a. At least one of the RS resource sets, measured over a period of time (e.g. indication period) has a measured quality above a threshold
  At least N of the RS resource sets, measured over a period of time (e.g. indication period) has a measured quality above a threshold
    i. N can be (pre)configured or predetermined
    ii. N can be a percentage of the total number of sidelink processes or SL subchannels (or sets thereof)
    iii. N can depend on the QoS of the transmissions in each sidelink process A WTRU may report NS in an indication period if there is insufficient number of RS resource sets. For example, a WTRU may report NS if the number of measured resource sets is below a threshold for the given indication period.

Using the above rules, a WTRU may further consider only a subset of the RS resource sets in the computation of IS/OOS/NS. For example, a WTRU may consider:
  a. Only the sidelink resource sets associated to transmissions where the WTRU is within the minimum communication range (if the transmission is associated with a minimum communication range)
  b. Only the sidelink resource sets associated with a transmission having a certain QoS (above, below a threshold, predetermined or (pre)configured by the NW or another WTRU)

A WTRU may send a message or indication to the peer WTRU (in the form of an RLF status, as described further herein) if the WTRU determines the quality of one of the resource sets is below a threshold, potentially for one or a number of indication periods.

In another embodiment related to the above, a WTRU may provide multiple IS/OOS/NS indications to upper layers, each associated with one of the above described resource sets. A WTRU may perform individual RLM, RLF determination on each of these resource sets.

WTRU Determines IS/OOS/NS for Transmissions where it is within the Minimum Communication Range In one embodiment, a WTRU may monitor/measure (for IS/OOS/NS determination) only the RS resources associated with transmissions where the WTRU is within the minimum communication range for the transmissions. Specifically:
  A WTRU may decode a unicast transmission from the peer WTRU
  A WTRU may determine the minimum communication range associated with a transmission (e.g. based on information within the SCI)
  A WTRU may determine the peer WTRU's location (based on information within the SCI), its own location, and may derive the distance between the two WTRUs
  If the distance between the two WTRUs is less than the minimum communication range, the WTRU may use the RS contained within the transmission when evaluating IS/OOS/NS. If the distance between the two WTRUs is larger than the minimum communication range, the WTRU may ignore the RS contained within the transmission when evaluating IS/OOS/NS.

In another embodiment, a WTRU may monitor/measure RLM RS only for transmissions associated with one or more values of minimum communication range. Specifically, a WTRU may be (pre)configured (by the network or the peer WTRU) with one or a set of minimum communication ranges to be considered for RLM/RLF. For example, the WTRU may determine the applicable minimum communication range for RLM/RLF to be the smallest minimum communication range configured for a unicast link (e.g. determine from SL RRC signaling received from the peer WTRU). A WTRU may consider the RLM RS received in transmissions associated with only the applicable minimum communication range performing IS/OOS/NS determination.

In either of the two solutions/embodiments above, a WTRU may generate NS and/or may disable RLM/RLF operation when it does not receive sufficient RS resources (possibly during a period of time) which are associated to applicable minimum communication range.

Generation of RLF Based on IS/OOS/NS Indications

RLF Determination Based on Aperiodic in Sync (IS) or Out of Sync (OOS) Indications from Lower Layers According to an embodiment, a WTRU may determine RLF based on IS and/or OOS indications from lower layers which are assumed not periodic. A WTRU may perform RLF determination based on any or a combination of the following:
  IS indications from lower layers only;
  IS and OS indications from the lower layers only;
  Both IS and OS indications from the lower layers combined with time between reception of any such indication from lower layers.

RLF Rule Determination Based on Absence of IS/OOS for a Time Period

According to an embodiment, a WTRU may declare RLF, or may start a timer related to the trigger of RLF when IS and/or OOS indications have not been received for a time T. In addition, such time may further depend on (such as via (pre)configuration):
  The measured or announced congestion metric (e.g. CBR);
  The number of carriers on which the WTRU is monitoring RLM associated with a specific RLM/RLF process;
  The QoS associated with the unicast/groupcast link, or the QoS of the highest priority or lowest priority (worst case QoS) SLRB associated with the unicast link;
  The periodicity of the data transmitted by the WTRU(s) transmitting the RS, potentially determined by an explicit indication of period in the SCI, or a specific pattern indicating the resources associated with that WTRU's transmissions.

RLF Rule Determination based on Considering Lack of IS/OOS as a new event

According to an embodiment, a WTRU may use Uu-based criteria for starting the RLF timer (i.e., number of consecutive OOS exceeds a configured value) where a lack of IS/OOS is considered a new event as part of the RLF procedure. Specifically, a WTRU may assume periodic IS/OOS is received from a lower layer. If neither IS nor OOS is received at a time instance where IS/OOS is being expected, the WTRU may consider such as a new event— No Sync (NS). Alternatively, a WTRU may receive 3 levels of indication from lower layers: IS, OOS, and NS. In such case, NS consists of a new explicit indication from a lower layer, and is indicated by the lower layers based on conditions described herein.

A WTRU may perform any of the following new actions related to RLF determination upon reception of NS:
  According to an embodiment, a WTRU may consider a NS to be equivalent to an IS.
    a. Specifically, a WTRU may start a timer TXXX upon reception of N consecutive OOS. The timer is reset if the WTRU receives N consecutive IS or NS following start of the timer. If the timer expires, the WTRU triggers RLF.

According to a different embodiment, a WTRU may consider a NS to be equivalent to an OOS.

a. Specifically, a WTRU may start a timer TXXX upon reception of N consecutive OOSs or NSs. The timer is reset if the WTRU receives N consecutive ISs following start of the timer. If the timer expires, the WTRU triggers RLF.

According to a different embodiment, a WTRU may consider a NS to be equivalent to either an IS or an OOS (and use the procedures in the above two embodiments) depending on any of the following at the time of execution of the procedure:

Load measurement (e.g., CBR) of the sidelink channel;
Periodicity of the data transmitted/received over the unicast link; —QoS properties of the data to be transmitted;
Reception of other feedback (e.g., HARQ, CQI) received by the WTRU at some time related to the NS.
Whether the WTRU received an IS or OOS prior to the NS indication
 a. For example, a WTRU may consider a NS as an IS if the previous indication was IS, otherwise, the WTRU may consider a NS to be an OOS.
Reception of broadcast transmissions by the peer WTRU
 a. For example, a WTRU may consider a NS to be an IS as long as the WTRU receives or detects broadcast transmissions by the peer WTRU, possibly over a (pre)configured or predetermined past time window relative to the NS indication In one example embodiment, a WTRU may consider NS to be either IS or OOS such that the ratio of NS converted to IS or OOS is (pre)configured or (pre)determined, where such ratio may further depend on Load measurement (e.g. CBR) of the sidelink channel
Periodicity of the data transmitted/received over the unicast link
QoS properties of the data to be transmitted.
Reception of other feedback (e.g. HARQ, CQI) received by the WTRU at some time related to the NS
Whether the WTRU received an IS or OOS prior to the NS indication
Reception of broadcast transmissions by the peer WTRU.
According to a different embodiment, a WTRU may initiate an additional timer upon reception of a NS, where such timer may have additional influence of the trigger or RLF. Specifically, a WTRU may start a second timer (TXXX2) upon reception of a NS, or upon reception of N consecutive NSs. The WTRU may trigger RLF if either the first timer or the second timer expires. Timer TXXX2 can be reset according to rules associated with reception of IS, OOS, or NS using similar mechanisms as legacy.
According to a different embodiment, a WTRU may count the reception of the NS as though it is a fraction of an OOS in the calculation of the number of OOSs to start TXXX. Specifically, a WTRU may start TXXX if the number of consecutive ISs or NSs satisfies the following formula: (1*number of OOS)+(k*number of NS) is equal to a configured value. The value k can be (pre)configured or may depend on the QoS or the sidelink channel conditions using methods similar to discussed in other solutions.

New Conditions for Starting Sidelink Recovery Timer—T310_S

A WTRU may start T310_S (Sidelink RLF recovery timer) as a result of new conditions related to generation of the NS indication. Specifically, a WTRU may start T310_S as a result of one or a combination of any of the following:

Measured CBR (possibly being above/below a configured threshold)
The expected QoS of the unicast link (possibly having a component which is above/below a configured threshold)
Reception of a number of (possibly consecutive) NS indications (possibly of a specific type) following one or more OOS indications
Reception of a number of (possibly consecutive) OOS indications following one or more NS indications (possibly of a specific type)
The combined number of OOS and NS received consecutively reaches a certain value In addition, the WTRU may determine the value of T310_S (i.e. the duration of the recovery timer before RLF is triggered) based on any of the above factors (e.g. CBR, number of OOS indications prior to the NS indications, etc, in addition to the (expected) periodicity of the peer WTRU transmissions.

In an example embodiment, a WTRU may start T310_S if it receives N2 consecutive NS indications following N1 consecutive OOS indications, and the CBR is above a (pre)configured threshold.

In another example embodiment, a WTRU may start T310_S following N consecutive indications of either OOS or NS. A WTRU may determine the length of T310_S based on a (pre)configured mapping table which may include any of CBR range
N
N1
N2
Ratio of N1 and N2
Expected periodicity of the peer WTRU transmissions
QoS of the unicast link WTRU Starts a New Timer During the Recovery Period to Handle No RS or SCI Condition In one embodiment, a WTRU may pause the recovery timer (T310_S) for some period of time associated with an unknown link quality from the lower layers. The WTRU may avoid triggering RLF (i.e. having T310_S expire) during this unknown period. The WTRU may further control the duration of the unknown period with an additional timer (T3XX). The WTRU, upon reception of an event or upon expiry of the unknown period, may performing any of the following:

Immediately trigger RLF
Stop/Restart T310_S
Resume T310_S at the value where it left off
Resume T310_S with some adjustment value
Stop T3XX but keep T310_S paused In one family of embodiments, the WTRU may start T3XX only while T310_S is running (i.e. after the trigger for initiating T310_S). In another family of solutions/embodiments, the initiation of T3XX may be performed at any time during RLM (i.e. before or during the recovery time). In such family of solutions/embodiments, T3xx may be initiated as a result of:

N consecutive OOS indications
N consecutive NS indications, possibly of a specific type (or the occurrence of the associated conditions)
Other conditions for initiating RLF-related timers discussed elsewhere herein.

The description and embodiments below apply, without loss of generality, to both families of embodiments.

Possible Actions Triggered During the Recovery Period

A WTRU may perform any or all of the above new behavior when T310_S is running and/or when T3XXX is started:

A WTRU may pause T310_S as a result of one or more events and/or one or more condition being satisfied while T310_S is running A WTRU may start T3XXX as a result of one or more events and/or one or more condition being satisfied while T310_S is running A WTRU may transmit a probe signal (as described herein), or an RRC/MAC CE control message A WTRU may initiate resource (re)selection for transmission of data A WTRU may enable HARQ feedback for any of its SL transmissions on the same unicast link, or associated with the same peer WTRU
  a. Such action may be further performed under the condition that the WTRU has pending transmissions and/or a pending grant for transmission to the peer WTRU which occurs within T3XXX, T310_S, or some related window. If such condition is not satisfied, the WTRU may perform other actions.
  b. Such action may be further performed under the condition that the WTRU starts T3XX
  c. Such action may be further performed under the condition that the WTRU receives N consecutive NS indications, possibly of a given type
  d. Such action may be further performed under the condition that the time between any IS indications is larger than a threshold A WTRU may change the format of its HARQ feedback for any of its SL transmissions on the same unicast link, or associated with the same peer WTRU Events/Conditions which May Trigger any Actions During the Recovery Period The above actions may be conditions on one or more event and/or conditions. In addition, each specific action may be conditioned on a different event/condition:

The WTRU receives N consecutive NS indications, possibly of a specific type
  a. A NS indication may be generated based on conditions described in previous sections
  b. Different NS indication types (as described herein) may generate different actions above The conditions associated with generation of NS (as described in previous sections) are met The WTRU does not receive any indications from lower layers for a period of time starting after the initiation of T310_S The measured CBR is above a (pre)configured threshold The QoS, possibly associated with a specific or active SLRB of the unicast link, meets some (pre)configured or predetermined conditions Events/Conditions which May Cause Termination or Restart of the Unknown Period A WTRU may monitor for new events/conditions during the unknown period (i.e. following the initiation of T3XX). Such events/conditions may be the same conditions associated with stopping T310 in Uu RLF (e.g. N311 consecutive IS indications). A WTRU may further monitor new conditions which may cause RLF-related actions or actions related to T310_S prior to the expiry of T3XX (e.g. immediately triggering RLF, or resuming T310_S). Specifically, the WTRU may stop T3XX upon occurrence of an event. The WTRU may restart T3XX upon occurrence of an event. The WTRU may stop both T310_S and T3XX upon occurrence of an event. The WTRU may resume T310_S upon occurrence of an event. The WTRU may resume T310_S with some adjustment value upon occurrence of an event. The WTRU may perform any of the defined behaviors associated with one or a combination of a (pre)configured number of specified events and/or conditions:

The WTRU receives HARQ feedback, possibly having a measured quality above a threshold The WTRU receives HARQ feedback, possibly having a measured quality below a threshold The WTRU does not receive HARQ feedback at an expected time instant (DTX)

The WTRU receives CQI feedback, possibly having a measured quality above a threshold The WTRU receives CQI feedback, possibly having a measured quality below a threshold The WTRU does not receive CQI feedback, at an expected time instant or within an expected time window The WTRU receives a probe response, possibly having a measured quality above a threshold The WTRU receives a probe response, possibly having a measured quality below a threshold The WTRU does not receive a probe response, possibly within an expected time window The WTRU receives one or more NS indications of a different type than the ones that started T3XX The CBR changes by an amount, or moves from below/above a threshold, to above/below a threshold The above thresholds/counters/conditions in each option of the above embodiments may be (pre)configured. The above thresholds/counters/conditions may further be configured specifically to each SLRB, and the WTRU may consider the active SLRB configurations of the unicast link to determine the value of each parameter for such link.

Determination of T3XX

A WTRU may be (pre)configured with a value of T3XX. Additionally, a WTRU may determine a value of T3XX (e.g. it may be configured with different values of T3XX to be used under different measured or configured conditions) based on any or a combination of the following:

WTRU speed

Measured CBR

QoS of the active SLRBs in the unicast link (e.g. each SLRB may be associated with a value of T3XX, and the WTRU may select the shortest T3XX of the active/configured SLRBs associated with the unicast link)

Periodicity of WTRUs own transmissions or of the peer WTRUs transmissions

Function of the TX to HARQ ACK/NACK feedback expected for any SLRB associated with the unicast link Number of IS or OOS indications received prior to the NS indications that initiated T3XX Example Embodiments In one example, a WTRU may pause T310_S upon reception of X consecutive NS_type1 or NS_type2, or upon any conditions generating such indications. NS_type1 or NS_type2 may be associated with WTRU not receiving any RLM RS for an RLM/RLF process within an indication period. NS_type 1 may be associated with lack of SCI received as a result of the WTRU performing transmissions at the expected time, or lack of SCI received at an expected time (based on periodic reservation of a periodic process), and under the condition that CBR is above a threshold. NS_type2 may be associated with SCI not received within the last indication period due to the peer WTRU not having any periodic sidelink processes configured (only asynchronous transmissions). Any other conditions of NS (or conditions not generating either IS nor OOS) may be treated as in legacy RLM/RLF. Following a pause of T310_S from NS_type1, the WTRU may resume T310_S upon reception of one or more IS or one or more OOS. In addition, when T310_S is paused due to NS_type2, the WTRU start T3XX and may enable HARQ feedback on its own transmissions to the peer WTRU (e.g. by transmitting a HARQ enable flag or HARQ requested flag in SCI associated with its data transmissions) and monitor HARQ feedback as part of the RLF procedure. Alternatively, the WTRU may trigger a request of CQI reporting by the peer UE, or any probe type trigger. The WTRU may then monitor the reception of response signal while T3XX is running. A WTRU may immediately trigger RLF if DTX is received N_H consecutive times from the time T3XX is started. If the WTRU receives acceptable HARQ feedback whose quality is above a threshold, the WTRU restarts T3XX, otherwise, the WTRU may continue T3XX (if ACK/NACK is received but the quality of the feedback is below a threshold). The WTRU may then trigger RLF when T3XX expires. A WTRU, while T3XX is running, may stop T310_S and T3XX when it receives an IS indication. A WTRU, while T3XX is running, may stop T3XX and resume T310_S when it receives an OOS indication.

Figure 4:
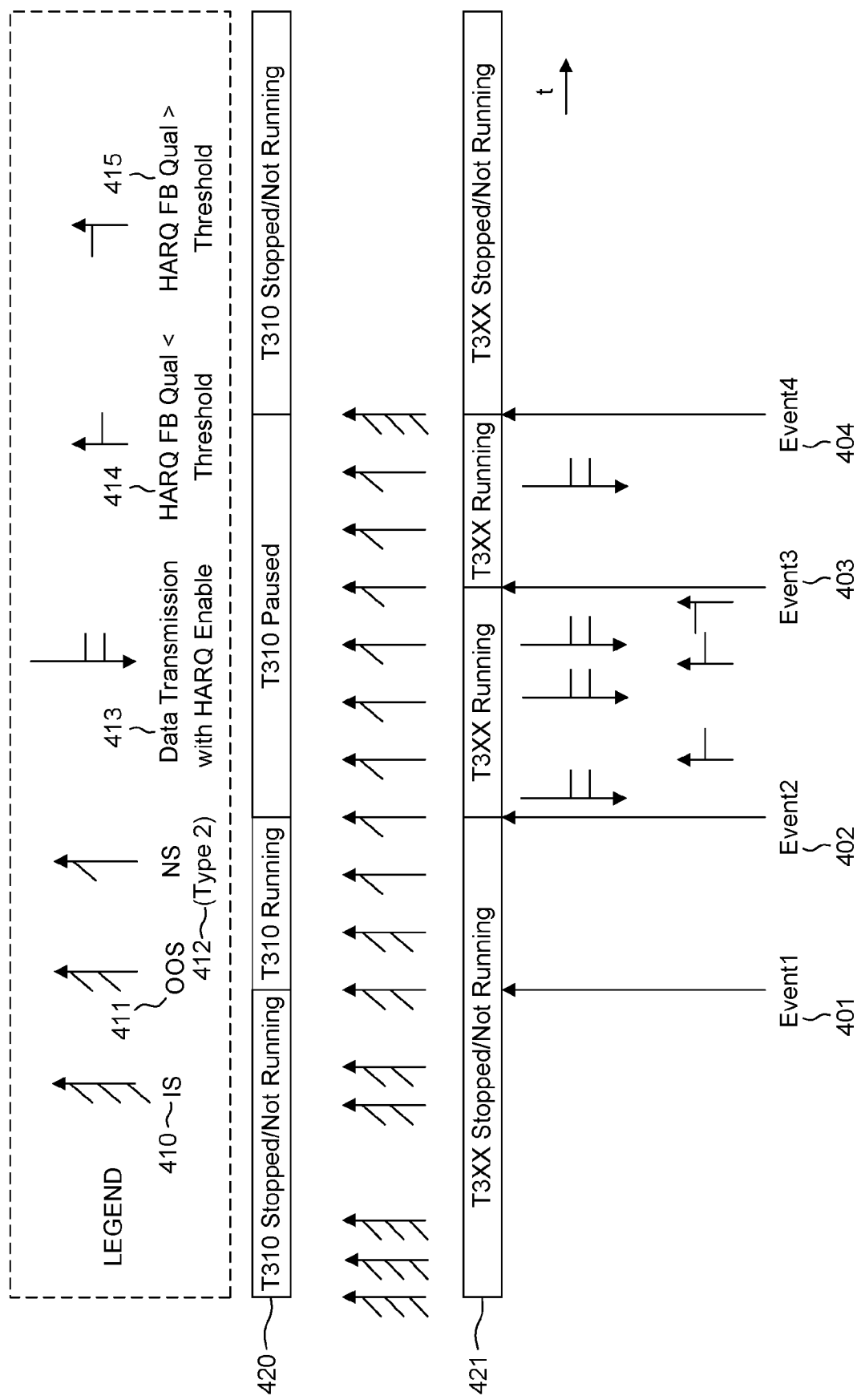
FIG. 4 is an example of RLF determination based on use of a recovery timer.
Figure 5:
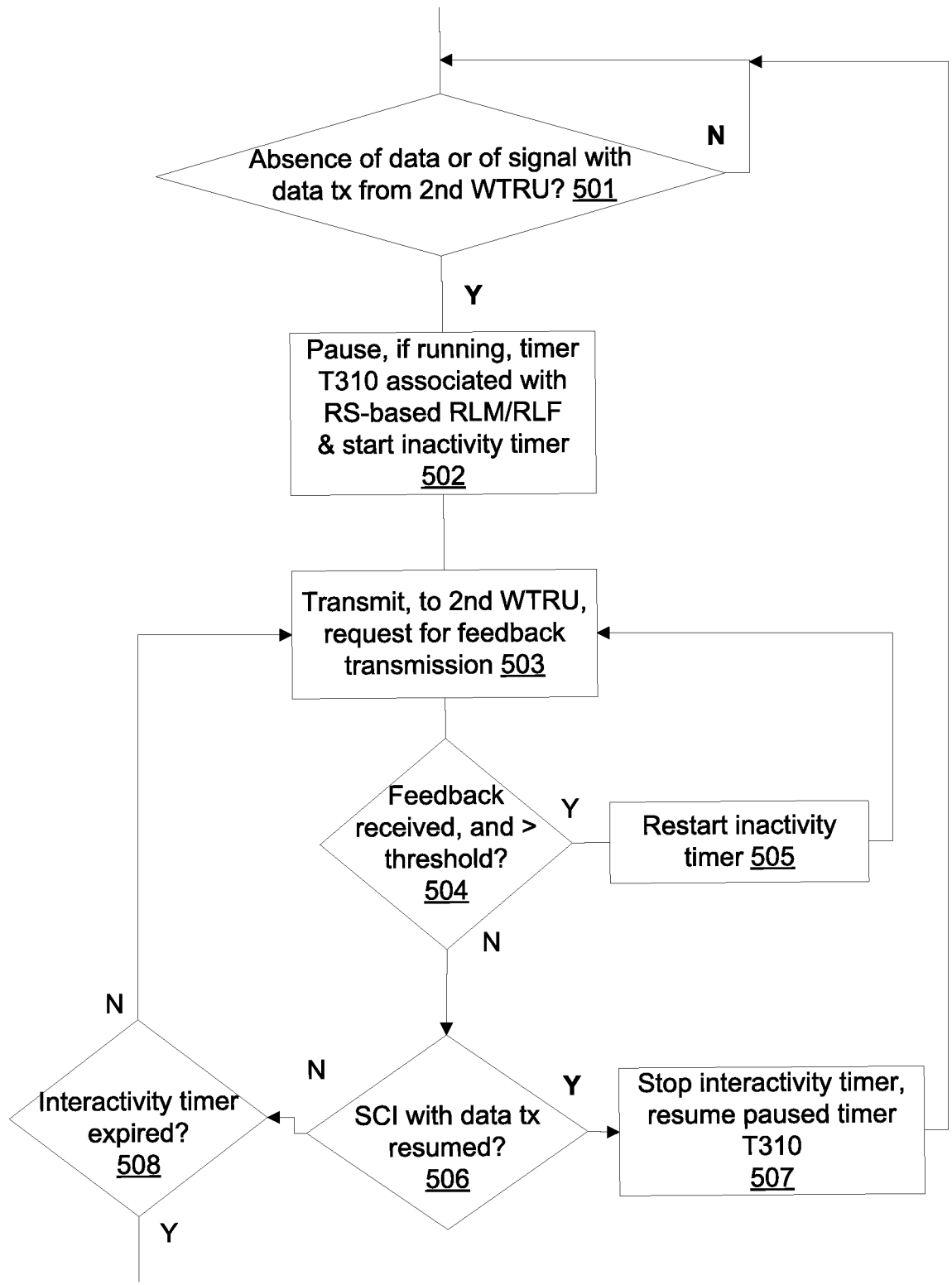
FIG. 5 is an embodiment where a WTRU uses RS-based FLM/RLF during regular receipt of data from a peer WTRU, and uses peer-transmission based RLF determination during periods of data transmission inactivity of the peer WTRU.

FIG. 4 illustrates an example embodiment. The embodiment is based on the following findings:
  NR V2X may support unicast links between peer WTRUs visible to the AS layer, so RLM/RLF support may be required;
  Uu-based RLM/RLF is based on periodic transmission of RS signals by the gNB, and periodic measurements of IS/OOS. IS/OOS may be measured regularly by the WTRU, for example each indication period;
  Periodic RS transmission by a WTRU, for the peer to do RLM, may be inefficient and therefore may not be supported;
  Without expectation of periodic RS transmission, a WTRU may not be able to distinguish between periods of non-transmission by the peer WTRU and loss of the unicast link.
Therefore, to perform RLM/RLF at a WTRU when a peer WTRU RS/Data transmission is non-periodic:
  During periods of regular data reception by a WTRU for a unicast link:
    The WTRU performs legacy-like RLM/RLF (e.g., RS-based RLM/RLF);
  During periods of no data/SCI reception by a WTRU for a unicast link:
    The WTRU generates NO Sync Indication to upper layers;
    Following N3XX Consecutive No Sync Indications:
      WTRU pauses T310 if running; WTRU starts T3XX;
      WTRU transmits CQI requests and performs RLM based on CQI feedback measurements:
        The WTRU resets T3XX when CQI feedback is >threshold
      RLF is triggered when T3XX expires.
More generally, therefore a WTRU uses RS-based RLM/RLF during regular reception of data from the peer WTRU, and uses peer-transmission based (CQI-based or other) RLF determination during periods of data transmission inactivity of the peer WTRU. In particular, see method 500 in FIG. 5, a first WTRU, to monitor a D2D connection with a second WTRU, may:

upon detecting absence (501-Y), during at least one period, of reception of scheduling information (SCI) associated with data transmission from the second WTRU:
  Pause (502) a timer (T310) associated with Reference Signal (RS) based radio link; monitoring (RLM/RLF) and start an inactivity timer (T3XX);
  Transmit (503), to the second WTRU, a request for a feedback transmission.
while the inactivity timer T3XX is running, perform RLM/RLF based on reception of feedback transmission:
  If a QoS value of the feedback transmission received from the second WTRU in reply to the request, is above a threshold (504-Y), restart (505) the inactivity timer;
  If receipt of scheduling information associated with data transmission from the second WTRU is resumed (506-Y), stop (507) the inactivity timer T3XX and resume the timer T310 associated with RS-based RLM/RLF;
  If the inactivity timer expires (508-Y), declare Radio Link Failure for the D2D connection.

See also FIG. 4. In the legend: an arrow with three diagonal stripes (410) corresponds to an IS indication; an arrow having two diagonal stripes (411) corresponds to an OOS indication, an arrow having one diagonal stripe (412) corresponds to an NS_type2 indication; an arrow with two horizontal stripes (413) corresponds to a data transmission with HARQ enable; an arrow with one horizontal stripe on the right side (414) corresponds to HARQ feedback quality inferior to threshold; an arrow with one horizontal stripe on the left side (415) to HARQ feedback quality superior to threshold. Illustrated on a time line are activities: stopped/not running, paused, or running, of timer T310 (420) and of timer T3XX (421). The events indicated in the figure correspond to:
  Event 1 (401): WTRU starts T310_S following N310=3 consecutive OOS indications
  Event 2 (402): WTRU starts T3XX following N3XX consecutive NS indications of type 2 while T310_S is running. T310_S is paused as a result, and the WTRU transmits HARQ enable with its own transmission following this
  Event 3 (403): WTRU resets T3XX following reception of a HARQ feedback with acceptable quality metric. T310 remains paused
  Event 4 (404): T310_S and T3XX are stopped following reception of N311=1 consecutive IS indications In another example embodiment, a WTRU may pause T310_S upon reception of NS_type1 or upon N consecutive NS_type2 (or upon any conditions generating such indications). NS_type1 may be associated with lack of SCI received at an expected time, and NS_type2 may be associated with SCI not received within the last indication period due to the peer WTRU not having any periodic sidelink processes configured (only asynchronous transmissions). Both NS_type1 and NS_type2 may initiate T3XX (where T3XX initiated by each type may be different timer values). For the case of T3XX initiated by NS_type1, if the WTRU does not receive any other indication from lower layers (apart from NS_type1), the WTRU may trigger RLF upon expiry of T3XX. Reception of IS or of OOS while T3XX is running may stop T3XX and resume T310_S. For the case of T3XX initiated by NS_type2, the WTRU may start T3XX and may enable HARQ feedback on its own transmissions to the peer WTRU (e.g. by transmitting a HARQ enable flag or HARQ requested flag in SCI associated with its data transmissions). The WTRU may monitor HARQ feedback as part of the RLF procedure. A WTRU may immediately trigger RLF if DTX is received N_H consecutive times from the time T3XX is started. If the WTRU receives acceptable HARQ feedback whose quality is above a threshold, the WTRU restarts T3XX, otherwise, the WTRU may continue T3XX (if ACK/NACK is received but the quality of the feedback is below a threshold). The WTRU may then trigger RLF when T3XX expires. A WTRU, while T3XX is running, may stop T310_S and T3XX when it receives N consecutive IS indications. A WTRU, while T3XX is running, may stop T3XX and resume T310_S when it receives an OOS indication.

RLF Rule Determination Based on Number (Possibly Consecutive) of IS/OOS Received Over a Period According to another embodiment, a WTRU may declare RLF, or may start a timer related to the trigger of RLF when the number of IS received over a time period T is below a threshold, or the number of OOS received over a period T is above a threshold. In such case, the time T and/or the thresholds may depend on similar factors as defined in the previous example.

According to another embodiment, a WTRU may declare RLF, or may start a timer related to the trigger of RLF when the number of consecutive OOS indications exceeds a threshold, where such threshold may further be determined by the factors indicated in the previous example.

According to another embodiment, a WTRU may declare RLF based on a combination of the conditions given in the previous example. Specifically, a WTRU may trigger RLF if the time between two indications exceeds a threshold, or if the number of consecutive OOS indication exceeds a threshold.

RLF Rule Based on Ratio of IS/OOS/NS

In an example embodiment, a WTRU may declare RLF, or may start a timer related to the trigger of RLF when the ratio of any of IS/OOS/NS over a (pre)configured or pre-defined time is below/above a threshold. For example, a WTRU may maintain a ratio of NS/IS over its last X received indications, or over the last x seconds. The WTRU may start a timer related to the trigger of RLF if such measured ratio is above a threshold. In addition, a WTRU may stop the said timer while running if the ratio falls below a (possibly different) threshold. The WTRU may trigger RLF upon expiry of the said timer.

Alternatively, a WTRU may declare RLF, or may start a timer related to the trigger of RLF when the percentage of any of IS/OOS/NS, over the total number of lower-layer indications is above/below a threshold.

The WTRU may be configured with a different triggering ratio threshold, different observation window, or different ratio to monitor (e.g. OOS/IS vs NS/OOS) based on any of the following:
  Measured channel congestion (CBR)
  QoS of the unicast link
  WTRU velocity
  Distance between the WTRUs
  Periodicity of the data transmissions between the WTRUs
  Pattern of reserved resources (e.g. TFRP) between the WTRUs in the unicast link RLF Rule Based Number of Slots Between IS/OOS/NS Indications In another embodiment, a WTRU may declare RLF, or may start a timer related to the trigger of RLF when the number of time units elapsed since reception of an indication from lower layers exceeds a threshold. The time unit may be a (pre)configured or pre-determined number of slots/sub-frames/frames. Alternatively, the time unit may be a (pre) configured or pre-determined number of periods of a periodic SL process received by the peer WTRU. Such number may further depend on SLRB configuration, QoS, number of active SLRBs and/or CBR.

In one example embodiment, a WTRU may start a counter at the reception of a first OOS indication and may increment such counter by a number of time units at each reception of subsequent OOS without any subsequent IS indications. If the counter reaches a threshold, the WTRU may declare RLF, or may start a timer related to the trigger of RLF. A WTRU may further reset such counter upon reception of IS before the counter reaches the threshold.

In another example embodiment, which can be used in conjunction with the previous example, a WTRU may start a counter at the reception of one or more OOS indications and may increment such counter at each time unit in which neither IS nor OOS is received. The WTRU may declare RLF or may start a timer related to the trigger of RLF if the counter reaches a threshold.

In another example embodiment, a WTRU may start/reset a counter at the reception of an IS indication. The WTRU may increment the counter by a first amount at each time unit without reception of any indications and may increment the counter by a second amount at each reception of a OOS indication. Such first and second amounts may be (pre) configured or predefined at the WTRU. The WTRU may declare RLF or may start a timer related to the trigger of RLF if the counter reaches a threshold.

Different Rule for Starting a Timer vs Direct Trigger of RLF

According to another embodiment, a WTRU may start a timer for RLF based on one trigger and may trigger RLF (without starting a timer) based on another condition. For example, a WTRU may start an RLF timer upon the detection of N consecutive OOS indications, and may trigger RLF (without starting a timer) upon detection of no IS and/or OOS indications received for a period T.

Without loss of generality, the conditions for cancelling an initiated RLF timer may be derived from (as the opposite or contrary condition) any of the conditions for starting the timer.

Communicating RLF State

WTRU Informs Peer WTRU(s) and/or Network of SL-RLF or SL-RLF State of a SL Unicast Link In a family of embodiments, a WTRU may indicate SL-RLF or may inform a peer WTRU or the network about its own RLF state. For example, upon triggering RLF, a WTRU may inform the peer WTRU by performing a SL transmission which may take, for example, any of the following forms:
  A SL-RRC message transmitted on the same unicast link;
  A SL MAC CE message transmitted using broadcast mechanism;
  An SCI transmission explicitly indicating the SL-RLF;
  Transmission of a PHY layer sequence encoding the SL-RLF state;
  According to another embodiment, a WTRU may inform the network about an SL-RLF or provide the SL-RLF state by performing, for example, any of the following:
  Transmission of an RRC message to the network;
  Transmission of a MAC CE to the network;
  Transmission on an uplink control channel (SR, PUCCH, etc.);
  Initiating an RRC connection or RRC resume to the network in order to transmit such indication while in RRC_CONNECTED;

Initiation of a 2-step RACH procedure which provides the RLF indication.

The SL-RLF state message may contain, for example, any of the following:
- Identification of the unicast link for which the SL-RLF state is being transmitted, such as the source or destination address(es) associated with the unicast/groupcast link;
- An identity (potentially NW assigned) which identifies the unicast link, the UE, or the peer WTRU (e.g. C-RNTI or similar);
- The condition (e.g. RLF timer started, number of IS/OOS, RLF declared) associated with the SL-RLF state (as defined below);
- The SLRB associated to the bearer which may have triggered the SL-RLF.
  - The QoS profile of the bearer or link which may have triggered the SL-RLF
  - The last reported location of the peer WTRU and/or the location of the said WTRU WTRU Transmits RLF State to the Peer WTRU Implicitly Using Special Feedback In an example embodiment, a WTRU may implicitly/explicitly transmit the SL-RLF status to the peer WTRU based on certain actions related to its normal feedback transmissions. Such actions may be performed at RLF determination by a WTRU in order to speed up the determination of SL-RLF by the peer WTRU, and therefore avoid data transmissions by the peer WTRU under such conditions. Alternatively, such actions may be performed prior to trigger of SL-RLF when the said WTRU is experiencing PHY layer problems on SL (e.g. while the SL-RLF timer is running). A WTRU which triggers RLF may inform its peer WTRU using any of:
- HARQ feedback transmissions
  - a. In one example solution, a WTRU may transmit a NACK regardless of the decoding status of any received data at the time of HARQ transmission
  - b. In another example solution, a WTRU may not transmit any HARQ feedback (ACK or NACK) regardless of the decoding status at the time of HARQ feedback determination.
  - c. In one example solution, a WTRU may transmit a NACK or special indication on PSFCH which is unexpected or not tied explicitly to a data transmission by the peer WTRU
  - d. In one example solution, a WTRU may transmit multiple NACK feedbacks associated with the same received TB
- CQI feedback transmission
  - a. In one example solution, a WTRU may transmit a CQI report having a special or designated value of channel quality to represent SL-RLF of PHY layer problems
  - b. In another example solution, a WTRU may stop transmitting CQI feedback upon SL-RLF determination or upon detection of PHY layer problems (e.g. while SL-RLF timer is running)

WTRU Transmits the SL-RLF State

A WTRU may transmit any information related to the state of SL-RLF to the peer WTRU(s) or to the network. The SL-RLF state may consist of any of the following:
- Indication of start/stop of the SL-RLF timer;
- Current value of the SL-RLF timer, possibly associated with a specific unicast/groupcast link;
- Events related to the number of IS/OOS indications received from lower layers, such as:
  - a. Number of IS/OOS indications exceeds a threshold;
  - b. Number of IS/OOS indications in a configured time is above/below a threshold;
- The actual trigger of the SL-RLF.
- Indication that one or more RS resources, or the RS resources associated with one or more subchannels, beams, BWPs or carriers, has a measured quality that is below a threshold. The one or more RS resources may be associated with a sidelink process at the WTRU. The one or more RS resources may be associated with (pre)configured or WTRU determined subset of subchannels, beams, carriers, or BWPs.

WTRU Decides to Transmit RLF or RLF State to the Network or the Peer WTRUs

A WTRU may determine to send RLF indication, or the RLF state to either the network or to the peer WTRU. This decision may be based on one or more of the following:
- CBR on the SL resource pool: for example, a WTRU may send the SL-RLF state to the NW if the CBR on the SL resource pool is above a threshold;
- DL RSRP: for example, a WTRU may send the SL-RLF state to the peer WTRU if the DL RSRP associated with the camped/connected cell is below a threshold;
- Coverage Condition of the WTRU and/or Peer WTRU(s): for example, a WTRU may transmit the RLF state to the network if it is in coverage in Uu. Alternatively, a WTRU may transmit the RLF state to the network if the WTRU and its peer WTRU(s) are in coverage of the same cell or set of cells. The WTRU may determine the coverage situation of the peer WTRU based on transmissions of the camped/connected cell or set of cells by the peer WTRU;
- RRC State of the WTRU: for example, a WTRU may transmit the RLF state to the network when it is RRC_CONNECTED while it may transmit the RLF state directly to the peer WTRU (via sidelink) when the WTRU is in RRC IDLE.
- Value of an RLF Timer: For example, a WTRU may transmit the RLF state to the network or to a peer WTRU when a timer related to RLF is started, or when the timer has reached a certain (pre)configured or predetermined value. Specifically, sending the RLF state to the network or a peer WTRU can be used by the network or peer WTRU to change transmission parameters and/or SL resources to avoid SL-RLF.
- Value of one or more RS resources being measured for RLM falls below a threshold: For example, a WTRU may monitor multiple RS resources or RS resource sets, and the WTRU may transmit the RLF state when the quality of one or more of these falls below a threshold.

WTRU Receives a SL-RLF State from the Network

A WTRU may receive SL-RLF indication of SL-RLF state associated with a unicast/groupcast link. The WTRU may receive such information, for example:
- In dedicated RRC signaling from the network, such as in an RRC reconfiguration message or a new RRC message;
- In a paging message from the network when the WTRU is in IDLE/INACTIVE state;
- In a system information broadcast (SIB): For example, a WTRU may read SIB to determine the unicast links which may indicate SL-RLF.

WTRU Sends Non-Transmission Indication to peer WTRU

In one embodiment, a WTRU may send an indication of non-transmission to the peer WTRU to inform the peer WTRU that it will not transmit data (and consequently RS for RLM) for a time period. Such indication could be used by the peer WTRU to differentiate periods of no transmission from an actual RLF condition. A WTRU, upon sending the non-transmission indication, may avoid any transmissions on sidelink for some period of time, possibly indicated in the non-transmission indication, or possibly predetermined or (pre)configured. Alternatively, a WTRU, following transmission of the non-transmission indication associated with a time period, may be allowed to transmit on sidelink based on certain conditions, possibly associated with the data (e.g. latency of the data to be transmitted).

A non-transmission indication may be associated with a time period which is pre-determined or (pre)configured. Specifically, the TX WTRU and/or RX WTRU may act upon the non-transmission indication for this pre-determined or (pre)configured time period. Alternatively, the non-transmission indication may be associated with a time period that is signaled as part of the indication.

A WTRU may send a non-transmission indication when:
  it determines that it has no data in its buffers, possibly associated with a unicast link
  when it does not intend to use one or more reserved future sidelink grants
  when the network has disabled a previously configured SL configured grant
  when transmissions are not allowed for some time, due to (for example) congestion control, pre-emption, priority of UL/SL traffic, change of coverage scenario at the WTRU, etc
  when traffic is moved from SL to UL (e.g. based on upper layer decision)

A WTRU may include, in addition to the non-transmission indication:
  a period of time (possibly a minimum or maximum time) during which the WTRU will not transmit on SL
  an absolute time instance of the earliest possible SL transmission by the WTRU following the non-transmission indication
  an absolute time instance of the last transmission by the WTRU for some time
  an ID (e.g. a source or destination ID) associated with possible broadcast transmissions that can be used by the peer WTRU to perform RLM/RLF during the non-transmission A WTRU may transmit the non-transmission indication:
On PSCCH
  a. For example, a standalone SCI can be used to indicate non-transmission for some time period
  b. For example, and SCI which indicates data or future reservation may further indicate that the SCI and/or the associated data transmission will be the last sidelink transmission by the WTRU for some time, whereby this time is either (pre)configured or indicated by the WTRU
On PSSCH
  a. For example, a WTRU may transmit a non-transmission indication in a MAC CE or an RRC message, possibly multiplexed with data transmission for one or multiple logical channels.
On PSFCH
  a. For example, a WTRU may include a non-transmission indication with its HARQ feedback if it has pending HARQ feedback to send to the peer WTRU
On a new dedicated physical channel A WTRU which receives a non-transmission indication associated with a unicast link may perform any of the following during the period of time associated with the non-transmission indication:

Stop monitoring RLM-RS
  Stop IS/OOS indications to upper layers
  Stop and/or reset any RLF-related timers (e.g. T310_S or similar)
  Generate NS indications to upper layers
  Change the thresholds for IS/OOS determination to a different set of thresholds associated with such time period
  Change to a different mode of RLF determination
    a. For example, a WTRU configured to perform RLM-RS based RLF detection may change to SCI decoding based or HARQ based RLF detection during the period of time associated with the non-transmission indication A WTRU which receives a non-transmission indication may re-initiated RLM-based RLF following expiry of the associated time period. Alternatively, the WTRU may re-initiate RLM-based RLF following the first transmission by the peer WTRU after expiry of the associated time period or after reception of the non-transmission indication. The WTRU may further re-initiate RLM based on such data reception if the reception is associated with periodic transmissions by the peer WTRU, and/or is associated with certain QoS characteristic or data transmission characteristic (e.g. periodicity above/below certain threshold).

WTRU Changes the Resources for Transmission to Avoid SL-RLF

One problem to address is that SL-RLM/RLF is based on transmission of reference signals with SL data transmissions. Since SL data transmissions are limited to a subset of subchannels (e.g. selected by the TX WTRU in mode 2), a WTRU may trigger SL-RLF in case of a deep fade in one or more subchannels, when the remaining subchannels may be of better quality. The following embodiments may address this problem.

WTRU Performs Periodic Resource Selection/Reservation with non-repeating subchannels In one embodiment, a WTRU may perform resource selection and reservation for periodic data with different sequence of subchannels within the periodic reservation. Specifically, a WTRU may transmit on one subchannel at time N of a periodic transmission sequence, while reserving a different subchannel for time N+P (where P is the transmission period).

In one example embodiment, a WTRU may follow a predetermined or (pre)configured pattern for the subchannels used in the periodic transmission, where the predetermined or (pre)configured pattern may be known by all WTRUs performing sensing. A WTRU may select a resource for transmission at time N located at subchannel x, and then reserve (using a reservation indication in the SCI) the same resource located at subchannel y at time N+P, where the relation between x and y is known. A WTRU performing resource selection may determine the set of occupied resources by detecting the reservation indication in the SCI transmissions and using the known relationship between x and y to determine the next occupied resource(s) following the SCI.

In another example embodiment, a WTRU may follow a WTRU-specific (pre)configured pattern, or a WTRU determined pattern, and signal the pattern in the SCI. A WTRU may determine a first subchannel for the resource selected at N, and may determine (based on sensing results) another available resource at subchannel N+P. The WTRU may signal in the SCI the subchannel of the resource reserved at N+P (e.g. as an explicit subchannel number, or as an offset from the subchannel at N). Alternatively, a WTRU may be (pre)configured with a WTRU specific pattern of resources and may signal the pattern using a pattern index or identifier. A WTRU, when performing resource selection, may exclude resources indicated as reserved based on the information in the SCI, specifically:

The WTRU may exclude a resource of (subchannel, slot) if an SCI in the sensing results indicates that (subchannel, slot) as occupied The WTRU may exclude a resource of (subchannel, slot) if the resource pattern indicated in SCI results in a slot that is reserved.

WTRU Performs Resource (Re)Selection Based on RLM/RLF Triggers/Conditions

In one embodiment, a WTRU may perform resource reselection to ensure avoidance of RLM/RLF. Reselection may consist of any of the following:

Selection of a new periodic resource for a sidelink process

Selection of a new one-shot (asynchronous) resource for a sidelink process

Selection of a new beam or set of beams for sidelink transmission

Selection of a new sidelink carrier and/or bandwidth part for sidelink transmission A WTRU may perform reselection based on new triggers related to any or a combination of the following:

RLM/RLF State Indication from Another WTRU:
  a. For example, a WTRU may perform resource reselection for periodic transmission upon reception of one or a number of messages containing RLM/RLF state information (e.g. an indication that the RLF timer at the peer WTRU has been started, or any similar information as described in more detail herein). A WTRU may further reselect a new periodic resource by avoiding the previous resource(s) that was used in the past based when the WTRU received RLM/RLF state information. In avoiding such resources, a WTRU may further select resources which are at least some distance away from the said resources, on a different carrier, or a different BWP.

WTRU's own RLM/RLF state for the same WTRU:
  a. For example, a WTRU may perform resource reselection related to its transmissions to a peer WTRU based on an RLM/RLF related event associated with transmissions received from that WTRU. Such event may be the initiation of an RLF timer, the value of an RLF timer reaching a certain value, triggering of RLF, or similar. A WTRU may further perform such reselection conditioned on any of the following:
    i. The WTRU determines the channel to be reciprocal
    ii. The WTRU uses a frequency resource (e.g. subchannel) for its transmissions whose frequency location is within a certain range of the frequency resource used by the peer WTRU
    iii. The WTRU and/or peer WTRU have periodic transmissions Measure of the variation of frequency resources/subchannels used by the WTRU:
  a. A WTRU may maintain a measure of the variation in frequency resources (e.g. subchannels) which it has used for resource selection, possibly over a period of time, and possibly associated with transmissions to the same WTRU/unicast link. For example, a WTRU may measure the number of different subchannels or subchannel sets used for its transmissions, and/or the frequency distance between subchannels or subchannel sets it uses for its transmissions. A WTRU may perform resource reselection for periodic transmission based on such measurement (e.g. such measurement is below a threshold, possibly during a period of time). A WTRU may derive such measurement from resources used for both periodic and asynchronous transmissions.

Channel quality measurements (e.g. CQI, RSRP) received from the peer WTRU, or measured by the WTRU
  a. A WTRU may perform resource selection based on received or measured CQI and/or RSRP measurements. Specifically, a WTRU may trigger resource reselection when:
    i. The reported/measured CQI and/or RSRP is below a threshold, possibly for a period of time
    ii. The reported/measured CQI and/or RSRP changes by a certain amount, possibly over a period of time
  b. A WTRU may further select the resources during resource reselection based on such measurements. For example, a WTRU may select a new set of resources whose distance (e.g. in subchannels, beam, carrier, etc.) from the original location depends on the reported/measured CQI and/or RSRP or amount of change of such measurements. In another example, a WTRU may reselect resources for one periodic process (with lower associated CQI measurements) such that the resources selected are closer to (e.g. adjacent in frequency, on the same carrier, on the same beam, etc)

Periodically
  a. For example, a WTRU may be configured to periodically perform resource reselection for periodic transmission. The periodicity of resource reselection may be (pre)configured and may further depend on:
    i. CQI measurements at the WTRU or received from the peer WTRU
    ii. Active QoS transmissions on the unicast link (e.g. established SLRBs or LCHs and their corresponding QoS related parameters)
    iii. The configured RLM indication period RLF Determination Based on Quality of Service Metrics A WTRU Triggers Different Types of SL-RLF Associated with Different Bearers of QoS A WTRU may trigger different types (or instance) of SL-RLF, each corresponding to a different failure associated with a SLRB. Alternatively, a WTRU may trigger different types of SL-RLF, each associated with a different QoS level. The trigger of SL-RLF associated with a specific QoS level may initiate SLRB failure for all SLRB associated with that QoS level. Upon SLRB failure, the WTRU may inform upper layers.

According to an embodiment, a WTRU can trigger a different SL-RLF depending on the service and/or bearer(s) configured on a unicast/groupcast link. A WTRU may be configured with different RLF-triggering conditions depending on the service/SLRB based on the QoS associated with that SLRB. For example, a WTRU may be configured with multiple RLF configurations/conditions each associated with a different VQI. A WTRU may trigger SL-RLF on an SLRB, where the SLRB is associated with a VQI, when the RLF-conditions associated with the VQI of that SLRB are met. Such configuration/conditions which may be configured may consist of:

Different RLF timer;
Different thresholds for determination of IS/OOS
Different conditions for starting/stopping the RLF timer;
Different thresholds/conditions for HARQ-feedback-based RLF declaration (as described below);

Different thresholds/conditions for resource selection failure-based SL-RLF (as described below);
Different thresholds/conditions for CQI-based SL-RLF (as described below);
Different thresholds/conditions for RLM-based SL-RLF (As described below).

A WTRU may trigger SL-RLF for a single radio bearer only. This may not lead to any specific recovery actions, or may lead to termination of the bearer without terminating the link. On the other hand, a WTRU may initiate recovery actions (actual link failure) if SL-RLF is triggered for all SLRB on the unicast link.

According to an embodiment, a WTRU may be configured with independent RLF processes for each SLRB configured on a unicast/groupcast link and may trigger RLF specific to a SLRB when the conditions associated with that SLRB are met.

According to another embodiment, a WTRU may configure the SL-RLF conditions/parameters based on the worst-case (potentially in terms of QoS) SLRB that is currently active on the unicast link.

A WTRU can trigger also trigger SL-RLF associated with the link itself, using the same or different conditions than for bearer-based SL-RLF. A WTRU may be configured with a single procedure which measures a number of events from the lower layers. When the number of events from the lower layer exceeds a threshold, the WTRU may trigger SL-RLF. The QoS level/SLRB and/or whether the WTRU triggers SL-RLF for the link can be based on:

The type of event: the WTRU may be configured with a set of event types to count based on the QoS level or whether SL-RLF is for the link itself. For example, the WTRU may be configured to monitor for OOS indications and resource selection failures for one QoS level/SLRB, while it may be configured with monitoring of HARQ feedback received/not received for another QoS level The number/frequency of occurrence of the event: the WTRU may be configured with a different number of occurrences of the event (possibly within a timer) associated with each QoS/SLRB or associated with actual link failure.

Independent IS/OOS Triggering Conditions for RLM-Based RLF Associated with Different VQI/SLRB According to an embodiment, a WTRU may be configured with different BLER targets for each SLRB and generate IS/OOS indications per SLRB (for each of the SLRBs configured at the WTRU) based on each Block Error Rate (BLER) target. A WTRU may receive a BLER target indication or a VQI indication with each IS/OOS indications it received from lower layers in order to identify the BLER target(s) which are met with a given indication. A WTRU may further determine that an IS or OOS indication associated with one VQI or BLER target to apply to other VQI or BLER targets associated and may make such determination based on a (pre)configured or predetermined ranking of QoS and/or BLER target. For example, a WTRU may receive IS indication associated with VQI x, and may assume interpret IS for all VQI>x upon such reception.

A WTRU may further perform independent RLF procedures for each SLRB based on the IS/OOS indications associated with each BLER target or VQI, using the methods described herein.

WTRU Triggers SL-RLF Based on HARQ Feedback

Figure 6:
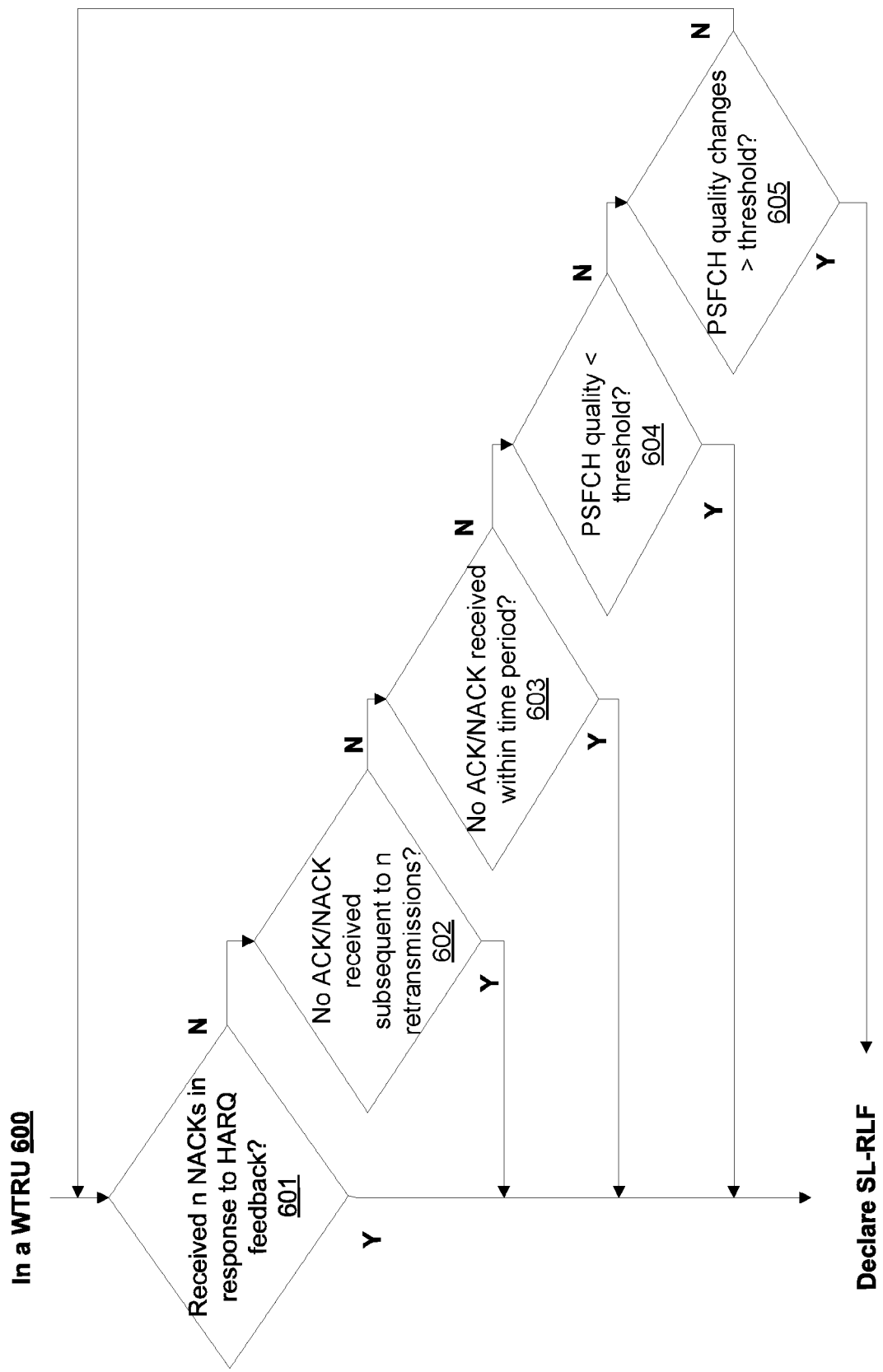
FIG. 6 is an embodiment where the WTRU triggers (declares) SL-RLF based on HARQ feedback.

According to an embodiment, see 600 FIG. 6, a WTRU may trigger SL-RLF associated with a specific unicast/groupcast link, or may initiate a timer related to SL-RLF triggering, based on HARQ feedback received from that link. Specifically, a WTRU may trigger (declare) SL-RLF based on, for example, any or a combination of any of the following example events:

A WTRU receives (601-Y) a number of consecutive NACKs for transmissions on the same unicast/groupcast link, and/or the number of received NACKs in a configured time exceeds a threshold (without ACK);

A WTRU does not receive ACK or NACK on a given unicast/groupcast link following a certain number of retransmissions (602-Y), or after a (pre)configured period of time (603-Y);

The percentage of received ACK/NACK over a (pre) configured time (or preconfigured number of data transmissions) is above/below a threshold.

The WTRU receives PSFCH with quality below a threshold (604-Y)
  a. The WTRU may measure PSFCH quality using RS RSRP (e.g. if RS is transmitted with HARQ feedback) or PSFCH RSSI (e.g. if RS is not transmitted with HARQ feedback)

The received quality of PSFCH changes by a threshold (605-Y)

In the above triggering conditions may further be conditioned on any of the following. For example, a different number of consecutive received NACKs for which a WTRU triggers RLF, or starts a timer related to RLF determination may be configured for different:
  QoS of the unicast link
  Periodicity of data transmissions
  Velocity of the WTRU
  Distance between the WTRUs
  Measured channel congestion (e.g. CBR)
  Configured pattern of transmission (e.g. TFRP)

WTRU Uses HARQ-Based RLF as Long as HARQ is Enabled

According to an embodiment, a WTRU may use HARQ based RLF as long as the WTRU is configured to received HARQ feedback from its peer WTRU. If HARQ is disabled for the unicast link, the WTRU may fallback to using CQI-based RLF, probe-response-based RLF, or RLM-based RLF. Similarly, if CQI is disabled, the WTRU may fallback to using HARQ based RLF or RLM based RLF.

WTRU Enables/Disables HARQ Based on Need for RLM/RLF Related Information

According to an embodiment, a WTRU may enable/disable HARQ feedback for data transmission depending on the RLM/RLF status or the need for providing HARQ feedback for the purposes of RLM/RLF.

In one example embodiment, a WTRU may transmit a HARQ ACK enable indication to the peer WTRU when it has not received signaling for some period of time to allow it to perform its own RLM/RLF, where such signaling could be any of:
  Data and/or SCI transmissions
  RLM RS transmissions
  RLM RS transmissions above a threshold
  CQI reports
  ACK/NACK For example, a WTRU may transmit a HARQ ACK enable indication to the peer WTRU after a period T without reception of any SCI and/or data transmissions containing RLM-RS.

In another example embodiment, a WTRU may enable HARQ ACK following a period of time in which it did not transmit, possibly over the unicast link. The WTRU may then disable HARQ ACK feedback following successful reception of HARQ ACK feedback or link status determination based on HARQ ACK, using any of the conditions discussed herein.

Following transmission of the HARQ ACK enable indication, the said WTRU may start decoding HARQ ACK in response to its own data transmissions to the peer WTRU. Following reception of a HARQ ACK enable indication, the peer WTRU may initiate HARQ transmissions in response to any data it receives.

Conversely, a WTRU may transmit a HARQ ACK disable indication to the peer WTRU when it has determined the status of the link or the RLM/RLF status is can be reliably determined. Specifically, the WTRU may transmit the disable indication after any of the following (possibly in combination) occur:

The WTRU receives N consecutive ACK/NACK from the peer WTRU

The WTRU receives N consecutive ACK/NACK indications from the peer WTRU having quality above a threshold The WTRU receives N data transmissions and/or RS transmissions from the peer WTRU The WTRU receives N data transmissions containing RS which has a quality above a specified threshold The RRC layers receives N consecutive IS/OOS from lower layers The RRC layers stops a timer related to RLF In another example embodiment, enable/disable or HARQ ACK may be determined by a timer at both WTRUs. Specifically, WTRU1 may use any of the above conditions to determine that it should start decoding HARQ ACK in response to its own transmissions. Similarly, WTRU2 may enable HARQ ACK transmissions after a time period T during which any of the following:

WTRU2 has not transmitted any RS and/or data

WTRU2 has not transmitted any CQI report

WTRU2 has not transmitted any ACK/NACK

WTRU Chooses Between RS-Based and Non-RS Based Depending on RLM/RLF Conditions/Status In one embodiment, a WTRU may select between enabling RS-based (i.e. HARQ feedback on PSFCH using a format containing RS) or non-RS based HARQ feedback (i.e. HARQ feedback on PSFCH using a format not containing RS) based on RLM/RLF status, in conjunction with any of:

CBR of the medium

QoS of the unicast link

Distance between the WTRUs

Expected transmission periodicity of the WTRU

For example, a WTRU may enable RS-based HARQ ACK feedback using any of the RLM/RLF triggers discussed above, and under further conditions that the worst case QoS and/or CBR meet certain (pre)configured conditions. Otherwise, and RLM/RLF trigger for HARQ ACK feedback will result in enabling non-RS-based HARQ feedback. In another example, a WTRU may initiate RS-based HARQ feedback following an RLF-based condition if the WTRU's expected transmission periodicity is above a threshold (possibly related to an RLF timer) while the WTRU may initiate a non-RS based HARQ feedback following and RLF-based condition if the WTRU's expected transmission periodicity is below a threshold. In another example, a WTRU may enable non-RS-based feedback following a first condition related to RLM/RLF (e.g. T3XX started), and may enable RS-based feedback following a second condition related to RLM/RLF (e.g. T3XX still running and reaches a configured value). The second condition may be a consequence of the first condition being triggered and the link not being recovered or the WTRU not being able to determine the link status following the trigger of the first condition. The first condition may relate to RLM-RS based RLF, while the second condition may be related to HARQ-based RLF. For example, a WTRU may initiate non-RS-based HARQ feedback when the WTRU starts a timer related to RLF (triggered by RLM-based RLF) and the WTRU may initiate RS based HARQ feedback if the first condition is triggered and the WTRU is unable to determine the reliability of HARQ feedback after some time period following the first condition (e.g. the quality of HARQ ACK feedback is determined below a threshold at least N timers during that time period).

WTRU Triggers SL-RLF Based on Combination of Different Event Types

According to an embodiment, a WTRU may trigger RLF based on a combination of two or more different events (e.g. outage events). Such outage events may be IS/OOS/NS determined based on RLM measurements of RS, or may be other outage events defined herein (e.g. HARQ-based, CQI-based, etc). The WTRU may determine its condition for RLF declaration based on a combination of these events. Specifically, a WTRU may trigger RLF based on different events E1 and E2 using any of the following triggering models:

Separate or combined counting of E1 and E2 to trigger SL-RLF or start a timer related to SL-RLF
  a. In one example solution, a WTRU may start a common timer related to RLF declaration, or may directly trigger RLF, based on reception of a different number of, possibly consecutive, events E1 and E2. For example, the WTRU may start the RLF timer following x1 consecutive E1 events, or X2 consecutive E2 events, regardless of which occurs first.
  b. In another example solution, a WTRU may treat E1 and E2 events as equal from the point of view of RLF. Specifically, the WTRU may trigger RLF upon reception of either E1 event or E2 event. Alternatively, the WTRU may start a timer upon reception of consecutive events of either E1 or E2

Weighting of one of the two events when using combined counting of E1 and E2
  a. In another example solution, a WTRU may start a common timer related to RLF declaration, or may directly trigger RLF, based on a number of consecutive events of either type E1 or E2. The number of consecutive events which initiate RLF timer may further be subject to a weighting of either event E1 or E2. For example, event E2 may be given a weight (e.g. 2) to be applied to the counting of the (possibly consecutive) events.

Common or independent timers associated with RLF triggering
  a. In another example solution, a WTRU may be configured with independent timers which can each be started based on independent triggering of the events E1 and E2.

Single RLF timer value or RLF timer value dependent on the triggering event.
  a. In another example solution, a WTRU may start a common timer related to RLF declaration based on a number of, possibly consecutive events E1 and E2 (as in the above examples) whereby the value of the RLF timer depends on the specific event (E1 or E2) which initiated the start of the timer.

One event may override or take priority over a different event types a. In one example, a WTRU may prioritize certain event types over other event types, when one event indicates outage while another indicates uptime. A WTRU may perform such prioritization based on (pre)configuration or predefinition of priority. In such case, a WTRU may ignore events of the lower priority event type when it conflicts with an event of the higher priority event type.

b. In another example, outage (uptime) event may always take precedence over an uptime (outage) event, regardless of the type, and the WTRU may ignore the uptime (outage) event in such a case during RLF declaration.

Recovery condition (following timer initiation) may be based on any of the two events, or may be associated with the event which started the timer a. In another example solution, a WTRU may recover the link prior to expiry of the RLF timer following a number of consecutive events E1' or E2' where E1' may only be used to recover E1 and E2' may only be used to recover E2.

Different Event Types Associated with HARQ ACK Feedback

Figure 7:
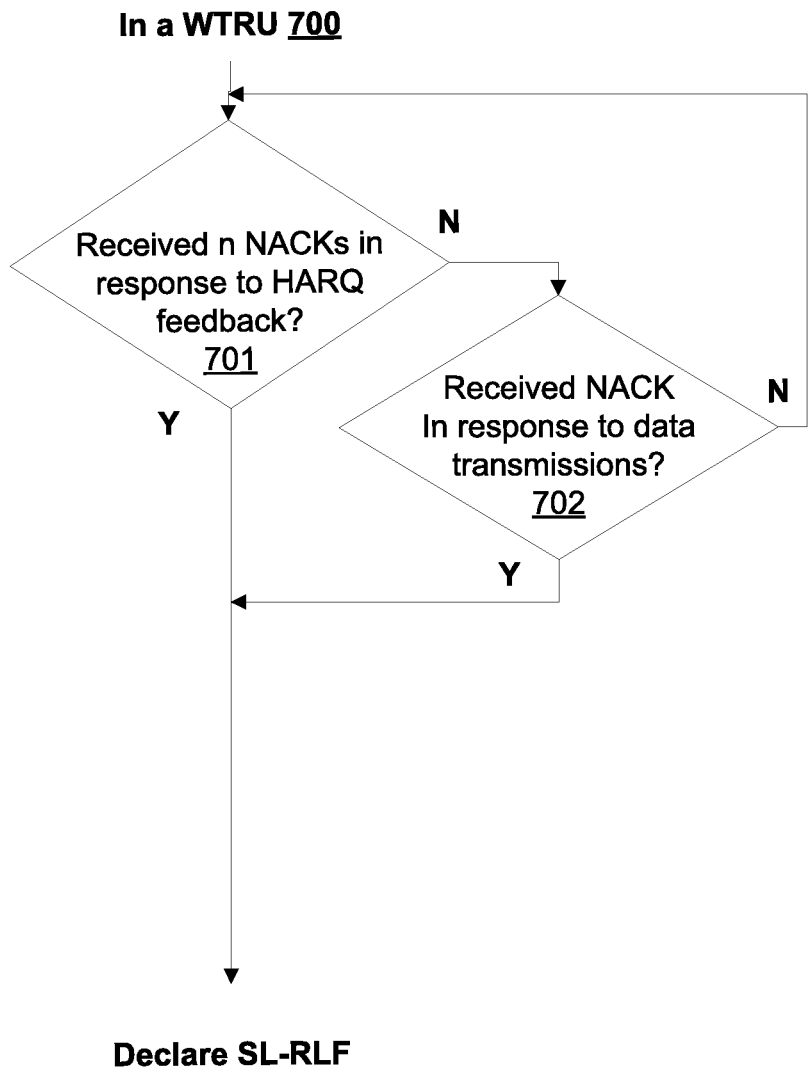
FIG. 7 is an embodiment illustrating different event types associated with HARQ ACK feedback, and inform upper layers of these outage events (declaring SL-RLF).

In one example embodiment 700, see FIG. 7, the different events may be associated with different HARQ feedback. A WTRU may consider (701-Y) event E1 as lack of received ACK/NACK feedback, and (702-Y) event E2 as NACK received in response to data (re)transmission. A WTRU may inform upper layers of each of these outage events (declaring SL-RLF).

A WTRU may also base recovery events on the reception of ACK/NACK feedback or the reception of ACK. For example, E1' may consist of the reception of ACK or NACK, and E2' may consist of the reception of ACK.

WTRU Triggers SL-RLF Based on Combination of HARQ ACK, CSI-Feedback, and/or RLM-RS Measurements According to an embodiment, the events may be related to any of HARQ ACK, Channel State Information (CSI) feedback, and RLM-based measurements (e.g. IS/OOS/NS). Specifically, a WTRU may trigger SL-RLF, or may initiate a timer related to SL-RLF triggering based on a combination of two or more events, whereby such events are related to HARQ feedback, CSI feedback, or RLM-RS measurements. For example, E1 may be defined in terms of HARQ feedback, as discussed herein (e.g. HARQ feedback not received for one or more SCI or data transmissions), E2 may be defined in terms of RLM-RS measurements (OOS indication), and E3 may be defined in terms of CQI feedback as discussed herein (e.g. CQI feedback not received over a time window following CSI request transmission).

The WTRU may base RLF determination on two or more of the above events. The WTRU may decide which event to consider based on any of the following:

Whether a form of feedback is enabled at the WTRU or for the unicast link a. For example, a WTRU may not consider HARQ-based events (or CQI events) when HARQ (or CQI reporting) is disabled at the WTRU. When HARQ (or CQI) is enabled, the WTRU may consider both IS/OOS and HARQ (or CQI) based events.

Whether a WTRU performed a transmission associated with each type of event a. For example, a WTRU may consider HARQ-based events only when it performs data transmission, or for some time period following RLM-only SCI transmission Whether data has been received by the WTRU over a recent time a. For example, a WTRU may start to consider HARQ-based events (or CQI-based events) following a period of time in which the WTRU has not received data from the peer WTRU. In addition, the WTRU may further perform a transmission (e.g. RLM-based SCI, or CSI request) under such condition.

WTRU Triggers SL-RLF Upon Resource Selection Failure

According to an embodiment, a WTRU may trigger SL-RLF associated with a specific unicast/groupcast link based on the failure to perform resource selection (i.e. mode 2). Such resource selection failure may further be associated with selection of resources for transmissions associated with the said unicast link. Failure to perform resource selection may include any of the following:

An insufficient number of resources or resource patterns are available/free to perform reliable transmission on such resources;

a. The amount of resources which categorizes successful resource selection may further depend on the VQI of the SLRB for which RLF is being monitored (or the worst case QoS SLRB)

i. For example, successful resource selection may be categorized as determination of x % of resources being available in a specific time window, where the x and the time window may also depend on the VQI;

b. The determination of whether reliable transmissions is achieved on these resources ii. For example, the x % available resources should have a measured RSSI below a threshold, or should have RSRP associated with SCI transmissions reserving such resources below a certain threshold, where such thresholds may depend on the VQI of the SLRB;

A WTRU may determine that its transmissions do not meet the required latency.

a. For example, a SLRB may be configured with a latency threshold and if the number of packets/PDUs which do not meet the latency exceeds a threshold, the WTRU declares a radio bearer failure.

A WTRU may determine that its transmissions do not meet the data rate requirement.

a. For example, the number or amount of unoccupied resources on a carrier may be determined to be below a threshold compared to a WTRU's own data rate requirements b. For example, the WTRU may drop a number or percentage of packets, and the WTRU may determine that this results in the WTRU not meeting its data rate requirements;

A WTRU exceeds its CR limit, possibly for a preconfigured number of times in a given window, where such number and the length of the window may further depend on the WTRU;

An overall measure of the RSSI of the resources selected for transmission is above a threshold, where such threshold may depend on the VQI of the SLRB.

WTRU Triggers SL-RLF Upon Failure to Read SIB

According to an embodiment, a WTRU may trigger SL-RLF associated with a specific unicast/groupcast link based on failure to read the SIB, potentially for a period of time. For example, during mobility, a WTRU may fail to receive the resource pool information to use in the new cell and may trigger SL-RLF following such failure. The time period may further depend on the VQI of the SLRB or most critical SLRB associated with the unicast link.

WTRU Triggers SL-RLF Upon Exceeding Maximum Allowable Transmit Power

According to an embodiment, a WTRU may trigger SL-RLF associated with a specific unicast/groupcast link as a result of exceeding or attempting to exceed the maximum allowable transmit power.

According to an embodiment, a WTRU may be configured with a maximum allowed transmit power and may cap its transmit power at such maximum. The WTRU may further compute a required transmit power based on the QoS characteristics associated with the unicast link. The WTRU may trigger SL-RLF when the calculated required power exceeds the maximum power, possibly for a number of (pre)configured times in a specific time window.

According to an embodiment, a WTRU may be allowed to exceed its maximum allowed transmit power a preconfigured number of times within a window. A WTRU may trigger SL-RLF if it exceeds this preconfigured number of times.

WTRU Triggers SL-RLF Upon Failed AS-Layer Connection or Signaling

In an example embodiment, a WTRU may trigger a SL-RLF upon a failure associated with unicast connection establishment signaling or other PC5-RRC signaling. Specifically, a WTRU may trigger SL-RLF upon determination of any of the following:

Security failure of a received PC5-RRC message
  a. For example, a WTRU may trigger SL-RLF upon integrity check failure and/or deciphering failure during reception of a PC5-RRC message received by the peer WTRU Capability mismatch between the peer WTRUs
  a. For example, a WTRU may trigger SL-RLF following reception of WTRU capabilities of the peer WTRU if the said WTRU does not support some/any of the capabilities of the peer WTRU with respect to the unicast link, whereby such capabilities are required for operation of the unicast link. Examples of such capabilities may include:

Support of and/or parameters associated with HARQ operation
  Support of and/or parameters associated with CQI feedback
  Support of and/or parameters associated with RLM/RLF
  Support of multicarrier operation and/or supported carriers and/or required number of carriers or BWPs
  Support of and/or parameters associated with beamforming, beam management, and/or number of beams AS-layer configuration cannot meet the required QoS
  a. For example, a WTRU may trigger SL-RLF following determination that the AS-layer configuration provided by the peer WTRU cannot meet the QoS associated with the unicast link and/or flows associated with the link. The WTRU may make such determination based on measurement of CBR, RSRP, inter-WTRU distance, velocity, or similar link quality measurements, and may be (pre)configured with a mapping of QoS level to measurement value

WTRU Triggers SL-RLF Upon Trigger of Uu RLF

According to an embodiment, a WTRU may trigger SL-RLF upon the trigger of a Uu RLF. The WTRU may further trigger SL-RLF under certain conditions, such as:

The WTRU is (pre)configured to do so for a specific unicast link;
The WTRU is configured to perform mode 1 transmissions on the unicast link;
The unicast link is associated with one or more SLRB which meet certain QoS requirements (e.g. VQI<x).

WTRU Triggers SL-RLF Based on Reception and/or Quality of CQI Reports

According to an embodiment, a WTRU may trigger SL-RLF based on the reception and/or quality received from CQI reports from a peer WTRU.

According to an embodiment, the WTRU may declare RLF if the time between successive CQI reports received from a peer WTRU is above a threshold. Such threshold may further depend on the VQI associated with the SLRB or most critical SLRB of the unicast link.

According to another embodiment, a WTRU may declare RLF if the CQI reported by a peer WTRU is below a threshold value, potentially for a period of time. Such threshold value and/or period of time may further depend on the VQI associated with the SLRB or most critical SLRB.

WTRU Enables Certain Type of SL-RLF based on Reciprocity

A WTRU may enable any of the above SL-RLF triggering mechanisms based on determination of reciprocity condition. Specifically, a WTRU may perform reciprocity determination associated with a unicast link. If such reciprocity is met, a WTRU may perform a non-RLM-based RLF triggering. Alternatively, if such reciprocity is met, a WTRU may disable RLM-based RLF. A WTRU may further disable transmission of RLM-RS upon detection of such condition. One possible advantage of such embodiment is that only a single WTRU needs to transmit RLM-RS and only one WTRU needs to perform RLM-based RLF. The other WTRU may instead use results of such RLM-measurement/monitoring to perform RLF triggering using one of the methods discussed herein.

WTRU Determines its Specific Role in RLM/RLF within a Unicast Link

A WTRU in a unicast link may have a different role than the peer WTRU in a unicast link with respect to RLF. Such role may dictate whether the specific WTRU is to perform certain RLM/RLF-based actions. The role of the WTRU may dictate any of the following:—Whether a WTRU transmits RLM RS or not; —Whether a WTRU performs RLM-based RLF or not; —Whether a WTRU performs non-RLM-based RLF (e.g., RLF based on detection/absence of HARQ, CQI feedback, absence of response to a probe signal); —Whether the WTRU transmits its RLF state to the peer WTRU; —Whether the WTRU can select the carrier to use for RLM RS transmission.

For example, in a unicast link, a first WTRU may transmit RLM RS and a second WTRU may perform RLM-based RLF. In another example, a first WTRU may perform RLM-based RLF, and a second WTRU may perform RLF based on QoS metrics.

A WTRU may determine its role based on any of the following:
  WTRU ID: For example, the WTRU with the larger/smaller source L2 ID may perform RLM-based RLF, and may not transmit RLM RS;
  Initiator of the unicast link: For example, the WTRU which initiated the unicast link (e.g., the WTRU which transmitted a specific message associated with unicast link establishment such as the first message) may perform RLM-based RLF and may not transmit RLM RS;

Negotiation during link establishment: For example, determination of the WTRU to perform RLF may be based on negotiation of such during link establishment;

Indication from upper layers: For example, upper layers (e.g., V2X layer) may indicate the role directly or indirectly. For example, the group leader may take a specific preconfigured or predetermined role for unicast or groupcast links;

Measured quality/occupancy of the sidelink resources: For example, the WTRU which measures a lower CBR on its resources, possibly associated with the unicast link, may have a specific role;

Request for a role change: For example, a WTRU may send a request for role change to the peer WTRU as a result of any of the following triggers:
  a. Limited capability (e.g. TX capability, battery power), for example for transmission of RS;
  b. Coverage status, for example, a WTRU may request a role change when it moves out of network coverage;
  c. Indication from upper layers, for example, a role change may be triggered by upper layers (e.g., V2X layer);
  d. Change in the quality/occupancy of the sidelink resources.

RLF Determination by Transmitter

Figure 8:
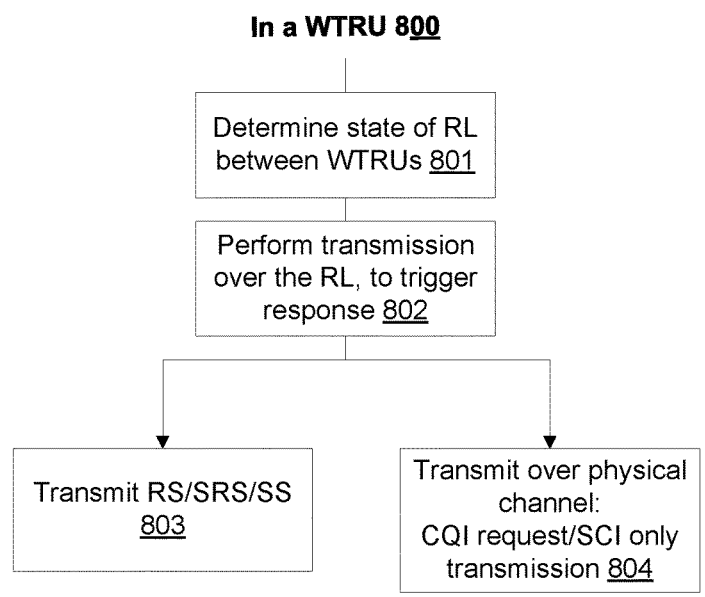
FIG. 8 is an embodiment where a WTRU determines state of a Radio Link (RL) by transmitting a probe signal and monitoring a response signal.

Radio Link State May be Determined by Transmitting a Probe Signal and Monitoring a Response Signal A first WTRU may perform, see 800 in FIG. 8, in order to determine (801) a state of a radio link between WTRUs, a first set of at least one transmission (802) over sidelink for the purpose of triggering a second set of at least one transmission by a second WTRU. Such first set may be referred to as a "probe transmission", and the second set may be referred to as a "response transmission". The first WTRU may then monitor the sidelink for the response transmission for the purpose of RLM.

The probe transmission and response transmission may consist of at least one of the following:

A reference signal (803) (e.g. DM-RS, CSI-RS), sounding signal (SRS) or synchronization signal (SS);

A transmission (804) over a physical channel such as PSCCH or PSSCH; such as:
  a. A CQI request over SL followed by the corresponding CQI reported by the peer WTRU, as discussed in more detail herein
  b. An SCI-only transmission followed by a HARQ ACK/NACK response, as discussed in more detail herein The probe transmission may include sidelink control information (SCI) that indicates at least one resource for the following:

A reference signal part of the probe transmission. For example, the SCI may indicate a CSI-RS resource as part of an aperiodic CSI request;

A reference signal part of the response transmission. For example, the SCI may indicate an SRS resource as part of an aperiodic SRS request;

A physical channel part of the response transmission, for example, the SCI may indicate a resource for a transmission over a physical channel that carries HARQ-ACK information and/or data.

A WTRU may set properties and/or contents of a response transmission according to at least one of the following:

Based on a quality metric derived from at least one part of the probe transmission. For instance, the WTRU may provide CSI based on a CSI-RS provided in the probe transmission. In another example, the WTRU may transmit a RS with a first set of properties if the quality metric is above a threshold, and a RS with a second set of properties if the quality metric is below a threshold.

Outage or Update Event Determined Based on Response Transmission

A first WTRU may determine that an outage event has occurred if at least one of the following occurs:

The first WTRU does not detect a response transmission above a quality threshold, following the transmission of a probe, and possibly within an expected/configured timer period; for example, the first WTRU does not detect a RS requested as part of the probe transmission above a threshold; in another example, the first WTRU does not detect HARQ-ACK over a physical channel following the transmission of data to a second WTRU; in another example, the first WTRU does not detect CSI over a physical channel following the transmission of a CSI request as part of the probe transmission;

The first WTRU receives or decodes a response transmission with a property that indicates that the quality metric determined by the second WTRU is below a threshold.

A first WTRU may determine that an uptime event has occurred if at least one of the following occurs:

The first WTRU detects a response transmission above a quality threshold, following the transmission of a probe; for example, the first WTRU detects a RS requested as part of the probe transmission above a threshold; in another example, the first WTRU detects HARQ-ACK over a physical channel following the transmission of data to a second WTRU; in another example, the first WTRU detects CSI over a physical channel following the transmission of a CSI request as part of the probe transmission;

The first WTRU receives or decodes a response transmission with a property that indicates that the quality metric determined by the second WTRU is above a threshold.

Radio Link Problem Determined Based on Detection of Outage Events

A WTRU may indicate an outage or uptime event to upper layers (e.g. RRC layer).

A WTRU may determine that a radio link problem has occurred after determining that a configured or pre-determined number of outage events have occurred. The WTRU may then start a recovery timer.

A WTRU may determine that a radio link problem is not (or no longer) occurring after determining that a configured or pre-determined number of uptime events have occurred. The WTRU may then stop the recovery timer.

A WTRU may determine that radio link failure has occurred when the recovery timer has expired. A WTRU may perform data transmission and/or control transmission pertaining to a link only under a condition that radio link failure has not occurred for this link.

Triggers for Sending the Probe Signal

A WTRU may trigger transmission of a probe signal at any of the following triggers/times:

Periodically

Following a period of time (e.g. expiry of a timer) since the last transmission by the WTRU of:
  a. probe signal
  b. Transmission of data
  c. Transmission of RS, possibly in conjunction with data d. CSI request
e. ACK/NACK transmission
f. Any other transmission on PSCCH or PSSCH, potentially destined to the same unicast link associated with the RLM/RLF process Following a period of time (e.g. expiry of a timer) since the last reception by the WTRU, from the peer WTRU, of:
a. Unicast data
b. RS from the peer
c. CQI report
d. ACK/NACK
e. Valid decoded SCI associated with the peer WTRU transmission over the unicast link Upon request from the peer WTRU or the gNB Upon detection of a change in the UL or SL environment, such as at the change in CBR, change in Uu conditions, determined from measurements of the peer WTRU (e.g. CQI, etc).

Probe Transmission Triggered by Radio Link Problem

Upon determining that a radio link problem has occurred, a WTRU may initiate at least one probe transmission for the purpose of recovery. Such at least one probe transmission may be referred to as recovery probe transmission. The at least one recovery probe transmission may consist of a specific type, such as an aperiodic CSI request or an aperiodic SRS request. The at least one recovery probe transmission may be initiated periodically. Alternatively, the WTRU may start a prohibit timer upon initiating a first recovery probe transmission and initiate a subsequent probe transmission upon expiry of the prohibit timer.

A WTRU may suspend data and/or control transmissions pertaining to a link, other than a recovery probe transmission, while a recovery timer is running.

SCI-Based Probe-Response

In an example embodiment, the probe signal may be an SCI-only transmission (i.e. transmission of an SCI without associated data transmission).

An SCI-only transmission may contain:
An indication of the HARQ resource (time and/or frequency) to use for the response signal
An indication of the TX power to use for the HARQ response signal
WTRU ID or unicast link ID to indicate the WTRU that should respond to the signal
An indication (implicit or explicit) that the SCI is not associated with data and/or should be used for RLM/RLF purposes A WTRU, upon reception of an SCI probe signal may transmit one or multiple HARQ feedback. For example, the WTRU may transmit periodic HARQ feedback (ACK or NACK) for a (pre)configured time period, or until further transmissions by the peer WTRU.

The SCI probe signal may be interchangeably used with RLM-SCI

When multiple HARQ feedback is used, determined, or configured, the number of HARQ feedback may be determined based on at least one of following
a. An indication in SCI
b. An RNTI scrambled with CRC of the SCI
c. A time window configured or determined The SCI probe signal may be determined based on at least one of following:
a. A bit flag in an SCI. For example, if the bit flag in SCI indicates TRUE, the SCI may be used for RLM measurement (or probing). Otherwise the SCI may be used for PSSCH scheduling or others.
b. When an SCI is used for probing, the associated HARQ feedback is based on the reception status of the SCI. When an SCI is used for data transmission, the associated HARQ feedback is based on the reception status of the PSSCH scheduled by the SCI.
c. Associated signal (e.g., either PSCCH or PSSCH) for HARQ feedback may be determined based on SCI type (e.g., SCI for RLM or SCI for PSSCH scheduling)

The WTRU may transmit ACK or NACK. In one example, the WTRU may transmit ACK only or NACK only (pre-determined). In another example, the WTRU may transmit ACK/NACK based on (pre)configuration. In another example, the WTRU may transmit ACK or NACK depending on:
The received power of the SCI—for example, the WTRU may transmit ACK if the RSRP of the PSSCH DMRS is above a threshold
Radio link conditions at the RX WTRU—for example, the WTRU may transmit ACK if the CBR meets some criteria
RLM/RLF conditions at the WTRU—for example, the WTRU may transmit ACK or NACK depending on whether it is currently experiencing radio link problems (e.g. status of RLF timer, status of radio link quality determination).

CSI Based Probe Response

In an example embodiment, the probe signal may be a CSI request. For example, a WTRU may transmit a CSI request following a period of time where it has not received any transmissions from the peer WTRU. Following transmission of the CSI request, the WTRU may start a timer for reception of a CSI report. The WTRU may perform any or a combination of the following:
If the timer expires and the WTRU does not receive a CSI report
  a. the WTRU may indicate OOS or similar outage event to upper layers
  b. the WTRU may trigger RLF
  c. the WTRU may retransmit the CSI request (potentially a (pre)configured number of times) while it does not receive CSI report
If the WTRU receives a valid CSI report it may
  a. Indicate IS or similar uptime event to upper layers
  b. Report event (e.g. IS/OOS/NS) based on the CSI report, or the actual quality of the report to upper layers for determination of RLF.
If the WTRU receives a CSI report having CQI above a certain (pre)configured quality, the WTRU may
  a. Reset any counters or timers related to RLF declaration
If the WTRU receives a CSI report having CQI below a certain (pre)configured quality, the WTRU may
  a. Trigger RLF
  b. Increment a counter related to RLF declaration (i.e. when the counter reaches a certain value, the WTRU triggers RLF)

AS Layer Reception Events Can be Sent to Upper Layers to Control Upper Layer Probe Signal In one solution, the WTRU may send an indication of reception-related events to upper layers, where the indication occurs at a time instance determined by some (pre)configured conditions. Such indication may be used by the upper layers to avoid the transmission of a probe signal used for link monitoring. It may also be used to change/update the characteristics of the probe signal (periodicity, number of retries, timer for retransmission of the probe, etc). For example, the AS layer may send an indication of the reception of HARQ feedback to upper layers upon reception of one or more HARQ feedback and/or data from the peer WTRU, and based on some further conditions configured at the AS layer or by upper layers (and described below).

In the description of this solution, the indication is assumed to be sent to upper layers (e.g. V2X layer). However, the WTRU may send such an indication to the network or another WTRU (e.g. using an RRC message, or any SL transmission).

A reception event at the WTRU may be any of the following:
  Reception of a control/data packet (e.g. MAC PDU) or transmission from a peer WTRU
    a. the WTRU may send indication only when a specific control/data packet was received from the peer WTRU
    b. the WTRU may send indication when any set of packets or PDU types from a peer WTRU or associated with a L2 ID is received
    c. reception of control/data packet or transmission from a peer WTRU may further depend on the decoding status at the RX WTRU, and the layer in which decoding is performed:
      (i) For example, the WTRU may send an indication to upper layers each time it receives and SCI address to a unicast link for which reporting has been configured
      (ii) For example, the WTRU may send an indication to upper layers each time it successfully decodes a TB associated to a sidelink process of a unicast link
      (iii) For example, the WTRU may send an indication to upper layers each time it delivers a decoded MAC PDU associated with a unicast link to upper layers
      (iv) For example, the WTRU may send an indication to upper layers each time it delivers a received packet to associated with a unicast link to upper layers (e.g. IP layer or V2X layer)
  Reception of a probe response signal, as per definition herein (e.g. reception of HARQ feedback to data transmission, reception of CQI feedback, etc.).
    a. for example, an event may consist of reception of PSFCH associated with the WTRUs own transmission, possibly to a particular L2 ID
    b. An event may be associated with only a particular type or types of response signal(s). For example, in the case of reception of HARQ feedback to data transmission, the WTRU may inform upper layers each time it receives an ACK in response to a transmission associated to a unicast link (i.e. pair of L2 source/destination ID). For example, in the case of reception of HARQ feedback to data transmission, the WTRU may inform upper layers each time it receives an ACK or NACK in response to a transmission associated to a unicast link (i.e. pair of L2 source/destination ID). For example, the WTRU may inform the upper layers each time it determines DTX for a transmission associated with a unicast link (i.e. pair of L2 source/destination ID).
  Reception of an SCI
  Absence of reception of any or all of the above, possibly during a period of time. For example, the WTRU may send an indication after a period of time has elapsed without the reception of any of the following transmissions described above.
  Combination of the above:
    a. an event may correspond to the reception of any of the above information from the peer WTRU. For example, an event may correspond to the reception of either an SCI associated with a specific L2 ID
  Reception of NW signaling such as DCI, MAC CE, RRC signaling
  A reception event may further be determined or characterized by any RLM/RLF status as described herein
    a. for example, the WTRU may send an indication to upper layers upon starting and/or stopping of a recovery timer related to RLF (e.g. T310 is started or T310 is stopped). The WTRU may further inform upper layers of the type of event (T310 started or stop) and the duration of the recovery timer (i.e. value of T310)
    b. for example, the WTRU may send an indication to upper layers upon reception of a number of (possibly consecutive) IS and/or OOS received from PHY layers
    c. for example, the WTRU may send an indication to upper layers upon reception of a number of (possibly consecutive) events associated with triggering of SL RLF (e.g. HARQ feedback, CSI feedback, etc) as discussed herein is received An event may be associated with a specific L2 ID. Specifically, the WTRU may consider reception associated with different L2 IDs to be different events, and may perform indication to upper layers independently based on reception of these events and independently triggered timers/conditions.

WTRU is Configured with Conditions for Reporting Reception Events

A WTRU may be configured with conditions on when to report an event to upper layers, which could be one or a combination of the following:
  Reporting based on expiry of a timer: The WTRU may report the occurrence of an event within the past, periodically, or based on a timer. For example, the WTRU may transmit an indication to upper layers if the reception of at least one probe (e.g. HARQ feedback) and/or any data/control transmission was received over the last period. The WTRU may not perform any indication (or may indicate nothing received) in the absence of any event over that period. In another example, the WTRU may start a timer, and upon expiry of the timer without reception from the peer WTRU, the WTRU may perform indication to upper layers. In another example, the WTRU may transmit an indication to upper layers if it receives at least one event (where an event can be any event defined in the clause above for reporting of the event to upper layers) over the last period. The WTRU may start/reset such timer at the initiation of the unicast link, indication by upper layers, or reception from the peer WTRU. In the above example, the timer may be (pre)configured to the WTRU or determine at the WTRU itself:
    a. the WTRU may be configured by the network or upper layer with such timer (for example, the WTRU may receive such timer with the L2 ID during link establishment)
    b. the WTRU may determine such timer independently based on characteristics of its own data transmission. For example, the WTRU may derive the timer from the periodicity of its own data transmissions c. the WTRU may determine such timer from configuration information received from the peer WTRU (e.g. via a PC5-RRC parameter)
d. the WTRU may determine such timer based on an inactivity timer associated with the WTRU itself or its peer WTRU. For example, the timer may be determined by a Discontinuous Reception (DRX) cycle of the WTRU itself, or a sidelink DRX cycle
e. the WTRU may determine such timer based on the QoS characteristics of active transmissions (e.g. configured SLRBs), possibly associated to the L2 ID Reporting based on the number of received events: The WTRU may send an indication based on a condition associated with one or a number of reception events. For example, the WTRU may send an indication to upper layers following reception of N probe responses, and/or N SCI receptions by the peer WTRU.

Reporting based on the congestion measured on the sidelink resources: For example, the WTRU may send an indication only when the congestion on the sidelink resources is above a (pre)configured threshold. For example, the WTRU may send an indication periodically or based on the expiry of a timer, and such period or timer value may further depend on the CBR (i.e. the WTRU may be configured with a different period/timer for each value of measured CBR or range of measured CBR).

Reporting based on QoS characteristics associated with the receptions: For example, the WTRU may perform indication as long as the receptions are associated with a specific QoS Reporting triggered by request from upper layers: The WTRU may send an indication when requested by upper layers. Such indication may further indicate report of an event which may have occurred over a period of time related to the request. For example, the WTRU may indicate, at the time of request, whether an event occurred since the last request.

Reporting immediately under certain other conditions related to those above: The WTRU may send an indication immediately upon the occurrence of an event, where immediate reporting may further be conditioned on the result of any of the other conditions above. In one example embodiment, the WTRU may send an indication at each expiry of a timer. If at the expiry of the timer, the WTRU has not sent an indication (or indicated no event), the WTRU may send any subsequent indication immediately at the occurrence of the next event. The WTRU, following an immediate indication, may then be configured to send subsequent indications based on timer approach as described above, until the next immediate indication is triggered.

Reporting based on the mode of transmission at the WTRU. For example, the WTRU may be enabled to perform such reporting when configured with RLC Acknowledge Mode (AM), but not perform such reporting when configured with RLC Unacknowledged Mode (UM).

WTRU Informs Upper Layers Whether/when Upper Layer Signaling is Required and Parameters A WTRU may inform upper layers when/whether upper layer probe signaling (e.g. keep alive procedure at V2X layer) is required. The WTRU may provide such indication to upper layers for each unicast link or pair of L2 source/destination ID. The WTRU may perform such indication at the instance of time when the need for upper layer probe signaling changes (e.g. from needed to not needed, or vice versa). Alternatively, the WTRU may provide such indication continuously (e.g. as a continuous flag or information element. The upper layers may use such indication to determine whether to enable/disable transmission of a probe like procedure at upper layers for each unicast link.

A WTRU may determine whether upper layer probe procedure is needed or not (i.e. what indication to provide to upper layers) and/or the parameters related to upper layer probe procedure (e.g. keep alive timer or number of retransmissions) based on any or a combination of the following:

a. Whether RLM/RLF is configured and/or possible at the AS layer:
  (i) for example, a WTRU may inform upper layers that keep alive procedure is required if RLF is disabled at the WTRU for a unicast link. For example, the WTRU may determine that RLF is disabled at the WTRU for a unicast link depending on whether the AS layer configuration allows for RLF to be performed or not. For example, the WTRU may determine that RLF is disabled if the NW configures the WTRU without PSFCH resources in its resource pool and/or whether the NW configures the WTRU with SLRBs having HARQ feedback disabled and/or whether the NW configures the WTRU with RLC UM and/or whether the WTRU determines (based on other conditions, e.g., related to QoS, CBR, etc.) to enable HARQ feedback for a transmission by the peer WTRU. In the other cases (i.e. RLF is enabled based on determination of the opposite scenarios) the WTRU may inform upper layers that keep alive procedure is not required or can be disabled b. whether the congestion on sidelink is above a (pre)configured amount:
  (i). for example, the WTRU may be (pre)configured with a threshold value of CBR. If the CBR is above/below that value, the WTRU may inform upper layers to disable/enable keep alive procedure.
  (ii). for example, the WTRU may provide upper layers with a value of the keep alive timer and/or number of retransmissions of the keep alive message to be used by upper layer keep alive procedure. Such timer may be determined by the WTRU based on the measured CBR. For example, the WTRU may provide a (pre)configured timer and/or number of retries for each (pre)configured range of CBR values c. the QoS and/or SLRB configuration associated with the unicast link:
  (i). for example, the WTRU may provide upper layers with a (pre)configured value of the keep alive timer and/or number of retransmission, where such value may be associated with the configuration of the SLRB(s) provided to the WTRU. Specifically, the WTRU may be configured with a keep alive timer and/or number of retransmissions for each SLRB, and may provide the keep alive timer/number or retransmissions of the worst case (i.e. maximum or minimum) SLRB to be used for that unicast link RLF for Groupcast Transmissions WTRU Maintains Multiple RLM/RLF Processes Associated with a Groupcast According to an embodiment, a WTRU may maintain multiple concurrent, and possibly related, RLM/RLF processes, where each RLM/RLF is associated with one of the WTRUs in a groupcast link. These are further referred to herein as the set of RLM/RLF processes for a group.

Identification of RLM/RLF Processes for a Group Based on RS

A WTRU may identify an RLM/RLF process as a process for a group based on the RLM-RS transmitted by the peer WTRU. Specifically, the RLM-RS may have certain properties which identify a group of WTRUs, such as:—The sequence of the RS is (pre)configured to be associated with a specific group ID; —The time/frequency/beam resources used to transmit an RS is associated with a specific group ID; —The pattern of resources used to transmit an RS is associated with a specific group ID.

A WTRU which transmits an RLM-RS for purpose of RLM/RLF associated with a specific group may ensure that the above properties are respected.

Identification of RLM/RLF Processes for a Group Based on Established Unicast Links A WTRU may determine that an RLM/RLF process is a process for a group if the RLM/RLF process is associated with a unicast link with a WTRU which is part of a WTRU's own groupcast communication. Specifically, a WTRU may identify the peer WTRUs in all unicast links established at the said WTRU based on the source L2 ID of the peer WTRUs. Such ID may be provided to the WTRU by upper layers (for example, during link establishment).

A WTRU may determine the L2 IDs of the WTRUs in a groupcast transmission or a groupcast link based on:
  Information from upper layers, such as through information obtained during a groupcast link establishment, or via information provided to a group leader WTRU from its own upper layers (e.g., V2X layer);
  Information exchanges using PC5-RRC, such as RRC messages exchanged between WTRUs as part of groupcast communication. A WTRU may include its source L2 ID in the group-based PC5-RRC messages used to manage the WTRU group;
  From a group leader WTRU.

A WTRU determines that an RLM/RLF process for an established unicast link is also associated with a group if the peer WTRU L2 ID corresponds to the L2 ID of a WTRU in the said WTRU's group.

WTRU Declares Groupcast RLF Based on RLF Determined from One or a Number of Individual RLF Processes A WTRU may declare groupcast RLF if it declares RLF on one or more individual RLM/RLF processes for a group. The number of processes may further be (pre)configured. The number of processes may further be a function or a percentage of the total number of processes for the group. The number of processes may further depend on the following:
  Minimum communication range requirement associated with the transmissions to the group;
  Speed of the WTRU;
  Information provided by upper layers (e.g. platoon or non-platoon group);
  QoS of the data associated with the groupcast transmissions.

WTRU Informs Other WTRUs/gNB of Groupcast RLF

According to an embodiment, a WTRU may inform other WTRUs of the RLF status such as the initiation of a groupcast RLF timer, the occurrence of N individual unicast RLFs associated with RLF processes belonging to a group, or similar. Such information can be sent via a SL-RRC message, SL MAC CE, or SL SCI/PSSCH transmission.

According to another embodiment, a WTRU may inform the gNB of the RLF status associated with a group based on the same triggers as above.

WTRU Informs Upper Layers of the WTRU in Groupcast RLF

According to an embodiment, a WTRU may inform the upper layers of a groupcast RLF, and may also indicate to upper layers which of the peer WTRUs resulted in the groupcast RLF (based on the N rule above).

RLF Recovery Actions

A WTRU may perform one or more actions following declaration of SL-RLF. Such actions may further depend on whether SL-RLF is triggered for a specific SLRB, or for the entire unicast link. For example, some of the recovery actions may be applicable only for SL-RLF associated with a SLRB, while other actions may be performed for link failure.

WTRU Initiates an RRC Connection Upon SL-RLF to Initiate Network Recovery

According to an embodiment, a WTRU may initiate an RRC connection upon triggering an SL-RLF (for example, if the WTRU is operating V2X in IDLE/INACTIVE state). A WTRU may further include information on the SL-RLF during or after the RRC connection procedure. A WTRU may wait for recovery of the SLRB or unicast link based on reconfiguration from the network. If recovery does not occur within a specific time, the WTRU may terminate the link and or the bearer and inform upper layers.

WTRU Switches to a Different Transmit Pool or Set of Resources Upon SL-RLF

According to an embodiment, a WTRU may switch to a different transmit pool or set of resources and/or carrier and/or BWP upon declaration of SL-RLF. For example, a WTRU may be configured with multiple transmit pools that are usable for a unicast link, or with a resource pool to be used during SL-RLF. If the WTRU is able to recover the link using the new set of resources, the WTRU may continue the link and associated SLRB. If the recovery does not occur within a specific time, the WTRU may terminate the link and or the bearer and inform upper layers.

It can be useful to ensure that two WTRU on both sides of the Sidelink on which RLF occurred switch to the same resource pool. If the WTRU detects a SL-RLF but maintains an RRC connection to the network, the WTRU may indicate to the network the identity of the resource pool or set of resources and/or carrier and/or BWP upon switching.

In scenarios where the WTRU detects a SL-RLF but does not have an RRC connection after detecting a SL-RLF, the WTRU may switch to a different pool and/or carrier and/or BWP according to a (pre)configured pattern. For example, the network may configure the WTRU by RRC or broadcast signaling with a pattern or sequence of resource pools, such that when the WTRU detects a SL-RLF on one pool, the WTRU switches to the next pool indicated by the configured sequence of resource pools. The network may configure a certain time on which the WTRU may attempt to establish a Sidelink connection before attempting to switch to the next pool.

[WTRU Switches to a Different Transmission Mode Upon SL-RLF

According to an embodiment, a WTRU may switch to a different transmission mode (mode 1 vs mode 2) upon detection of SL-RLF. For example, a WTRU may be configured to use a specific mode of operation for a unicast link unicast link and may switch to a different configured transmission mode upon detection of SL-RLF on that link. If the WTRU is able to recover the link using the new transmission mode, the WTRU may continue the link and associated SLRB. If the recovery does not occur within a specific time, the WTRU may terminate the link and or the bearer and inform upper layers.

WTRU Initiates Connection Establishment to a Different WTRU

According to an embodiment, a WTRU may initiate a connection establishment procedure to an alternate WTRU upon SL-RLF of a unicast link. For example, such WTRU may be an infrastructure WTRU which provides an alternate (relayed) path between the two WTRUs associated with the unicast link. For example, a WTRU may be configured, upon establishment of a unicast link, with the destination address of such alternate WTRU. Upon successful recovery via the alternate WTRU, the said WTRU may assume successful recovery. For example, the successful recovery indication may come from upper layers. A WTRU may assume a failed recovery if such indication is not received within a specific time interval. If the recovery does not occur within a specific time, the WTRU may terminate the link and or the bearer and inform upper layers.

The third WTRU may facilitate the SL re-establishment, to deliver control messages for example, or communicate a common resource pool for the exchange of information between other two WTRUs. The third WTRU may further act as a relay or an intermediate node, should the SL connection reestablishment fail between the WTRUs on the ends of the Sidelink on which RLF was detected.

The WTRU may determine the third WTRU based on, for example, at least one of the following:
  Past announcements on the SCI control channel. For example, the WTRU may determine that the third WTRU is contact with the WTRU on the other side of the link on which RLF was detected based previous resource booking announcements;
  Based on dynamic probing. For example, the WTRU may probe the third WTRU with the identity of the WTRU on the other side of the Sidelink on which RLF occurred to confirm if another unicast link exists to that WTRU and the third WTRU;
  Based on network configuration or assistance. For example, the WTRU may request the network the identity of other WTRUs that have a connection to the other side of the Sidelink on which RLF occurred. Network configuration may also aid in down selecting from a group of WTRUs;
  Based on a preconfigured set of infrastructures WTRUs. For example, the WTRU that detects RLF may assume that it can reach the WTRU on the other side of the Sidelink on which RLF occurred via a third infrastructure WTRU that it has a connection to. Such connection may be further dependent on certain measurement, where the WTRU considers an infrastructure WTRU a viable third WTRU if it receives a measurement from that WTRU above a threshold or upon receiving a certain acknowledgment from it.

While not explicitly described, the present embodiments may be employed in any combination or sub-combination. For example, the present principles are not limited to the described variants, and any arrangement of variants and embodiments can be used. Moreover, the present principles are not limited to the described channel access methods and any other type of channel access methods with different priority levels is compatible with the present principles.

Besides, any characteristic, variant or embodiment described for a method is compatible with an apparatus device comprising means for processing the disclosed method, with a device comprising a processor configured to process the disclosed method, with a computer program product comprising program code instructions and with a non-transitory computer-readable storage medium storing program instructions.

Although features and elements are described above in particular combinations, one of ordinary skill in the art will appreciate that each feature or element can be used alone or in any combination with the other features and elements. In addition, the methods described herein may be implemented in a computer program, software, or firmware incorporated in a computer readable medium for execution by a computer or processor. Examples of non-transitory computer-readable storage media include, but are not limited to, a read only memory (ROM), random access memory (RAM), a register, cache memory, semiconductor memory devices, magnetic media such as internal hard disks and removable disks, magneto-optical media, and optical media such as CD-ROM disks, and digital versatile disks (DVDs). A processor in association with software may be used to implement a radio frequency transceiver for use in a WTRU 102, WTRU, terminal, base station, RNC, or any host computer.

Moreover, in the embodiments described above, processing platforms, computing systems, controllers, and other devices containing processors are noted. These devices may contain at least one Central Processing Unit ("CPU") and memory. In accordance with the practices of persons skilled in the art of computer programming, reference to acts and symbolic representations of operations or instructions may be performed by the various CPUs and memories. Such acts and operations or instructions may be referred to as being "executed," "computer executed" or "CPU executed".

One of ordinary skill in the art will appreciate that the acts and symbolically represented operations or instructions include the manipulation of electrical signals by the CPU. An electrical system represents data bits that can cause a resulting transformation or reduction of the electrical signals and the maintenance of data bits at memory locations in a memory system to thereby reconfigure or otherwise alter the CPU's operation, as well as other processing of signals. The memory locations where data bits are maintained are physical locations that have particular electrical, magnetic, optical, or organic properties corresponding to or representative of the data bits. It should be understood that the representative embodiments are not limited to the above-mentioned platforms or CPUs and that other platforms and CPUs may support the provided methods.

The data bits may also be maintained on a computer readable medium including magnetic disks, optical disks, and any other volatile (e.g., Random Access Memory ("RAM")) or non-volatile (e.g., Read-Only Memory ("ROM")) mass storage system readable by the CPU. The computer readable medium may include cooperating or interconnected computer readable medium, which exist exclusively on the processing system or are distributed among multiple interconnected processing systems that may be local or remote to the processing system. It is understood that the representative embodiments are not limited to the above-mentioned memories and that other platforms and memories may support the described methods.

In an illustrative embodiment, any of the operations, processes, etc. described herein may be implemented as computer-readable instructions stored on a computer-readable medium. The computer-readable instructions may be executed by a processor of a mobile unit, a network element, and/or any other computing device.

There is little distinction left between hardware and software implementations of aspects of systems. The use of hardware or software is generally (e.g., but not always, in that in certain contexts the choice between hardware and software may become significant) a design choice representing cost vs. efficiency tradeoffs. There may be various vehicles by which processes and/or systems and/or other technologies described herein may be effected (e.g., hardware, software, and/or firmware), and the preferred vehicle may vary with the context in which the processes and/or systems and/or other technologies are deployed. For example, if an implementer determines that speed and accuracy are paramount, the implementer may opt for a mainly hardware and/or firmware vehicle. If flexibility is paramount, the implementer may opt for a mainly software implementation. Alternatively, the implementer may opt for some combination of hardware, software, and/or firmware.

The foregoing detailed description has set forth various embodiments of the devices and/or processes via the use of block diagrams, flowcharts, and/or examples. Insofar as such block diagrams, flowcharts, and/or examples contain one or more functions and/or operations, it will be understood by those within the art that each function and/or operation within such block diagrams, flowcharts, or examples may be implemented, individually and/or collectively, by a wide range of hardware, software, firmware, or virtually any combination thereof. Suitable processors include, by way of example, a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Application Specific Standard Products (ASSPs); Field Programmable Gate Arrays (FPGAs) circuits, any other type of integrated circuit (IC), and/or a state machine.

Although features and elements are provided above in particular combinations, one of ordinary skill in the art will appreciate that each feature or element can be used alone or in any combination with the other features and elements. The present disclosure is not to be limited in terms of the particular embodiments described in this application, which are intended as illustrations of various aspects. Many modifications and variations may be made without departing from its spirit and scope, as will be apparent to those skilled in the art. No element, act, or instruction used in the description of the present application should be construed as critical or essential to the invention unless explicitly provided as such. Functionally equivalent methods and apparatuses within the scope of the disclosure, in addition to those enumerated herein, will be apparent to those skilled in the art from the foregoing descriptions. Such modifications and variations are intended to fall within the scope of the appended claims. The present disclosure is to be limited only by the terms of the appended claims, along with the full scope of equivalents to which such claims are entitled. It is to be understood that this disclosure is not limited to particular methods or systems.

It is also to be understood that the terminology used herein is for the purpose of describing particular embodiments only, and is not intended to be limiting. As used herein, when referred to herein, the terms "station" and its abbreviation "STA", "user equipment" and its abbreviation "WTRU" may mean (i) a wireless transmit and/or receive unit (WTRU), such as described infra; (ii) any of a number of embodiments of a WTRU, such as described infra; (iii) a wireless-capable and/or wired-capable (e.g., tetherable) device configured with, inter alia, some or all structures and functionality of a WTRU, such as described infra; (iii) a wireless-capable and/or wired-capable device configured with less than all structures and functionality of a WTRU, such as described infra; or (iv) the like. Details of an example WTRU, which may be representative of any WTRU recited herein, are provided below with respect to FIGS. 1A-1D.

In certain representative embodiments, several portions of the subject matter described herein may be implemented via Application Specific Integrated Circuits (ASICs), Field Programmable Gate Arrays (FPGAs), digital signal processors (DSPs), and/or other integrated formats. However, those skilled in the art will recognize that some aspects of the embodiments disclosed herein, in whole or in part, may be equivalently implemented in integrated circuits, as one or more computer programs running on one or more computers (e.g., as one or more programs running on one or more computer systems), as one or more programs running on one or more processors (e.g., as one or more programs running on one or more microprocessors), as firmware, or as virtually any combination thereof, and that designing the circuitry and/or writing the code for the software and or firmware would be well within the skill of one of skill in the art in light of this disclosure. In addition, those skilled in the art will appreciate that the mechanisms of the subject matter described herein may be distributed as a program product in a variety of forms, and that an illustrative embodiment of the subject matter described herein applies regardless of the particular type of signal bearing medium used to actually carry out the distribution. Examples of a signal bearing medium include, but are not limited to, the following: a recordable type medium such as a floppy disk, a hard disk drive, a CD, a DVD, a digital tape, a computer memory, etc., and a transmission type medium such as a digital and/or an analog communication medium (e.g., a fiber optic cable, a waveguide, a wired communications link, a wireless communication link, etc.).

The herein described subject matter sometimes illustrates different components contained within, or connected with, different other components. It is to be understood that such depicted architectures are merely examples, and that in fact many other architectures may be implemented which achieve the same functionality. In a conceptual sense, any arrangement of components to achieve the same functionality is effectively "associated" such that the desired functionality may be achieved. Hence, any two components herein combined to achieve a particular functionality may be seen as "associated with" each other such that the desired functionality is achieved, irrespective of architectures or intermediate components. Likewise, any two components so associated may also be viewed as being "operably connected", or "operably coupled", to each other to achieve the desired functionality, and any two components capable of being so associated may also be viewed as being "operably couplable" to each other to achieve the desired functionality. Specific examples of operably couplable include but are not limited to physically mateable and/or physically interacting components and/or wirelessly interactable and/or wirelessly interacting components and/or logically interacting and/or logically interactable components.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, where only one item is intended, the term "single" or similar language may be used. As an aid to understanding, the following appended claims and/or the descriptions herein may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"). The same holds true for the use of definite articles used to introduce claim recitations. In addition, even if a specific number of an introduced claim recitation is explicitly recited, those skilled in the art will recognize that such recitation should be interpreted to mean at least the recited number (e.g., the bare recitation of "two recitations," without other modifiers, means at least two recitations, or two or more recitations).

Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B." Further, the terms "any of" followed by a listing of a plurality of items and/or a plurality of categories of items, as used herein, are intended to include "any of," "any combination of," "any multiple of," and/or "any combination of multiples of" the items and/or the categories of items, individually or in conjunction with other items and/or other categories of items. Moreover, as used herein, the term "set" or "group" is intended to include any number of items, including zero. Additionally, as used herein, the term "number" is intended to include any number, including zero.

In addition, where features or aspects of the disclosure are described in terms of Markush groups, those skilled in the art will recognize that the disclosure is also thereby described in terms of any individual member or subgroup of members of the Markush group.

As will be understood by one skilled in the art, for any and all purposes, such as in terms of providing a written description, all ranges disclosed herein also encompass any and all possible subranges and combinations of subranges thereof. Any listed range can be easily recognized as sufficiently describing and enabling the same range being broken down into at least equal halves, thirds, quarters, fifths, tenths, etc. As a non-limiting example, each range discussed herein may be readily broken down into a lower third, middle third and upper third, etc. As will also be understood by one skilled in the art all language such as "up to," "at least," "greater than," "less than," and the like includes the number recited and refers to ranges which can be subsequently broken down into subranges as discussed above. Finally, as will be understood by one skilled in the art, a range includes each individual member. Thus, for example, a group having 1-3 cells refers to groups having 1, 2, or 3 cells. Similarly, a group having 1-5 cells refers to groups having 1, 2, 3, 4, or 5 cells, and so forth.

Moreover, the claims should not be read as limited to the provided order or elements unless stated to that effect. In addition, use of the terms "means for" in any claim is intended to invoke 35 U.S.C. § 112, ¶6 or means-plus-function claim format, and any claim without the terms "means for" is not so intended.

A processor in association with software may be used to implement a radio frequency transceiver for use in a wireless transmit receive unit (WTRU), user equipment (WTRU), terminal, base station, Mobility Management Entity (MME) or Evolved Packet Core (EPC), or any host computer. The WTRU may be used m conjunction with modules, implemented in hardware and/or software including a Software Defined Radio (SDR), and other components such as a camera, a video camera module, a videophone, a speakerphone, a vibration device, a speaker, a microphone, a television transceiver, a hands free headset, a keyboard, a Bluetooth® module, a frequency modulated (FM) radio unit, a Near Field Communication (NFC) Module, a liquid crystal display (LCD) display unit, an organic light-emitting diode (OLED) display unit, a digital music player, a media player, a video game player module, an Internet browser, and/or any Wireless Local Area Network (WLAN) or Ultra Wide Band (UWB) module.

Although the invention has been described in terms of communication systems, it is contemplated that the systems may be implemented in software on microprocessors/general purpose computers (not shown). In certain embodiments, one or more of the functions of the various components may be implemented in software that controls a general-purpose computer.

In addition, although the invention is illustrated and described herein with reference to specific embodiments, the invention is not intended to be limited to the details shown. Rather, various modifications may be made in the details within the scope and range of equivalents of the claims and without departing from the invention.

Throughout the disclosure, one of skill understands that certain representative embodiments may be used in the alternative or in combination with other representative embodiments.

Although features and elements are described above in particular combinations, one of ordinary skill in the art will appreciate that each feature or element can be used alone or in any combination with the other features and elements. In addition, the methods described herein may be implemented in a computer program, software, or firmware incorporated in a computer readable medium for execution by a computer or processor. Examples of non-transitory computer-readable storage media include, but are not limited to, a read only memory (ROM), random access memory (RAM), a register, cache memory, semiconductor memory devices, magnetic media such as internal hard disks and removable disks, magneto-optical media, and optical media such as CD-ROM disks, and digital versatile disks (DVDs). A processor in association with software may be used to implement a radio frequency transceiver for use in a WTRU, WTRU, terminal, base station, RNC, or any host computer.

Moreover, in the embodiments described above, processing platforms, computing systems, controllers, and other devices containing processors are noted. These devices may contain at least one Central Processing Unit ("CPU") and memory. In accordance with the practices of persons skilled in the art of computer programming, reference to acts and symbolic representations of operations or instructions may be performed by the various CPUs and memories. Such acts and operations or instructions may be referred to as being "executed," "computer executed" or "CPU executed"

One of ordinary skill in the art will appreciate that the acts and symbolically represented operations or instructions include the manipulation of electrical signals by the CPU. An electrical system represents data bits that can cause a resulting transformation or reduction of the electrical signals and the maintenance of data bits at memory locations in a memory system to thereby reconfigure or otherwise alter the CPU's operation, as well as other processing of signals. The memory locations where data bits are maintained are physical locations that have particular electrical, magnetic, optical, or organic properties corresponding to or representative of the data bits.

The data bits may also be maintained on a computer readable medium including magnetic disks, optical disks, and any other volatile (e.g., Random Access Memory ("RAM")) or non-volatile ("e.g., Read-Only Memory ("ROM")) mass storage system readable by the CPU. The computer readable medium may include cooperating or interconnected computer readable medium, which exist exclusively on the processing system or are distributed among multiple interconnected processing systems that may be local or remote to the processing system. It is understood that the representative embodiments are not limited to the above-mentioned memories and that other platforms and memories may support the described methods.

Suitable processors include, by way of example, a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Application Specific Standard Products (ASSPs); Field Programmable Gate Arrays (FPGAs) circuits, any other type of integrated circuit (IC), and/or a state machine.

Although the invention has been described in terms of communication systems, it is contemplated that the systems may be implemented in software on microprocessors/general purpose computers (not shown). In certain embodiments, one or more of the functions of the various components may be implemented in software that controls a general-purpose computer.

In addition, although the invention is illustrated and described herein with reference to specific embodiments, the invention is not intended to be limited to the details shown. Rather, various modifications may be made in the details within the scope and range of equivalents of the claims and without departing from the invention.

What is claimed is:

1. A method for detecting Sidelink Radio Link Failure (SL-RLF) implemented by a first wireless transmit-receive unit (WTRU) the method comprising:
    determining to use at least one of a Radio Link Control (RLC)-based SL-RLF detection method or a Hybrid Automatic Repeat request (HARQ)-based SL-RLF detection method based on a Sidelink Radio Bearer (SLRB) configuration information, wherein the SLRB configuration information is associated with a Quality of Service (QoS) configuration for a unicast link between the first WTRU and a second WTRU;
    determining that SL-RLF has occurred on the unicast link according to the determined SL-RLF detection method; and
    transmitting, via a Radio Resource Control (RRC) message, information representative of the SL-RLF of the unicast link to a network node, wherein the information representative of the SL-RLF comprises an address of the second WTRU that indicates a destination address associated with the unicast link for which SL-RLF is detected.

2. The method according to claim 1, further comprising determining to use at least the HARQ-based SL-RLF detection method for the unicast link based on the SLRB configuration information indicating HARQ enablement.

3. The method according to claim 1, further comprising:
    determining to use at least the HARQ based SL-RLF detection for the unicast link; and
    determining that SL-RLF has occurred on the unicast link when, for n consecutive times, no HARQ feedback is received within an expected time instance, discontinuous transmission, DTX, wherein n is a configured threshold.

4. The method according to claim 1, wherein the information representative of the SL-RLF for the unicast link further comprises an address of the first WTRU.

5. The method according to claim 4, wherein the address of the first WTRU corresponds to a source address associated with the unicast link for which SL-RLF is detected.

6. A first wireless transmit-receive unit, WTRU, the first WTRU comprising a processor configured to:
    determine to use at least one a Radio Link Control (RLC)-based sidelink radio link failure (SL-RLF) detection method or a Hybrid Automatic Repeat request (HARQ)-based SL-RLF detection method based on Sidelink Radio Bearer (SLRB) configuration information, wherein the SLRB configuration information is associated with a Quality of Service (QoS) configuration for a unicast link between the first WTRU and a second WTRU;
    determine that SL-RLF has occurred on the unicast link according to the determined SL-RLF detection method; and
    transmit, via a Radio Resource Control (RRC) message, information representative of the SL-RLF of the unicast link to a network node, wherein the information representative of the SL-RLF comprises an address of the second WTRU indicating a destination address associated with the unicast link for which SL-RLF is detected.

7. The first WTRU according to claim 6, wherein the processor is further configured to determine to use at least the HARQ-based SL-RLF detection method for the unicast link based on the SLRB configuration information indicating HARQ enablement.

8. The first WTRU according to claim 6, wherein the at least one processor is further configured to:
   determine to use at least the HARQ based SL-RLF detection for the unicast link; and
   determine that SL-RLF has occurred on the unicast link when, for n consecutive times, no HARQ feedback is received within an expected time instance, discontinuous transmission, DTX, wherein n is a configured threshold.

9. The first WTRU according to claim 6, wherein the information representative of the SL-RLF for the unicast link further comprises an address of the first WTRU.

10. The first WTRU according to claim 9, wherein the address of the first WTRU corresponds to a source address associated with the unicast link for which SL-RLF is detected.

11. A first wireless transmit-receive unit, WTRU, the first WTRU comprising a processor and a transceiver, first WTRU configured to:
   determine to use at least one of a Radio Link Control (RLC)-based sidelink radio link failure (SL-RLF) detection method or a Hybrid Automatic Repeat request (HARQ)-based SL-RLF detection method based on Sidelink Radio Bearer (SLRB) configuration information, wherein the SLRB configuration information is associated with a Quality of Service (QoS) configuration for a unicast link between the first WTRU and a second WTRU;
   determine that SL-RLF has occurred on the unicast link using the HARQ based SL-RLF detection when no HARQ feedback is received for a number of consecutive discontinuous transmission (DTX) intervals; and
   transmit, via a Radio Resource Control (RRC) message, information representative of the SL-RLF of the unicast link to a network node, wherein the information representative of the SL-RLF comprises an address of the second WTRU indicating a destination address associated with the unicast link for which SL-RLF is detected.

12. The first WTRU according to claim 11, wherein the information representative of the SL-RLF for the unicast link comprises an address of the first WTRU.

* * * * *

UNITED STATES PATENT AND TRADEMARK OFFICE
CERTIFICATE OF CORRECTION

PATENT NO. : 12,256,244 B2
APPLICATION NO. : 17/429991
DATED : March 18, 2025
INVENTOR(S) : Martino Freda et al.

It is certified that error appears in the above-identified patent and that said Letters Patent is hereby corrected as shown below:

In the Claims

In Claim 6: Column 102, Line 47, delete "one" and insert -- one of --

In Claim 11: Column 103, Line 20, delete "first" and insert -- the first --

Signed and Sealed this
Twenty-second Day of April, 2025

Coke Morgan Stewart
*Acting Director of the United States Patent and Trademark Office*